United States Patent
VanBenschoten et al.

(10) Patent No.: US 12,499,127 B2
(45) Date of Patent: Dec. 16, 2025

(54) SYSTEMS AND METHODS FOR CONTROLLING REPLICA PLACEMENT IN MULTI-REGION DATABASES

(71) Applicant: Cockroach Labs, Inc., New York, NY (US)

(72) Inventors: Nathan J. VanBenschoten, New York, NY (US); Andrew Scott Woods, Brooklyn, NY (US); Adam J. Storm, Toronto (CA); Arul Ajmani, Toronto (CA); Rebecca Taft, Chicago, IL (US); Richard M. Loveland, Gardiner, NY (US); Peyton A. Walters, Philadelphia, PA (US); Ebony Marie Brown, Brooklyn, NY (US); Oliver Tan, Alexandria (AU)

(73) Assignee: Cockroach Labs, Inc., New York, NY (US)

(*) Notice: Subject to any disclaimer, the term of this patent is extended or adjusted under 35 U.S.C. 154(b) by 0 days.

(21) Appl. No.: 18/365,888

(22) Filed: Aug. 4, 2023

(65) Prior Publication Data

US 2024/0045887 A1 Feb. 8, 2024

Related U.S. Application Data

(60) Provisional application No. 63/485,154, filed on Feb. 15, 2023, provisional application No. 63/395,229, filed on Aug. 4, 2022.

(51) Int. Cl.
*G06F 16/27* (2019.01)
*G06F 11/20* (2006.01)
*G06F 16/23* (2019.01)

(52) U.S. Cl.
CPC ........ *G06F 16/278* (2019.01); *G06F 11/2028* (2013.01); *G06F 16/2379* (2019.01)

(58) Field of Classification Search
CPC . G06F 16/278; G06F 16/2379; G06F 11/2028
See application file for complete search history.

(56) References Cited

U.S. PATENT DOCUMENTS 9,292,389 B2 * 3/2016 Schirripa ............ G06F 11/1092
9,773,014 B2 * 9/2017 Lee .......................... G06F 16/27
(Continued)

OTHER PUBLICATIONS

Kagan Tumer, et al., "Ensemble clustering with voting active clusters," Pattern Recognition Letters, vol. 29, Issue 14, pp. 1947-1953 (Year 2008).

(Continued)

*Primary Examiner* — William Spieler
(74) *Attorney, Agent, or Firm* — Goodwin Procter LLP

(57) ABSTRACT

Systems and methods for controlling placement of replicas of data in a multi-region database are provided. A selection of a super region including at least first and second database regions can be received. A voting replica of data can be stored within the second database region based on the selection of the super region and a failure of the first database region. A selection of a secondary database region can be received. A voting replica of data can be stored within the secondary database region based on the selection of the secondary database region and a failure of a primary database region. Non-voting replicas of data can be stored in a subset of a plurality of database regions. A selection of a restricted replica placement configuration can be received. The non-voting replicas can be removed from database regions based on the selection of the restricted replica placement configuration.

27 Claims, 4 Drawing Sheets

(56) References Cited

U.S. PATENT DOCUMENTS

| | | | |
|---|---|---|---|
| 10,621,200 B2* | 4/2020 | Merriman | G06F 16/273 |
| 11,921,670 B1* | 3/2024 | Emberson | G06F 16/128 |
| 2002/0055972 A1* | 5/2002 | Weinman, Jr. | G06F 11/2071 |
| | | | 709/217 |
| 2013/0290249 A1* | 10/2013 | Merriman | G06F 16/278 |
| | | | 707/610 |
| 2017/0013058 A1* | 1/2017 | Annamalai | H04L 5/0055 |
| 2017/0169091 A1* | 6/2017 | Kapadia | G06F 16/273 |
| 2020/0293501 A1* | 9/2020 | Awasthi | G06F 3/0647 |
| 2021/0028977 A1* | 1/2021 | Ortenberg | H04L 67/51 |
| 2021/0382912 A1 | 12/2021 | Horowitz et al. | |
| 2022/0114192 A1* | 4/2022 | Bridge, Jr. | G06F 16/27 |

OTHER PUBLICATIONS

Cloud Spanner, Replication, Aug. 3, 2020 (Year: 2020).

Corbett et al. Spanner: Google's Globally Distributed Database, Proceedings of OSDI 2012 (year: 2012).

Finley, Out in the Open: Ex-Google Building Cloud Software That's Almost Impossible to Take Down, Jul. 21, 2024 (Year: 2014).

Matei, CockroachDB's Consistency Model, Jan. 24, 2019 (Year: 2019).

* cited by examiner

SYSTEMS AND METHODS FOR CONTROLLING REPLICA PLACEMENT IN MULTI-REGION DATABASES

CROSS-REFERENCE TO RELATED APPLICATIONS

This application claims priority to and the benefit of U.S. Provisional Patent Application No. 63/395,229, filed Aug. 4, 2022, and entitled "SYSTEMS AND METHODS FOR PLACEMENT RESTRICTED REPLICAS IN MULTI-REGION DATABASES", and U.S. Provisional Patent Application No. 63/485,154, filed Feb. 15, 2023, and entitled "SYSTEMS AND METHODS FOR SUPER REGIONS, SECONDARY REGIONS, AND MODIFIED ZONE CONFIGURATIONS IN MULTI-REGION DATABASES", which are incorporated by reference herein in their entireties.

FIELD OF TECHNOLOGY

The present disclosure relates generally to methods and systems for managing data storage within a distributed database and more particularly, to managing data storage based on database regions of a multi-region database.

BACKGROUND

The foregoing examples of the related art and limitations therewith are intended to be illustrative and not exclusive, and are not admitted to be "prior art." Other limitations of the related art will become apparent to those of skill in the art upon a reading of the specification and a study of the drawings. In some cases, relational databases can apply replication to ensure data survivability, where data is replicated among one or more computing devices ("nodes") of a group of computing devices ("cluster"). A relational database may store data within one or more ranges, where a range includes one or more key-value (KV) pairs and can be replicated among one or more nodes of the cluster. A range may be a partition of a data table (also referred to as a "table"), where a table may include one or more ranges. In some cases, multiple table configurations may be used to optimally serve range data to client devices. Tables can be configured based on the usage of the stored data and whether the data is frequently read and/or written by client devices. The database may receive requests (e.g., such as read or write operations originating from client devices) directed to data and/or schema objects stored by the database.

In some cases, management of geographically distributed databases can be complex due to latency concerns for users with different access patterns. An access pattern for a particular user may be identified based on the geographic location of the user, geographic location(s) of table data accessed by the user, and/or a read and write relationship (e.g., frequency of read and write operations) between the user and their accessed table data. Accordingly, optimization of a geographically distributed database can be complicated when users have competing access patterns.

In some cases, to adhere to user access patterns, tables of a database may be configured as regional tables that enable low latency read and write operations for client devices located within particular geographic regions. Outside of the configured geographic regions, regional tables may provide higher latency read (e.g., consistent read) and write operations. In some cases, regional tables may not be desirable when low latency reads are desired for each geographic region. Accordingly, to adhere to other user access patterns, tables of the database may be configured as global tables that can serve low latency consistent reads to client devices irrespective of geographic location, at the cost of providing higher latency write operations for each geographic region. Global tables may be suitable for data that requires low-latency reads from multiple geographic locations and for data that can tolerate higher latency write operations.

With respect to regional tables, voting replicas and non-voting replicas can be placed among database nodes in one or more database regions according to selected survivability goals (e.g., a zone survivability goal or a region survivability goal). For example, for a database with a region survivability goal, voting replicas are placed and stored among at least three database regions (e.g., including a home database region), while for a zone survivability goal, voting replicas are placed and stored in at least three availability zones at least one database region. Further, non-voting replicas may be placed and stored in each database region of the database that does not include a voting replica. Such a configuration can enable local follower reads (e.g., stale, consistent reads) from nodes geographically located in each of the database regions, while maintaining survivability goals with respect to voting replicas. In some cases, placement of voting and non-voting replicas among database regions can have negative consequences. A negative consequence can include, for example, an increased amount of data stored on the cluster, thereby increasing expenses required to store and maintain the increased amount of data. Another negative consequence can include a requirement to replicate write loads to the non-voting replicas stored in a large number of database regions, particularly for heavy write loads, which can increase network bandwidth usage. For instances where cross-database region network traffic is charged at a higher rate than intra-database region network traffic, the increased network bandwidth usage can lead to undesirable cost increases for an entity managing the database.

Further, in some cases, users may wish to implement a data domiciling strategy, where specific data is restricted to placement on database nodes in a specific geographic location or group of geographic locations corresponding to database regions. Such a scenario could result from data privacy and storage requirements relating to particular geographic regions (e.g., countries). Users of databases presently lack capabilities to restrict voting replicas and non-voting replicas for regional tables to particular geographic regions. As an example, for a database configured with region survivability and including database regions of the Eastern United States, Central United States, Western United States, and Western Europe, a regional table may be homed in the Eastern United States and may have voting replicas stored in both the Central and Western United States database regions. If the Eastern United States database region experiences a failure and is unavailable, voting replicas from the Eastern United States database region could be replaced in any of the remaining three database regions. In many cases, users would want a quorum of replicas to remain in the Central and Western United States database regions, such that there is no need for cross-continent traffic while establishing consensus (e.g., quorum) among voting replicas. Accordingly, improved methods and systems are desired that enable grouping of database regions for data domiciling purposes, while also maintaining survivability goals and accessibility requirements (e.g., global or regional accessibility) for stored data.

Further, with respect to regional tables, non-voting replicas (e.g., replicas that do not participate in a consensus protocol) are conventionally placed in all database regions that do not include a voting replica (e.g., where a voting replica is not present). Such a configuration can enable local follower reads (e.g., stale, consistent reads) from nodes geographically located in each of the database regions, but placement of non-voting replicas in each database region can have negative consequences including an increased amount of data stored on the cluster and a requirement to replicate write loads to the non-voting replicas stored in a large number of database regions. In some cases, users may wish to implement a data domiciling strategy, where specific data is restricted to placement on nodes in a specific geographic location or group of geographic locations corresponding to database regions. But, placement of non-voting replicas in all available database regions can eliminate a user's ability to implement such a data domiciling strategy. Accordingly, improved methods and systems are required that enable restrictions for placement of replicas, while also maintaining survivability goals and accessibility requirements (e.g., global or regional accessibility) for stored data.

With respect to region survivability and failover mechanisms, when a primary region of a database experiences a failure (e.g., by a failure of each of the database nodes located within the primary region for a duration of time) and is unavailable, leaseholder replicas, leader replicas, and voting replicas stored by database nodes in the primary region prior to the failure can be randomly replaced onto database node(s) geographically located in another database region of the database. However, such a failover mechanism could result in replicas being replaced and stored in geographic regions(s) that are geographically distant from client devices accessing the data included in replicas, thereby reducing database performance and latency of read and write operations directed to the data. Accordingly, improved methods and systems are desired that enable selection of a failover database region that can operate as the primary region in the event of primary region failure.

In some cases, users of a database may desire additional manual controls to configure placement of a number of replicas according to data domiciling, survivability, and failover goals. However, such users presently lack intuitive, user-friendly capabilities for applying zone configurations to individual database regions at the database level to implement the above-described goals. Accordingly, improved methods and systems are desired that enable application of user-selected zone configurations to individual database regions of a multi-region database.

SUMMARY

Methods and systems for controlling placement of replicas of data partitions in a multi-region database are disclosed. In one aspect, embodiments of the present disclosure feature a method for configuration of a super region in a database. According to one embodiment, the method can include executing operations on one or more processors of a plurality of servers. The operations can include receiving, from a client computing device, a selection of a super region comprising at least two database regions of a plurality of database regions, wherein the plurality of servers can be geographically located within the plurality of database regions, wherein each of the at least two database regions can include at least one of the plurality of servers. The operations can include providing, based on a survivability goal, at least three voting replicas of a data partition stored by the plurality of servers in the at least two database regions, wherein at least one of the at least three voting replicas can be stored within a first database region of the at least two database regions, wherein the at least three voting replicas can be configured to participate in a consensus protocol to commit write operations to the data partition. The operations can include causing storage of the at least one voting replica of the failed first database region (i) within the super region and (ii) external to the failed first database region based on a failure of the first database region.

Various embodiments of the method can include one or more of the following features. The survivability goal may be a zone survivability goal. Before the failure of the first database region, each of at least three availability zones can include at least one voting replica of the at least three voting replicas. For the zone survivability goal, the data partition can be available when less than a majority of the at least three voting replicas experiences a failure. In some embodiments, (i) one of the at least three voting replicas can be configured as a leaseholder replica to coordinate read operations directed to the data partition, and (ii) one of the at least three voting replicas can be configured as a leader replica to coordinate the consensus protocol to commit write operations to the data partition. In some variations, one of the at least three voting replicas can be configured as both the leaseholder replica and the leader replica.

In some embodiments, the survivability goal can be a region survivability goal and the super region can further include at least three database regions of the plurality of database regions. Before the failure of the first database region: the at least three database regions can each store less than a majority number of the at least three voting replicas; the at least three database regions can each store at least one of the at least three voting replicas; one database region of the at least three database regions can store a threshold number of the at least three voting replicas; and the threshold number may be the majority number minus one. For the region survivability goal, the data partition can be available when one of the at least three database regions experiences a failure. In some variations, the at least three voting replicas can further include at least five voting replicas of the data partition. The operations can further include providing, based on the region survivability goal, the at least five voting replicas of the data partition stored by the plurality of servers in the at least three database regions, wherein at least one of the at least five voting replicas can be stored within the first database region of the at least three database regions, wherein the at least five voting replicas can be configured to participate in the consensus protocol to commit write operations to the data partition. In some embodiments, (i) one of the at least five voting replicas can be configured as a leaseholder replica to coordinate read operations directed to the data partition, and (ii) one of the at least five voting replicas can be configured as a leader replica to coordinate the consensus protocol to commit write operations to the data partition. In some variations, one of the at least five voting replicas can be configured as both the leaseholder replica and the leader replica.

In some embodiments, the operations can further include providing one or more non-voting replicas of the data partition stored by the plurality of servers in the at least two database regions, wherein the one or more non-voting replicas of the partition may not be configured to participate in the consensus protocol to commit the write operations to the data partition. A data table can include one or more data partitions including the data partition.

In another aspect, the present disclosure features a system for configuration of a super region in a database. The system can include corresponding computer systems (e.g., servers), apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

In another aspect, embodiments of the present disclosure feature a method for configuration of a secondary database region in a database. According to one embodiment, the method can include executing operations on one or more processors of a plurality of servers. The operations can include receiving, from a client computing device, a selection of a secondary database region of a plurality of database regions, wherein the plurality of servers can be geographically located within the plurality of database regions. The operations can include providing, based on a survivability goal, at least three voting replicas of a data partition stored by the plurality of servers in at least one database region of the plurality of database regions, wherein the at least one database region can include a primary database region, wherein the at least three voting replicas can be configured to participate in a consensus protocol to commit write operations to the partition, wherein the primary database region can include at least one voting replica of the at least three voting replicas. The operations can include causing storage of the at least one voting replica of the failed primary database region within the secondary database region based on a failure of the primary database region.

Various embodiments of the method can include one or more of the following features. The survivability goal can be a zone survivability goal. Before the failure of the primary database region, each of at least three availability zones can include at least one voting replica of the at least three voting replicas. For the zone survivability goal, the data partition can be available when less than a majority of the at least three voting replicas experiences a failure. In some embodiments, (i) one of the at least three voting replicas can be configured as a leaseholder replica to coordinate read operations directed to the data partition, (ii) one of the at least three voting replicas can be configured as a leader replica to coordinate the consensus protocol to commit write operations to the data partition, and (iii) the primary database region can include the leaseholder replica and the leader replica. In some variations, causing storage of the at least one voting replica of the at least three voting replicas of the failed primary database region within the secondary database region can further include causing storage of the leaseholder replica and the leader replica of the failed primary database region within the secondary database region. In some variations, one of the at least three voting replicas can be configured as both the leaseholder replica and the leader replica.

In some embodiments, the survivability goal can be a region survivability goal and the at least one database region can further include at least three database regions of the plurality of database regions. Before the failure of the primary database region: the at least three database regions can each store less than a majority number of the at least three voting replicas; the at least three database regions can each store at least one of the at least three voting replicas; the primary database region can store a threshold number of the at least three voting replicas; and the threshold number can be the majority number minus one. Before the failure of the primary database region, the secondary region can store the threshold number of the at least three voting replicas. For the region survivability goal, the data partition can be available when one of the at least three database regions experiences a failure.

In some embodiments, the at least three voting replicas can further include at least five voting replicas of the data partition. The operations can further include providing, based on the region survivability goal, the at least five voting replicas of a data partition stored by the plurality of servers in the at least three database regions of the plurality of database regions, wherein the at least three database regions can include the primary database region and the secondary database region, wherein the at least five voting replicas can be configured to participate in the consensus protocol to commit write operations to the partition; and based on the failure of the primary database region, causing storage of the threshold number of the at least five voting replicas of the failed primary database region within the secondary database region. In some variations, (i) one of the at least five voting replicas can be configured as a leaseholder replica to coordinate read operations directed to the data partition, (ii) one of the at least five voting replicas can be configured as a leader replica to coordinate the consensus protocol to commit write operations to the data partition, and (iii) the primary database region can include the leaseholder replica and the leader replica. In some variations, causing storage of the at least one voting replica of the at least three voting replicas of the failed primary database region within the secondary database region can further include causing storage of the leaseholder replica and the leader replica of the failed primary database region within the secondary database region. One of the at least five voting replicas can be configured as both the leaseholder replica and the leader replica.

In some embodiments, the operations can further include providing one or more non-voting replicas of the data partition stored by the plurality of servers in a subset of the plurality of database regions to that do not store at least one of the at least three voting replicas, wherein the one or more non-voting replicas of the partition may not be configured to participate in the consensus protocol to commit the write operations to the data partition. In some variations, a data table can include one or more data partitions including the data partition.

In another aspect, the present disclosure features a system for configuration of a secondary database region in a database. The system can include corresponding computer systems (e.g., servers), apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

In another aspect, embodiments of the present disclosure feature a method for restricting replica placement in a database. According to one embodiment, the method can include executing operations on one or more processors of a plurality of servers. The operations can include providing at least three voting replicas of a data partition stored by the plurality of servers in a first database region of a plurality of database regions, wherein the plurality of servers can be geographically located within the plurality of database regions, wherein each of the at least three voting replicas can be configured to participate in a consensus protocol to commit write operations to the data partition. The operations can include providing, in each database region of a subset of the plurality of database regions that do not store the at least three voting replicas, a non-voting replica of the partition, wherein each non-voting replica may not be configured to participate in the consensus protocol to commit the write operations to the data partition. The operations can include receiving, from a client computing device, a selection of a restricted replica placement configuration configured to cause removal of the non-voting replica from each of the subset of the plurality of database regions. The operations can include causing removal, based on the received selection of the restricted replica placement configuration, of the non-voting replica from each database region of the subset of the plurality of database regions.

Various embodiments of the method can include one or more of the following features. The data partition can be available when less than a majority of the at least three voting replicas experiences a failure. In some embodiments, (i) one of the at least three voting replicas can be configured as a leaseholder replica to coordinate read operations directed to the data partition, and (ii) one of the at least three voting replicas can be configured as a leader replica to coordinate the consensus protocol to commit write operations to the data partition. In some variations, one of the at least three voting replicas can be configured as both the leaseholder replica and the leader replica. In some variations, a data table can include one or more data partitions including the data partition.

In another aspect, the present disclosure features a system for restricting replica placement in a database. The system can include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The above and other preferred features, including various novel details of implementation and combination of events, will now be more particularly described with reference to the accompanying figures and pointed out in the claims. It will be understood that the particular methods and systems described herein are shown by way of illustration only and not as limitations. As will be understood by those skilled in the art, the principles and features described herein may be employed in various and numerous embodiments without departing from the scope of the present disclosure. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of the present disclosure.

The foregoing Summary, including the description of some embodiments, motivations therefore, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
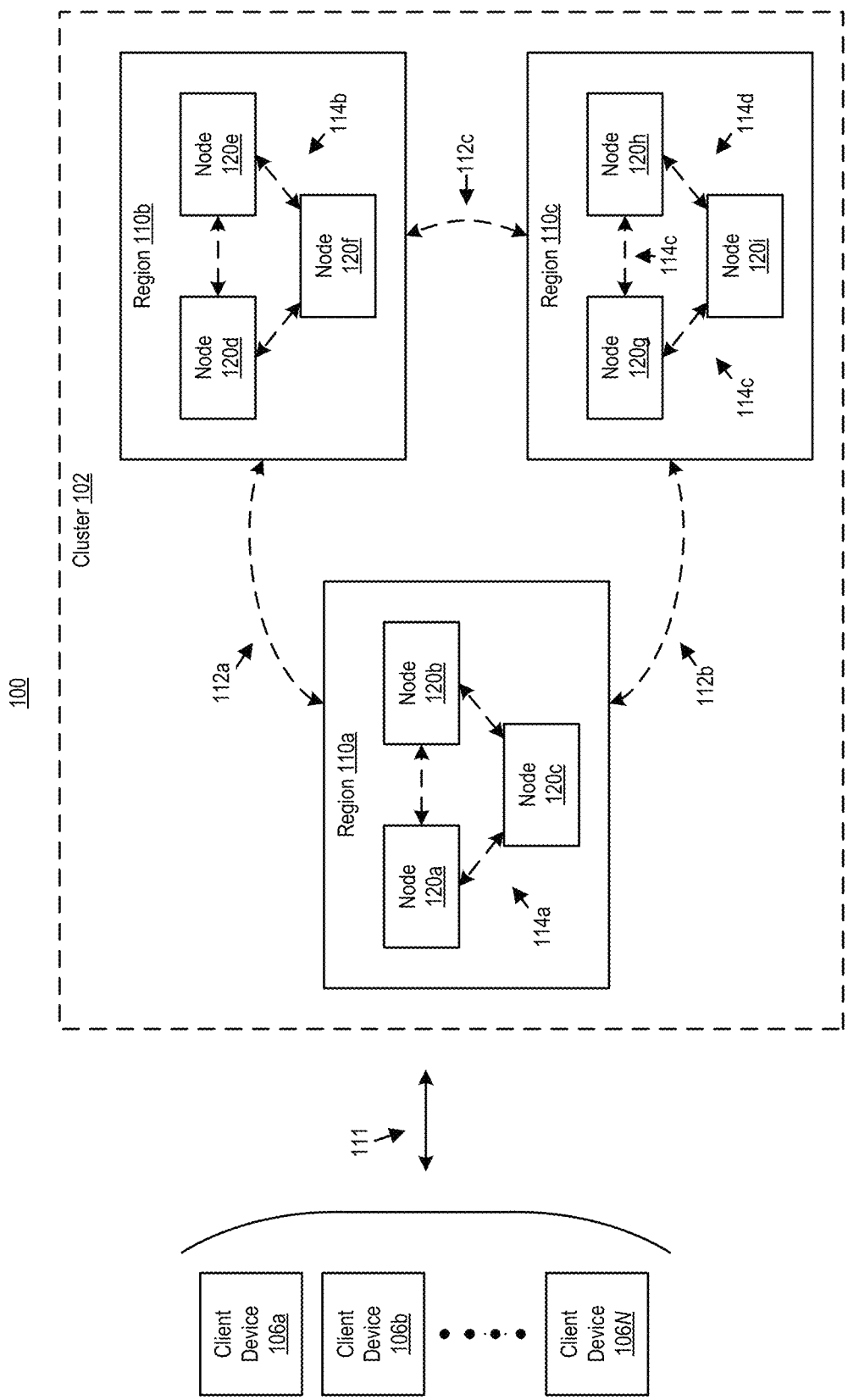
FIG. 1 shows an illustrative distributed computing system, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Methods and systems for managing data storage based on groups of database regions of a multi-region database are disclosed. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Motivation for Some Embodiments

As described above, tables of a database may be configured as global tables or regional tables, where the configuration of the table and placement of the table's (or partition's) replicas may enable performance and/or availability optimizations based on geographic locations of client devices accessing the table (or partition). Typically, for regional tables (e.g., table level and row level regional tables) of a database with a region survivability goal, users lack control (e.g., via client devices) over placement of voting replicas and non-voting replicas other than the respective home database region of each of the regional tables. As an example, for regional tables (e.g., table level and row level regional tables), non-voting replicas of the table are conventionally placed in each available database region where a voting replica is not present. This lack of control prevents users from implementing data domiciling strategies where voting replicas and non-voting replicas are placed only within a particular geographic region or a particular group of geographic regions. As an example, users may be motivated to implement data domiciling strategies that restrict replica placement to only particular geographic region(s) to comply with data privacy and storage requirements.

Further, users typically lack control over the database regions to which replicas may be replaced in the event of failure of the primary region. Such a lack of control can cause replicas to be replaced randomly among database regions external to the primary region in the event of a failure of a primary region, which can inadvertently increase latencies for accessing KV data of the replaced replicas. Such a lack of control of placement of replicas can also cause violation of data domiciling strategies, where specific data that is intended to be stored in a specific geographic location or group of geographic locations is placed outside of the specific, intended geographic location(s).

Accordingly, super regions, secondary regions, placement restricted replicas, and modified zone configurations as described herein can be used to control and manipulate placement of voting and non-voting replicas of a regional table. As an example, a super region can restrict placement of voting and non-voting replicas of a regional table to only the database regions included in a super region that includes the home region of the regional table. As another example, a restricted replica placement configuration can be used to restrict placement of replicas to only the home database regions associated with the respective regional tables. Further, both super regions and secondary regions can each control replica replacement scenarios in the event of node failures in database regions included in a particular super region. Database regions included in respective super regions and/or selected as secondary regions may be selected using multi-region syntax to enable implementation of a data domiciling strategy and a replica replacement strategy, while also reducing an amount of data stored by the cluster. Further, modified zone configurations enable customizable application of multi-region abstractions for individual use cases via selection of parameters (e.g., numbers of replicas, voting replicas, leaseholder constraints, etc.) for individual database regions of a multi-region database.

Terms

"Cluster" generally refers to a deployment of computing devices that comprise a database. A cluster may include computing devices (e.g., computing nodes) that are located in one or more geographic locations (e.g., data centers). The one or more geographic locations may be located within a single geographic region (e.g., eastern United States, central United States, etc.) or more than one geographic location. For example, a cluster may include computing devices (e.g., computing nodes) that are located in both the eastern United States and western United States, with 2 data centers in the eastern United states and 4 data centers in the western United States. The geographic regions of the cluster may correspond to cluster regions and database regions as described herein.

"Node" generally refers to an individual computing device that is a part of a cluster. A node may join with one or more other nodes to form a cluster. One or nodes that comprise a cluster may store data (e.g., tables, indexes, etc.) in a map of KV pairs. A node may store a "range", which can be a subset of the KV pairs (or all of the KV pairs depending on the size of the range) stored by the cluster. A range may also be referred to as a "shard", a "partition", and/or a "data partition". A table and its secondary indexes can be mapped to one or more ranges, where each KV pair in a range may represent a single row in the table (which can also be referred to as the primary index because the table is sorted by the primary key) or a single row in a secondary index. Based on the range reaching or exceeding a threshold storage size, the range may split into two ranges. For example, based on reaching 512 mebibytes (MiB) in size, the range may split into two ranges. Successive ranges may split into one or more ranges based on reaching or exceeding a threshold storage size.

"Index" generally refers to a copy of the rows corresponding to a single table, where the rows are sorted by one or more columns (e.g., a column or a set of columns) of the table. Each index may correspond and/or otherwise belong to a single table. In some cases, an index may include a type. An example of a first type of index may be a primary index. A primary index may be an index on row-identifying primary key columns. A primary key constraint may be applied to one or more columns of a table to uniquely identify each row of the table, such that the primary key adds structure to table data. For a column configured with a primary key constraint, values stored in the column(s) must uniquely identify each row. One or more columns of a table may be configured with a primary key constraint and the database that includes the table may automatically create an index (referred to as a primary index) for the primary key column(s). A primary key may be defined for each table stored by a database as described herein. An example of a second type of index may be a secondary index. A secondary index may be defined on non-primary key columns of a table. A table that does not include a defined primary index may include a hidden row identifier (ID) column (e.g., referred to as rowid) that uniquely identifies each row of the table as an implicit primary index.

"Replica" generally refers to a copy of a range. A range may be replicated at least a threshold number of times to produce a number of replicas. For example and by default, a range may be replicated 3 times as 3 distinct replicas. Each replica of a range may be stored on a distinct node of a cluster. For example, 3 replicas of a range may each be stored on a different node of a cluster. In some cases, a range may be required to be replicated a minimum of 3 times to produce at least 3 replicas.

"Leaseholder" or "leaseholder replica" generally refers to a replica of a range that is configured to hold the lease for the replicas of the range. The leaseholder may receive and/or coordinate read transactions and write transactions directed to one or more KV pairs stored by the range. "Leaseholder node" may generally refer to the node of the cluster that stores the leaseholder replica. The leaseholder may receive read transactions and serve reads to client devices indicated by the read transactions. Other replicas of the range that are not the leaseholder may receive read transactions and route the read transactions to the leaseholder, such that the leaseholder can serve the read based on the read transaction.

"Raft leader" or "leader" generally refers to a replica of the range that is a leader for managing write transactions for a range. In some cases, the leader and the leaseholder are the same replica for a range (e.g., leader is inclusive of leaseholder and/or leaseholder is inclusive of leader). In other cases, the leader and the leaseholder are not the same replica for a range. "Raft leader node" or "leader node" generally refers to a node of the cluster that stores the leader. The leader may determine that a threshold number of the replicas of a range agree to commit a write transaction prior to committing the write transaction. In some cases, the threshold number of the replicas of the range may be a majority of the replicas of the range.

"Follower" generally refers to a replica of the range that is not the leader. "Follower node" may generally refer to a node of the cluster that stores the follower replica. Follower replicas may receive write transactions from the leader replica. The leader replica and the follower replicas of a range may constitute voting replicas that participate in a distributed consensus protocol and included operations (also referred to as "Raft protocol" and "Raft operations") as described herein.

"Raft log" generally refers to a time-ordered log of write transactions to a range, where the log of write transactions includes write transactions agreed to by a threshold number of the replicas of the range. Each replica of a range may include a raft log stored on the node that stores the replica. The leader replica and the follower replicas of a range may constitute voting replicas that participate in a distributed consensus protocol and included operations (also referred to as "Raft protocol" and "Raft operations" as described herein). A raft log for a replica may be stored on persistent storage (e.g., non-volatile storage such as disk storage, solid state drive (SSD) storage, etc.) of the node storing the replica. A raft log may be a source of truth for replication among nodes for a range.

"Consistency" generally refers to causality and the ordering of transactions within a distributed system. Consistency defines rules for operations within the distributed system, such that data stored by the system will remain consistent with respect to read and write operations originating from different sources.

"Consensus" generally refers to a threshold number of replicas for a range, based on receiving a write transaction, acknowledging a write transaction. In some cases, the threshold number of replicas may be a majority of replicas for a range. Consensus may be achieved even if one or more nodes storing replicas of a range are offline, such that the threshold number of replicas for the range can acknowledge the write transaction. Based on achieving consensus, data modified by the write transaction may be stored within the range(s) targeted by the write transaction.

"Replication" generally refers to creating and distributing copies (e.g., replicas) of the data stored by the cluster. In some cases, replication can ensure that replicas of a range remain consistent among the nodes that each comprise a replica of the range. In some cases, replication may be synchronous such that write transactions are acknowledged and/or otherwise propagated to a threshold number of replicas of a range before being considered committed to the range.

"Replication zone" generally refers to replicas of data corresponding to databases, tables, rows, indexes, and cluster data, where replication zones may be used to control the number and the location of replicas stored by a cluster of nodes. Using replication zones, a user may control a number of replicas of each range within the cluster, constraints applied to each range, a maximum size of each range, a duration of time for which data included in a range is kept, a location of a range's leaseholder, location(s) of the range's non-leaseholder replicas, a number of voting replicas and non-voting replicas, and locations of voting replicas and non-voting replicas within the cluster. A "replication zone configuration" may correspond to a configuration of a replication zones for replicas of data corresponding to databases, tables, rows, indexes, and cluster data. Replication zone configurations at the cluster, database, table, index, and row level may correspond to a cluster zone configuration, a database zone configuration, a table zone configuration, an index zone configuration, and a row zone configuration, respectively.

Database Overview

A database stored by a cluster of nodes may operate based on one or more remote procedure calls (RPCs). The database may be comprised of a KV store distributed among the nodes of the cluster. In some cases, the RPCs may be SQL RPCs. In other cases, RPCs based on other programming languages may be used. Nodes of the cluster may receive SQL RPCs from client devices. After receiving SQL RPCs, nodes may convert the SQL RPCs into operations that may operate on the distributed KV store.

In some embodiments, as described herein, the KV store of the database may be comprised of one or more ranges. A range may be a selected storage size. For example, a range may be 512 MiB. Each range may be replicated to more than one node to maintain data survivability. For example, each range may be replicated to at least 3 nodes. By replicating each range to more than one node, if a node fails, replica(s) of the range would still exist on and be available on other nodes such that the range can still be accessed by client devices and replicated to other nodes of the cluster.

In some embodiments, operations directed to KV data as described herein may be executed by one or more transactions. In some cases, a node may receive a read transaction from a client device. A node may receive a write transaction from a client device. In some cases, a node can receive a read transaction or a write transaction from another node of the cluster. For example, a leaseholder node may receive a read transaction from a node that originally received the read transaction from a client device. In some cases, a node can send a read transaction to another node of the cluster. For example, a node that received a read transaction, but cannot serve the read transaction may send the read transaction to the leaseholder node. In some cases, if a node receives a read or write transaction that it cannot directly serve, the node may send and/or otherwise route the transaction to the node that can serve the transaction.

In some embodiments, modifications to the data of a range may rely on a consensus protocol to ensure a threshold number of replicas of the range agree to commit the change. The threshold may be a majority of the replicas of the range. The consensus protocol may enable consistent reads of data stored by a range.

In some embodiments, data may be written to and/or read from a storage device of a node using a storage engine that tracks the timestamp associated with the data. By tracking the timestamp associated with the data, client devices may query for historical data from a specific period of time (e.g., at a specific timestamp). A timestamp associated with a key corresponding to KV data may be assigned by a gateway node that received the transaction that wrote and/or otherwise modified the key. For a transaction that wrote and/or modified the respective key, the gateway node (e.g., the node that initially receives a transaction) may determine and assign a timestamp to the transaction based on time of a clock of the node (e.g., at the timestamp indicated by the clock when the transaction was received by the gateway node). The transaction may assign the timestamp to the KVs that are subject to the transaction. Timestamps may enable tracking of versions of KVs (e.g., through multi-version concurrency control (MVCC) as to be described herein) and may provide guaranteed transactional isolation. In some cases, additional or alternative methods may be used to assign versions and/or timestamps to keys and respective values.

In some embodiments, a "table descriptor" may correspond to each table of the database, where the table descriptor may contain the schema of the table and may include information associated with the table. Each table descriptor may be stored in a "descriptor table", where each version of a table descriptor may be accessed by nodes of a cluster. In some cases, a "descriptor" may correspond to any suitable schema or subset of a schema, where the descriptor may contain the schema or the subset of the schema and may include information associated with the schema (e.g., a state of the schema). Examples of a descriptor may include a table descriptor, type descriptor, database descriptor, and schema descriptor. A view and/or a sequence as described herein may correspond to a table descriptor. Each descriptor may be stored by nodes of a cluster in a normalized or a denormalized form. Each descriptor may be stored in a KV store by nodes of a cluster. In some embodiments, the contents of a descriptor may be encoded as rows in a database (e.g., SQL database) stored by nodes of a cluster. Descriptions for a table descriptor corresponding to a table may be adapted for any suitable descriptor corresponding to any suitable schema (e.g., user-defined schema) or schema element as described herein. In some cases, a database descriptor of a database may include indications of a primary region and one or more other database regions configured for the database.

Database Layers

In some embodiments, database architecture for the cluster of nodes may be comprised of one or more layers. The one or more layers may process received SQL RPCs into actionable processes to access, modify, store, and return data to client devices, while providing for data replication and consistency among nodes of a cluster. The layers may comprise one or more of: a SQL layer, a transactional layer, a distribution layer, a replication layer, and a storage layer.

SQL Layer

In some embodiments, the database architecture for the cluster may include a SQL layer. In some cases, the database may operate using at least some American National Standards Institute (ANSI) defined SQL standards. The SQL layer may operate as an intermediary between client devices and nodes of the cluster. Client devices may interact with and/or otherwise access a database using SQL statements. Client devices may include a SQL application programming interface (API) to communicate with the cluster. SQL statements may reach a node of the cluster via a wire protocol. For example, SQL statements may be sent to a node of the cluster via a PostgreSQL wire protocol. The SQL layer may convert the SQL statements (received from the client devices) to a plan of KV operations. The SQL layer may send the converted KV operations to another layer of the database.

Based on receiving a SQL request from a client device at a node of the cluster, the SQL layer may parse the SQL request in view of the supported syntax of the database. Based on parsing the SQL request, the SQL layer may convert a query of the SQL request into an abstract syntax tree (AST) to create a query plan associated with the SQL request. The AST may be used to generate a query plan based on three phases. In phase 1, the AST may be transformed into a logical query plan, where the SQL layer may perform semantic analysis. In some cases, as a part of semantic analysis, the SQL layer may determine whether the query of the SQL request is valid, resolve names within the query, remove intermediate computations that are determined to be unnecessary, and/or determine data types for intermediate results of the query. In phase 2, the SQL layer may simplify the logical query plan using one or more transformation optimizations. In phase 3, the SQL layer may optimize the logical query plan using a search algorithm, wherein the search algorithm evaluates one or more methods of executing the query and selects the method having the lowest cost. In some cases, the cost may be measured in time. Cost may be determined based on estimating the time each node in the query plan will use to process all results of the query and modeling data flow through the query plan. The result of phase 3 may be an optimized logical query plan.

In some embodiments, based on determining an optimized logical query plan for the SQL request, the SQL layer may determine which nodes of the cluster may be included in execution of the query to generate a physical plan. The SQL layer may determine the nodes to be included in the execution of the query based on locality (e.g., location) information for the range. For example, the SQL layer may distribute the query to nodes located close to the geographic location of the stored data. Based on generating the physical plan, the SQL layer may send the physical plan to one or more nodes for execution.

On each node that received the physical plan, the SQL layer may determine a part of the query. One or more logical processors located at each node may communicate with each other over a logical flow of data to determine one or more results for the query. The results of the query may be combined and sent back to the node where the SQL request was received. Based on receiving the combined results of the query at the node where the SQL request was received, the SQL may send the combined results to the client device.

To execute the query, each processor of a node may require encoded data for the scalar values manipulated by the query. The encoded data may be a binary data that is different from the string data used in the SQL layer. Based on requiring binary data, the contents of the SQL query may be encoded to binary form, such that the binary data may be communicated between logical processors and/or read from a storage device of the node.

In some embodiments, the SQL layer may encode data for use by the lower layers of the database during query execution. The SQL layer may encode data by converting row data (e.g., from a SQL representation as strings) into bytes for use by lower layers of the database. Based on receiving data as bytes (e.g., returned from lower layers after query execution), the SQL layer may convert the bytes into string data, such that the string data may be sent to the client device. In some cases, such byte encoding may preserve the order of the received string data. By storing bytes in the same order as the string data as it was received, the database may efficiently scan for KV data stored in ranges.

In some embodiments, for non-indexed columns of a range, the SQL layer may instead use an encoding method (e.g., value encoding) that requires less storage capacity. Value encoding may not preserve the ordering of the received string data of the SQL query.

Transaction Layer

In some embodiments, the database architecture for a database stored by a cluster (e.g., cluster 102) of nodes may include a transaction layer. The transaction layer may enable atomicity, consistency, isolation, and durability (ACID) semantics for transactions within the database. The transaction layer may receive binary KV operations from the SQL layer and control KV operations sent to a distribution layer. In some cases, a storage layer of the database may use MVCC to maintain multiple versions of keys stored in ranges of the cluster. For example, each key stored in a range may have a stored MVCC history including respective versions of the key, values for the versions of the key, and/or timestamps at which the respective versions were written and/or committed.

In some embodiments, for write transactions, the transaction layer may generate one or more locks. A lock may represent a provisional, uncommitted state for a particular value of a KV pair. The lock may be written as part of the write transaction. The database architecture described herein may include multiple lock types. In some cases, the transactional layer may generate unreplicated locks, which may be stored in an in-memory, lock table (e.g., stored by volatile, non-persistent storage of a node) that is specific to the node storing the replica on which the write transaction executes. An unreplicated lock may not be replicated to other replicas based on a consensus protocol as described herein. In other cases, the transactional layer may generate one or more replicated locks (referred to as "intents" or "write intents"). An intent may be a persistent, provisional value written by a transaction before the transaction commits that is stored in persistent storage (e.g., non-volatile storage such as disk storage, SSD storage, etc.) of nodes of the cluster. Each KV write performed by a transaction is initially an intent, which includes a provisional version and a reference to the transaction's corresponding transaction record. An intent may differ from a committed value by including a pointer to a transaction record of a transaction that wrote the intent. In some cases, the intent functions as an exclusive lock on the KV data of the replica stored on the node on which the write transaction executes, thereby preventing conflicting read and write operations having timestamps greater than or equal to a timestamp corresponding to the intent (e.g., the timestamp assigned to the transaction when the intent was written). An intent may be replicated to other nodes of the cluster storing a replica of the range based on the consensus protocol as described herein. An intent for a particular key may be included in an MVCC history corresponding to the key, such that a reader of the key can distinguish the intent from other versions of committed MVCC values stored in persistent storage for the key.

In some embodiments, each transaction directed to the cluster may have a unique replicated KV pair (referred to as a "transaction record") stored on a range stored by the cluster. The transaction for a record may be added and stored in a replica of a range on which a first operation of the write transaction occurs. The transaction record for a particular transaction may store metadata corresponding to the transaction. The metadata may include an indication of a status of a transaction and a unique identifier (ID) corresponding to the transaction. The status of a transaction may include the following: pending, staging, committed, or aborted. A pending state may indicate that a transaction is in progress. A staging state may be used to enable a parallel commits protocol as to be described herein. A write transaction may or may not be in a committed state during a staging state. A committed state may indicate that the transaction has committed and the write intents written by the transaction have been recorded by follower replicas. An aborted state may indicate the write transaction has been aborted and the values (e.g., values written to the range) associated with the write transaction may be discarded and/or otherwise dropped from the range. As write intents are generated by the transaction layer as a part of a write transaction, the transaction layer may check for newer (e.g., more recent) committed values at the KVs of the range on which the write transaction is operating. If newer committed values exist at the KVs of the range, the write transaction may be restarted. Alternatively, if the write transaction identifies write intents at the KVs of the range, the write transaction may proceed as a transaction conflict as to be described herein. The transaction record may be addressable using the transaction's unique ID, such that requests can query and read a transaction's record using the transaction's ID.

In some embodiments, for read transactions, the transaction layer may execute a read transaction at KVs of a range indicated by the read transaction. The transaction layer may execute the read transaction if the read transaction is not aborted. The read transaction may read multi-version concurrency control (MVCC) values at the KVs of the range as to be described herein in "Storage Layer". Alternatively, the read transaction may read intents written at the KVs, such that the read transaction may proceed as a transaction conflict as to be described herein.

In some embodiments, to commit a write transaction, the transaction layer may determine the transaction record of the write transaction as it executes. The transaction layer may restart the write transaction based on determining the state of the write transaction indicated by the transaction record is aborted. Alternatively, the transaction layer may determine the transaction record to indicate the state as pending or staging. Based on the transaction record indicating the write transaction is in a pending state, the transaction layer may set the transaction record to staging and determine whether the write intents of the write transaction have succeeded (e.g., succeeded by replication to the other nodes of the cluster storing the range). If the write intents have succeeded, the transaction layer may report the commit of the transaction to the client device that initiated the write transaction.

In some embodiments, based on committing a write transaction, the transaction layer may cleanup the committed write transaction. A coordinating node of the cluster of nodes to which the write transaction was directed may cleanup the committed write transaction via the transaction layer. A coordinating node may be a node that stores a replica of a range that is the subject of the transaction. In some cases, a coordinating node may be the gateway node for the transaction. The coordinating node may track a record of the KVs that were the subject of the write transaction. To clean up the transaction, the coordinating node may modify the state of the transaction record for the write transaction from staging to committed. In some cases, the coordinating node may resolve the write intents of the write transaction to MVCC (e.g., committed) values by removing the pointer to the transaction record. Based on removing the pointer to the transaction record for the write transaction, the coordinating node may delete the write intents of the transaction.

In some embodiments, the transaction layer may track timing of transactions (e.g., to maintain serializability). The transaction layer may implement hybrid-logical clocks (HLCs) to track time within the cluster. An HLC may be composed of a physical component (e.g., which may be close to local wall time) and a logical component (e.g., which is used to distinguish between events with the same physical component). HLC time may always be greater than or be equal to the wall time. Each node may include a local HLC.

For a transaction, the gateway node (e.g., the node that initially receives a transaction) may determine a timestamp for the transaction based on HLC time for the node. The transaction layer may enable transaction timestamps based on HLC time. A timestamp within the cluster may be used to track versions of KVs (e.g., through MVCC as to be described herein) and provide guaranteed transactional isolation. A timestamp for a write intent as described herein may be equivalent to the assigned timestamp of a transaction corresponding to the write intent when the write intent was written to storage. A timestamp for a write intent corresponding to a transaction may be less than or equal to a commit timestamp for a transaction. When a timestamp for a write intent is less than a commit timestamp for the transaction that wrote the write intent (e.g., based on advancing the commit timestamp due to a transaction conflict or a most-recent timestamp indicated by a timestamp cache), during asynchronous intent resolution, the committed, MVCC version of the write intent may have its respective timestamp advanced to be equivalent to the commit timestamp of the transaction.

For a transaction, based on a node sending a transaction to another node, the node may include the timestamp generated by the local HLC (e.g., the HLC of the node) with the transaction. Based on receiving a request from another node (e.g., sender node), a node (e.g., receiver node) may inform the local HLC of the timestamp supplied with the transaction by the sender node. In some cases, the receiver node may update the local HLC of the receiver node with the timestamp included in the received transaction. Such a process may ensure that all data read and/or written to a node has a timestamp less than the HLC time at the node. Accordingly, the leaseholder for a range may serve reads for data stored by the leaseholder, where the read transaction that reads the data includes an HLC timestamp greater than HLC timestamp of the MVCC value read by the read transaction (e.g., such that the read occurs after the write).

In some embodiments, to maintain data consistency, the transaction layer may cause a node to crash. A node may crash if the node detects that its local HLC is out of sync with at least half of the other nodes in the cluster. In some cases, out of sync may be defined as 80% of the maximum allowed offset. A maximum allowed offset may be the maximum allowed timestamp difference between nodes of the cluster. In an example, the maximum allowed offset may be 500 ms.

To provide serializability within the cluster, based on a transaction reading a value of a range, the transaction layer may store the transaction operation's timestamp in a timestamp cache stored at the leaseholder replica of the range. For each read operation directed to a range, the timestamp cache may record and include an indication of the latest timestamp (e.g., the timestamp that is the furthest ahead in time) at which value(s) of the range that were read by a read operation of a transaction. Based on execution of a write transaction, the transaction layer may compare the timestamp of the write transaction to the latest timestamp indicated by the timestamp cache. If the timestamp of the write transaction is less than the latest timestamp indicated by the timestamp cache, the transaction layer may attempt to advance the timestamp of the write transaction forward to a later timestamp. In some cases, advancing the timestamp may cause the write transaction to restart in the second phase of the transaction as to be described herein with respect to read refreshing.

As described herein, the SQL layer may convert SQL statements (e.g., received from client devices) to KV operations. KV operations generated from the SQL layer may use a Client Transaction (CT) transactional interface of the transaction layer to interact with the KVs stored by the cluster. The CT transactional interface may include a transaction coordinator. The transaction coordinator may perform one or more operations as a part of the transaction layer. Based on the execution of a transaction, the transaction coordinator may send (e.g., periodically send) "heartbeat" messages to a transaction record for the transaction. These messages may indicate that the transaction should keep executing (e.g., be kept alive). If the transaction coordinator fails to send the "heartbeat" messages, the transaction layer may modify the transaction record for the transaction to an aborted status. The transaction coordinator may track each written KV and/or KV range during the course of a transaction. In some embodiments, the transaction coordinator may clean and/or otherwise clear accumulated transaction operations. The transaction coordinator may clear an accumulated write intent for a write transaction based on the status of the transaction changing to committed or aborted.

As described herein, to track the status of a transaction during execution, the transaction layer writes to a transaction record corresponding to the transaction. Write intents of the transaction may route conflicting transactions to the transaction record based on the pointer to the transaction record included in the write intents, such that the conflicting transaction may determine a status for conflicting write intents as indicated in the transaction record. The transaction layer may write a transaction record to the same range as the first key subject to a transaction. The transaction coordinator may track the first key subject to a transaction. In some cases, the transaction layer may generate the transaction record when one of the following occurs: the write operation commits; the transaction coordinator sends heartbeat messages for the transaction; or an operation forces the transaction to abort. As described herein, a transaction record may have one of the following states: pending, committed, staging, or aborted. In some cases, the transaction record may not exist. If a transaction encounters a write intent, where a transaction record corresponding to the write intent does not exist, the transaction may use the timestamp of the write intent to determine how to proceed with respect to the observed write intent. If the timestamp of the write intent is within a transaction liveness threshold, the write intent may be treated as pending. If the timestamp of the write intent is not within the transaction liveness threshold, the write intent may be treated as aborted. A transaction liveness threshold may be a duration configured based on a time period for sending "heartbeat" messages. For example, the transaction liveness threshold may be a duration lasting for five "heartbeat" message time periods, such that after five missed heartbeat messages, a transaction may be aborted. The transaction record for a committed transaction may remain until each of the write intents of the transaction are converted to committed MVCC values stored on persistent storage of a node.

As described herein, in the transaction layer, values may not be written directly to the storage layer as committed MVCC values during a write transaction. Values may be written in a provisional (e.g., uncommitted) state referred to as a write intent. Write intents may be MVCC values including a pointer to a transaction record to which the MVCC value belongs. Based on interacting with a write intent (instead of a committed MVCC value), an operation may determine the status of the transaction record, such that the operation may determine how to interpret the write intent. As described herein, if a transaction record is not found for a write intent, the operation may determine the timestamp of the write intent to evaluate whether or not the write intent may be considered to be expired.

In some embodiments, based on encountering and/or otherwise interacting with a write intent, an operation may attempt to resolve the write intent. The operation may resolve the write intent based on the state of the write intent identified in the transaction record. For a committed state, the operation may read the write intent and convert the write intent to an MVCC value. The operation may convert the write intent to an MVCC value by removing the write intent's pointer to the transaction record. For an aborted state, the operation may ignore the write intent (e.g., the operation may not read the write intent) and the operation may delete the write intent. For a pending state, a transaction conflict may exist and the transaction conflict may be resolved as to be described herein. For a staging state, the operation may determine whether the staging transaction is still in progress. The operation may determine the transaction is still in progress by verifying that the transaction coordinator is still sending "heartbeat" messages to the transaction record. If the operation verifies the transaction coordinator is sending "heartbeat" messages to the record, the operation should wait. For a record that does not exist, the operation may determine the transaction state to be pending if the write intent was created within a transaction liveness threshold as described herein. If the write intent was not created within a transaction liveness threshold, the operation may determine the write intent to be aborted.

In some embodiments, the transaction layer may include a concurrency manager for concurrency control. The concurrency manager may sequence incoming requests (e.g., from transactions) and may provide isolation between the transactions that issued those requests that intend to perform conflicting operations. This activity may be referred to as concurrency control. The concurrency manager may combine the operations of a latch manager and a lock table to accomplish this work. The latch manager may sequence the incoming requests and may provide isolation between those requests. The lock table may provide locking and sequencing of requests (in combination with the latch manager). The lock table may be a per-node, in-memory (e.g., stored by volatile, non-persistent storage) data structure. The lock table may hold a collection of locks acquired by transactions that are in-progress as to be described herein.

As described herein, the concurrency manager may be a structure that sequences incoming requests and provides isolation between the transactions that issued those requests, where the requests intend to perform conflicting operations. During sequencing, the concurrency manager may identify conflicts. The concurrency manager may resolve conflicts based on passive queuing and/or active pushing. Once a request has been sequenced by the concurrency manager, the request may execute (e.g., without other conflicting requests/operations) based on the isolation provided by the concurrency manager. This isolation may last for the duration of the request. The isolation may terminate based on (e.g., after) completion of the request. Each request in a transaction may be isolated from other requests. Each request may be isolated during the duration of the request, after the request has completed (e.g., based on the request acquiring locks), and/or within the duration of the transaction comprising the request. The concurrency manager may allow transactional requests (e.g., requests originating from transactions) to acquire locks, where the locks may exist for durations longer than the duration of the requests themselves. The locks may extend the duration of the isolation provided over specific keys stored by the cluster to the duration of the transaction. The locks may be released when the transaction commits or aborts. Other requests that encounter and/or otherwise interact with the locks (e.g., while being sequenced) may wait in a queue for the locks to be released. Based on the locks being released, the other requests may proceed. The concurrency manager may include information for external locks (e.g., the write intents)

In some embodiments, one or more locks may not be controlled by the concurrency manager, such that one or more locks may not be discovered during sequencing. As an example, write intents (e.g., replicated, exclusive locks) may be stored such that that may not be detected until request evaluation time. In most embodiments, fairness may be ensured between requests, such that if any two requests conflict, the request that arrived first will be sequenced first. Sequencing may guarantee first-in, first-out (FIFO) semantics. An exception to FIFO semantics is that a request that is part of a transaction which has already acquired a lock may not need to wait on that lock during sequencing. The request may disregard any queue that has formed on the lock. Lock tables as to be described herein may include one or more other exceptions to the FIFO semantics described herein.

In some embodiments, as described herein, a lock table may be a per-node, in-memory data structure. The lock table may store a collection of locks acquired by in-progress transactions. Each lock in the lock table may have an associated lock wait-queue. Conflicting transactions can queue in the associated lock wait-queue based on waiting for the lock to be released. Items in the locally stored lock wait-queue may be propagated as necessary (e.g., via RPC) to an existing Transaction Wait Queue (TWQ). The TWQ may be stored on the leader replica of the range, where the leader replica on which the first write operation of a transaction occurred may contain the transaction record.

As described herein, databases stored by the cluster may be read and written using one or more "requests". A transaction may be composed of one or more requests. Isolation may be needed to separate requests. Additionally, isolation may be needed to separate transactions. Isolation for requests and/or transactions may be accomplished by maintaining multiple versions and/or by allowing requests to acquire locks. Isolation based on multiple versions may require a form of mutual exclusion, such that a read and a conflicting lock acquisition do not occur concurrently. The lock table may provide locking and/or sequencing of requests (in combination with the use of latches).

In some embodiments, locks may last for a longer duration than the requests associated with the locks. Locks may extend the duration of the isolation provided over specific KVs to the duration of the transaction associated with the lock. As described herein, locks may be released when the transaction commits or aborts. Other requests that encounter and/or otherwise interact with the locks (e.g., while being sequenced) may wait in a queue for the locks to be released. Based on the locks being released, the other requests may proceed. In some embodiments, the lock table may enable fairness between requests, such that if two requests conflict, then the request that arrived first may be sequenced first. In some cases, there may be exceptions to the FIFO semantics as described herein. A request that is part of a transaction that has acquired a lock may not need to wait on that lock during sequencing, such that the request may ignore a queue that has formed on the lock. In some embodiments, contending requests that encounter different levels of contention may be sequenced in a non-FIFO order. Such sequencing in a non-FIFO order may enable greater concurrency. As an example, if requests $R_1$ and $R_2$ contend on key $K_2$, but $R_1$ is also waiting at key $K_1$, $R_2$ may be determined to have priority over $R_1$, such that $R_2$ may be executed on $K_2$.

In some embodiments, as described herein, a latch manager may sequence incoming requests and may provide isolation between those requests. The latch manager may sequence and provide isolation to requests under the supervision of the concurrency manager. A latch manager may operate as follows. As write requests occur for a range, a leaseholder of the range may serialize write requests for the range. Serializing the requests may group the requests into a consistent order. To enforce the serialization, the leaseholder may create a "latch" for the keys in the write value, such that a write request may be given uncontested access to the keys. If other requests access the leaseholder for the same set of keys as the previous write request, the other requests may wait for the latch to be released before proceeding. In some cases, read requests may generate latches. Multiple read latches over the same keys may be held concurrently. A read latch and a write latch over the same keys may not be held concurrently.

In some embodiments, the transaction layer may execute transactions at a serializable transaction isolation level. A serializable isolation level may not prevent anomalies in data stored by the cluster. A serializable isolation level may be enforced by requiring the client device to retry transactions if serializability violations are possible.

In some embodiments, the transaction layer may allow for one or more transaction conflict types, where a conflict type may result from a transaction encountering and/or otherwise interacting with a write intent at a key (e.g., at least one key). A write/write transaction conflict may occur when two pending transactions create write intents for the same key. A write/read transaction conflict may occur when a read transaction encounters an existing write intent with a timestamp less than or equal to the timestamp of the read transaction. To resolve the transaction conflict, the transaction layer may proceed through one or more operations. Based on a transaction within the transaction conflict having a defined transaction priority (e.g., high priority, low priority, etc.), the transaction layer may abort the transaction with lower priority (e.g., in a write/write conflict) or advance the timestamp of the transaction having a lower priority (e.g., in a write/read conflict). Based on a transaction within the conflicting transactions being expired, the expired transaction may be aborted. A transaction may be considered to be expired if the transaction does not have a transaction record and/or the timestamp for the transaction is outside of the transaction liveness threshold. A transaction may be considered to be expired if the transaction record corresponding to the transaction has not received a "heartbeat" message from the transaction coordinator within the transaction liveness threshold. A transaction (e.g., a low priority transaction) that is required to wait on a conflicting transaction may enter the TWQ as described herein.

In some embodiments, the transaction layer may allow for one or more additional conflict types that do not involve write intents. A write after read conflict may occur when a write transaction having a lower timestamp conflicts with a read transaction having a higher timestamp. The timestamp of the write transaction may advance past the timestamp of the read transaction, such that the write transaction may execute. A read within an uncertainty window may occur when a read transaction encounters a KV with a higher timestamp and there exists ambiguity whether the KV should be considered to be in the future or in the past of the read transaction. An uncertainty window may be configured based on the maximum allowed offset between the clocks (e.g., HLCs) of any two nodes within the cluster. In an example, the uncertainty window may be equivalent to the maximum allowed offset. A read within an uncertainty window may occur based on clock skew. The transaction layer may advance the timestamp of the read transaction past the timestamp of the KV according to read refreshing as to be described herein. If the read transaction associated with a read within an uncertainty window has to be restarted, the read transaction may never encounter an uncertainty window on any node which was previously visited by the read transaction. In some cases, there may not exist an uncertainty window for KVs read from the gateway node of the read transaction.

In some embodiments, as described herein, the TWQ may track all transactions that could not advance another blocking, ongoing transaction that wrote write intents observed by the tracked transactions. The transactions tracked by the TWQ may be queued and may wait for the blocking transaction to complete before the transaction can proceed to execute. The structure of the TWQ may map a blocking transaction to the one or more other transactions that are blocked by the blocking transaction via the respective unique IDs corresponding to each of the transactions. The TWQ may operate on the leader replica of a range, where the leader replica includes the transaction record based on being subject to the first write operation included in the blocking, ongoing transaction. Based on a blocking transaction resolving (e.g., by committing or aborting), an indication may be sent to the TWQ that indicates the queued transactions blocked by the blocking transaction may begin to execute. A blocked transaction (e.g., a transaction blocked by a blocking transaction) may examine their transaction status to determine whether they are active. If the transaction status for the blocked transaction indicates the blocked transaction is aborted, the blocked transaction may be removed by the transaction layer. In some cases, deadlock may occur between transactions, where a first transaction may be blocked by second write intents of a second transaction and the second transaction may be blocked by first write intents of the first transaction. If transactions are deadlocked (e.g., blocked on write intents of another transaction), one transaction of the deadlocked transactions may randomly abort, such that the active (e.g., alive) transaction may execute and the deadlock may be removed. A deadlock detection mechanism may identify whether transactions are deadlocked and may cause one of the deadlocked transactions to abort.

In some embodiments, the transaction layer may enable read refreshing. When a timestamp of a transaction has been advanced to a later timestamp, additional considerations may be required before the transaction may commit at the advanced timestamp. The considerations may include checking KVs previously read by the transaction to verify that other write transactions have not occurred at the KVs between the original transaction timestamp and the advanced transaction timestamp. This consideration may prevent serializability violations. The check may be executed by tracking each read using a Refresh Request (RR). If the check succeeds (e.g., write transactions have not occurred between the original transaction timestamp and the advanced transaction timestamp), the transaction may be allowed to commit at the advanced timestamp. A transaction may perform the check at a commit time if the transaction was advanced by a different transaction or by the timestamp cache. A transaction may perform the check based on encountering a read within an uncertainty interval. If the check is unsuccessful, then the transaction may be retried at the advanced timestamp.

In some embodiments, the transaction layer may enable transaction pipelining. Write transactions may be pipelined when being replicated to follower replicas and when being written to storage. Transaction pipelining may reduce the latency of transactions that perform multiple writes. In transaction pipelining, write intents may be replicated from leaseholders (e.g., combined leaseholder and leader replicas) to follower replicas in parallel, such that waiting for a commit occurs at transaction commit time. Transaction pipelining may include one or more operations. In transaction pipelining, for each received statement (e.g., operation) of the transaction, the gateway node corresponding to the transaction may communicate with the leaseholders ($L_1$, $L_2$, $L_3$, . . . , $L_i$) for the range(s) indicated by the transaction. Each leaseholder $L_i$ may receive the communication from the gateway node and may perform one or more operations in parallel. Each leaseholder $L_i$ may (i) create write intents and (ii) send the write intents to corresponding follower nodes for the leaseholder $L_i$. After sending the write intents to the corresponding follower nodes, each leaseholder $L_i$ may send an indication to the gateway node that the write intents have been sent. Replication of the intents may be referred to as "in-flight" once the leaseholder $L_i$ sends the write intents to the follower replicas. Before committing the transaction (e.g., by updating the transaction record for the transaction via a transaction coordinator), the gateway node may wait for the write intents to be replicated in parallel to each of the follower nodes of the leaseholders. Based on receiving responses from the leaseholders that the write intents have propagated to the follower nodes, the gateway node may commit the transaction by causing an update to the status of the transaction record of the transaction.

In some embodiments, the transaction layer may enable parallel commits. Parallel commits may be an atomic commit protocol that reduces the commit latency of a transaction (e.g., in half, from two rounds of consensus down to one). In some cases, the latency incurred by transactions may be substantially close to the sum of all read latencies plus one round of consensus latency. For parallel commits, a transaction coordinator may return a commit acknowledgment to a client device based on determining the writes in the transaction have succeeded. Based on determining the writes in the transaction have succeeded, the transaction coordinator may set the state of the transaction record state to committed and resolve the write intents of the transaction (e.g., asynchronously).

In some embodiments, a parallel commits protocol may occur based on one or more operations. A client device may initiate a write transaction. A transaction coordinator may be created by the transaction layer to manage the state of the write transaction. The client device may issue a write to a key "Alpha" of a range. The transaction coordinator may generate a write intent on the "Alpha" key where the data from the write will be written. The write intent may include a timestamp and a pointer to a currently nonexistent transaction record for the write. Each write intent in the write transaction may be assigned a unique sequence number. The unique sequence number may uniquely identify the write intent. The client device may issue a write to a key "Beta" of the range as a part of the same write transaction as the write to the "Alpha" key. The transaction coordinator may generate a write intent on the "Beta" key where the data from the write transaction will be written. The write intent may include a timestamp and a pointer to the same nonexistent transaction record as for the "Alpha" key, based on each write intent being a part of the same transaction. The client device may issue a request to commit the writes for the write transaction. The transaction coordinator may create the transaction record and may set the state of the transaction record to staging. The transaction coordinator may record the keys of each write being executed by replicas among the range. Based on receiving the commit request from the client device, the transaction coordinator may wait for the pending rights to be replicated across the cluster. Based on the pending writes being replicated, the transaction coordinator may return indication to the client device that the transaction was committed successfully.

In some embodiments, the write transaction may be considered atomically committed while the state of the corresponding transaction record is staging. A transaction may be considered to be committed (e.g., atomically committed) based on one or more logically equivalent states. A logically equivalent state may include the state of the transaction record being staging and successful replication of writes across the cluster (e.g., according to consensus). Transactions in such a state may be considered implicitly committed. A logically committed state may include the state of the transaction record being committed. Transactions in such a state may be considered explicitly committed. For an implicitly committed state, the transaction coordinator may modify the state of the transaction record from staging to committed, such that other transactions do not encounter the transaction in the staging state (e.g., due to being time intensive).

In some embodiments, a transaction in the transaction layer may be considered to be a child transaction of a second transaction. A child transaction's parent may itself be a child of a third transaction. The second transaction, the third transaction may be considered to be an ancestor of the child transaction. All ancestor transactions of a transaction's ancestors may be considered to be an ancestor also of the transaction. Any transaction which has a second transaction as its ancestor may be considered a descendent of the second transaction.

In some embodiments, a child transaction may commit or abort independently and prior to its ancestors. In some embodiments, ancestors may commit at a timestamp which does not precede the commit timestamp of any of the transaction's descendent transactions. In some embodiments, a parent transaction may not perform operations while it has an active child which may be performing operations.

In some embodiments, a descendent transaction may interact with the concurrency control mechanisms of the transaction layer (e.g., the concurrency manager), in ways which expose weaker isolation properties than the behavior those mechanisms enforce between transactions without an ancestor-descendent relationship. In some embodiments, the descendent transaction may bypass locks held by an ancestor transaction as though they were acting as the ancestor transaction. In some embodiments, the child transaction may be configured to read uncommitted intents written by an ancestor transaction. In some embodiments, the child transaction may be configured such that it is not allowed to read any intents written by an ancestor transaction. In some embodiments, the child transaction may not be permitted to write to any key which was previously read by any of its ancestor transactions.

Distribution Layer

In some embodiments, the database architecture for the cluster may include a distribution layer. The distribution layer may provide a unified view of the data stored by the cluster. To enable the ability to access data stored by the cluster from any single node of the cluster, the distribution layer may enable storage of data in a monolithic sorted map of KV pairs. As described herein, the key-space comprising the sorted map of KV pairs may be divided into one or more contiguous chunks, referred to as ranges, such that every key may be located in a single range of the sorted map. The sorted map may enable simple lookups and efficient scans for data stored by the cluster. Simple lookups may be enabled based on the ability to identify nodes responsible for certain portions (e.g., ranges) of data. Efficient scans may be enabled based on the defining the order of data within ranges. The distribution layer may receive requests (e.g., transactions) from the transaction layer on the same node. The distribution layer may identify which node should receive the request (from the transaction layer) and send the request to the replication layer of the node corresponding to the request.

In some embodiments, the monolithic sorted map structure of the distribution layer may be comprised of two fundamental elements. A first fundamental element may be system data, where system data includes meta ranges that describe the location of user data (e.g., client data) within the cluster. A second fundamental element may be user data, where user data is the client data stored by the cluster for access via one or more client devices.

In some embodiments, the location of each range stored by the cluster may be stored in one or more meta ranges. A meta range may be a two-level index at the beginning of the key-space, where the first level (referred to as "meta1") may address the second level, and the second level (referred to as "meta2") may address user data stored by the cluster. Each node of the cluster may include information indicative of the location of the meta1 range (referred to as a range descriptor for the cluster). In some cases, the meta range may not be split by exceeding a threshold storage size (e.g., in contrast to other ranges stored by the cluster). Otherwise, in most embodiments, meta ranges may be configured as ranges as described herein and may be replicated and/or otherwise accessed as KV data (e.g., user data) stored by the cluster.

In some embodiments, to optimize data access, each node of the cluster may cache values of the meta2 range that were previously accessed by the node, which may optimize access to meta2 range data. Based on determining that a meta2 cache is invalid for a KV, the node may update the meta2 cache by performing a read transaction on the corresponding meta2 range.

In some embodiments, user data may be stored after and/or otherwise below the meta ranges (e.g., the meta1 range and meta2 range) in each node of the cluster. User data may also be referred to as "table data". Each table and secondary indexes (of user data) may initially be mapped to a single range. The single range may be the initial mapping for the user data based on the user data being below a threshold storage size for a range. In some cases, the threshold storage size may be 512 MiB as described herein. Each key in a range may represent a single row of a table or a single row of a secondary index. Each key in a range representing a single row of a table may be referred to as a primary index based on the table being sorted by a primary key. Based on exceeding a threshold storage size, a range may split into two ranges. Ranges as described herein may be replicated (by a replication layer as to be described herein), with addresses of each replicated range stored in a meta2 range.

In some embodiments, based on receiving a request (e.g., a read transaction, a write transaction, etc.), a node may determine where the request should be routed (e.g., which node of the cluster the request should be routed to). The node may compare key(s) indicated by the request to keys stored by the meta2 range to determine a node to which the route the request. The node may route the request to a node that stores the keys indicated by the request. If the node has cached a subset of the meta2 range corresponding to the key(s) indicated by the request, the node may compare the key(s) indicated by the request to the cached meta2 range. Alternatively, If the node has not cached a subset of the meta2 range corresponding to the key(s) indicated by the request, the node may send an RPC to the node including the meta2 range. Based on determining the node storing the key(s) indicated by the request, the node may send the KV operations of the request to the node storing the key(s) indicated by the request.

In some embodiments, the distribution layer may include communication software (e.g., gRPC) that enables communication between one or more nodes of the cluster. The communication software may require inputs and outputs to be formatted as protocol buffers. KV operation requests may be included and/or otherwise incorporated into protocol buffers, where a KV operation requests included in a protocol buffer may be referred to as a Batch Request. The destination of the Batch Request may be identified in a header of the Batch Request and/or in a pointer to the transaction record corresponding to the request(s) included in the Batch Request. A Batch Request may be used to send requests between nodes of the cluster. A response to a Batch Request may be included in a protocol buffer referred to as a Batch Response.

In some embodiments, the distribution layer may include a Distribution Sender (DistSender). A DistSender of a gateway and/or coordinating node may receive Batch Requests from a transaction coordinator of the same node. The DistSender may separate Batch Requests into one or more separated Batch Requests. The one or more separated Batch Requests may be routed by the DistSender to the nodes that contain the keys indicated by the separated Batch Requests. The DistSender may determine the nodes based on the meta2 ranges stored on the gateway node. The DistSender may send the Batch Requests to the leaseholder(s) for the keys indicated by the Batch Requests based on the cached meta2 ranges. In some cases, the DistSender may send the Batch Requests to other replicas of ranges for the keys indicated by the Batch Requests based on the proximity of the replicas to the gateway node. Batch Requests received by non-leaseholder replicas may reply to the Batch Requests with an error including an indication of the last-known leaseholder for the range known the replica. Based on received Batch Responses to Batch Requests, the DistSender may aggregate the responses (e.g., to prepare the responses for a return to the client).

In some embodiments, as described herein, the meta ranges may be structured as KV pairs. The meta1 range and the meta2 range may be structurally similar. The meta1 range may include the addresses of nodes within the cluster that include replicas of the meta2 range. The meta2 range may include addresses for the nodes that include replicas of each range stored by the cluster. KV data stored by ranges may include a table identifier, an index identifier, and an indexed column value. Each range stored by a cluster may include metadata. The metadata for a particular range may be referred to as a range descriptor. Each range descriptor may include a sequential range identifier, the key space (e.g., the set of keys) included in the range, and addresses of nodes that store replicas of the range. The key space included in the range as described herein may determine the keys of the meta2 range. The addresses of nodes that store the replica of the range as described herein may determine the values for the keys of the meta2 range. A range descriptor may be updated based on one or more instances. The one or more instances may include a membership change to a consensus group for a range, a range merge, and/or a range split. Updates to a range descriptor may occur locally at a node and may propagate to the meta2 range. As described herein, a range split may occur when a range reaches and/or exceeds a threshold size. In an example, the threshold size for a range may be 512 MiB. Based on reaching or exceeding the threshold size, a range may be split into two ranges. The node that includes the split ranges may create a new consensus (e.g., Raft) group that include the nodes that were included in the previous consensus group before the range was split into two ranges. The distribution layer may generate a transaction for the meta2 range, where the transaction may be configured to update the meta2 range with the updated key space boundaries and the addresses of the nodes using the range descriptor.

Replication Layer

In some embodiments, the database architecture for the cluster may include a replication layer. The replication layer may copy data (e.g., ranges) between nodes of the cluster and enable consistency between the copied data based on a consensus protocol as described herein. The replication layer may allow the cluster to tolerate a subset of nodes going offline and/or otherwise being unavailable, such that the range data stored by the cluster is still available to client devices. The replication layer may receive requests from the distribution layer (e.g., from the DistSender as described herein). The replication layer may send responses (e.g., Batch Responses) to the distribution layer (e.g., the DistSender). In the replication layer, if the node receiving a request is the leaseholder for the range, the node may accept the request. If the node receiving a request is not the leaseholder for the range, the node may return an error to the source of the request, where the error may include an indication of a pointer to the leaseholder (or node last known to be the leaseholder). The KV requests may be converted to Raft commands. The replication layer may write accepted requests to a storage layer as to be described herein. Committed Raft commands may be written to the Raft log and stored on a storage medium of a node via the storage layer. The leaseholder may serve reads from the storage layer.

In some embodiments, the replication layer may apply a consensus protocol. The consensus protocol may require a threshold number (e.g., a quorum or a majority) of replicas of a range to confirm a modification (e.g., a write transaction) to the range prior to committing the modification. Based on the consensus protocol, the replication layer may require at least 3 nodes to include a replica of a range, such that a threshold number of replicas may agree to a modification to the range. In some cases, if the threshold number of replicas required to confirm a modification is a majority of the replicas, the replication layer may enable the database to tolerate a number of node failures as described by Equation 1:

$$\text{Tolerable Node Failures} = \frac{\text{Replication Factor} - 1}{2} \qquad \text{Equation 1}$$

As described in Equation 1, a "Replication Factor" may be a number of replicas of a range stored by the cluster. For example, based on a "Replication Factor" equal to 5, the replication layer may tolerate node failure for two nodes of a cluster, where the failed nodes each store a replica of a range and three other nodes that are online store replicas of the range. In some cases, the "Replication Factor" may be configured at the cluster, database, and/or table level, where a cluster may comprise one or more databases and a database may comprise one or more ranges distributed among the nodes of the cluster.

In some embodiments, as described herein, the replication layer may include a consensus protocol (referred to as Raft). Raft may be an algorithm (e.g., distributed consensus algorithm) that stores data among one or more nodes of the cluster, such that the nodes may approve of the state of the data based on reaching consensus. Raft may organize the nodes storing a replica of a range in a group referred to as a Raft group as described herein. Each replica of a Raft group may be classified as a leader replica or a follower replica as described herein. The leader replica may coordinate writes to the follower replicas of the Raft group. The leader replica may send "heartbeat" messages to the follower replicas (e.g., periodically). The leader replica may be elected by follower replicas as to be described herein. Based on the absence of "heartbeat" messages from the leader replica, follower replicas may become candidates for the leader replica. Based on receiving a Batch Request for a range, a node may convert the KV operations indicated by the Batch Request into one or more Raft commands. The node may send the Raft commands to the Raft leader (e.g., if the node that received the Batch Request is not the leader replica). Based on receiving the Raft commands, the leader node may write the Raft commands to the Raft log as to be described herein.

In some embodiments, based on a threshold (e.g., a majority) of nodes writing a transaction and the writes being committed by the leader replica, the writes may be appended to the Raft log as described herein. The Raft log may be an ordered set of commands agreed on by a threshold number of replicas of the range. The Raft log may be a source of truth for consistent replication among nodes of the cluster. In some cases, each replica can be "snapshotted", such that a copy of the data stored by the replica may be generated for a specific applied log index. This copy of the data (e.g., a snapshot) may be sent to other nodes during a rebalance event to enable and/or expedite replication. A rebalance event may update data stored by a node to a specific log index based on the snapshot. Based on loading the snapshot, a node may be updated based on executing operations (e.g., indicated by the Raft log) that have occurred since the snapshot was taken.

In some embodiments, as described herein, a single node in the Raft group may be configured as the leaseholder. The leaseholder may be the only node that can serve reads to a client device or propose writes to the Raft group leader (e.g., both actions may be received as Batch Requests from DistSender as described herein with respect to "Distribution Layer"). When serving reads, the leaseholder may bypass the Raft protocol. The leaseholder may bypass the Raft protocol based on the consensus previously achieved for the values stored by the range. In most embodiments, the leaseholder and the leader replica may be the same replica stored on a node of the range, such that write requests may be proposed directly to the leaseholder/leader replica. The replication layer may attempt to collocate the leaseholder and leader replica during each lease renewal or transfer. If a leaseholder is not configured for a range, any node receiving a request may send a request to become the leaseholder for the range. The request may be sent to each replica to reach consensus. A node that sends a request to become the leaseholder may include a copy of the last valid lease stored by the node. If the last valid lease is equivalent to the current configured leaseholder, the request may be granted by a replica in response to receiving the request. Alternatively, if the last valid lease is not equivalent to the current configured leaseholder, the request may be ignored and/or otherwise denied by a replica.

In some embodiments, to manage leases for table data, the replication layer may use "epochs". An epoch may be a period between a node joining a cluster and a node disconnecting from a cluster. To extend a lease (e.g., to remain leaseholder for a range), each node must periodically update a liveness record corresponding to the node. The liveness record may be stored on a system range key. Based on disconnecting from the cluster, a node may fail to update the liveness record. An epoch may be considered to be changed based on a node disconnecting from the cluster and/or failing to update the liveness record. The replication layer may cause a leaseholder node to lose the lease for a range based on the leaseholder node disconnecting from the cluster. In some cases, a leaseholder may not be required to renew a lease for a range. The leaseholder may lose the lease for a range based on disconnecting from the cluster.

In some embodiments, as described herein, meta ranges and/or system ranges may be stored as KV data. System ranges may be restricted from epoch-based leases. System ranges may use expiration-based leases. An expiration-based lease may expire at (or substantially close to) a timestamp. In some cases, a leaseholder for a system range may retain the expiration-based lease after the timestamp at which the expiration-based lease was configured to expire. The leaseholder for the system range may retain the expiration-based lease based on the leaseholder continuing to generate and/or otherwise propose Raft commands to a Raft group.

In some embodiments, the replication layer may enable leaseholder rebalancing. Each leaseholder for a cluster may consider (e.g., periodically consider) whether to transfer the lease to another replica of the range. In an example, a leaseholder may periodically determine whether to transfer the lease to another replica of the range every 10 minutes. Each leaseholder may be configured to transfer the lease for a range based on the number of requests from each locality (e.g., region) for the range, the number of leases on each node comprising the range, and/or the latency between localities. If replicas for a range are distributed among different localities, the replication layer may determine which replica of the cluster is optimized to be the leaseholder. In some cases, a replica may be suited to be the leaseholder based on providing the lowest latency to requests from client devices.

For leaseholder rebalancing, a leaseholder may track the number of requests received by the leaseholder from each locality of the cluster. The number of requests received by the leaseholder from each locality of the cluster may be tracked as an average (e.g., an exponentially weighted moving average). The average may determine the localities that most frequently send requests to the range. In some cases, for an exponentially weighted moving average, the locality that has recently requested the range most often may be assigned the greatest weight. Based on another locality requesting the range frequently, the moving average may cause the locality to be assigned the greatest weight.

For leaseholder rebalancing, the leaseholder may correlate each requesting locality's weight (e.g., the proportion of recent requests) to the locality of each replica by determining a similarity (e.g., similarity between country and/or region) between localities. For example, if the leaseholder received requests from gateway nodes in a region defined as the Central United States (e.g., Country=United States, Region=Central), the replication layer (or leaseholder) may assign the following weights to replicas as described in Table 1 as follows:

TABLE 1

| Replica # | Replica Locality | Replica Leaseholder Rebalancing Weight |
| --- | --- | --- |
| 1 | Country = United States, Region = Central | 100% |
| 2 | Country = United States, Region = East | 50% |
| 3 | Country = Australia, Region = Central | 0% |

As shown in Table 1, the "Replica #" of 1, with a "Replica Locality" of the Central United States may be configured as 100% for "Replica Leaseholder Rebalancing Weight" based on having a match (e.g., a complete match) to the Country and the Region of the "Replica Locality". The "Replica #" 2, with a "Replica Locality" of the East United States may be configured as 50% for "Replica Leaseholder Rebalancing Weight" based on having a match (e.g., a partial match) to the Country of the "Replica Locality". The "Replica #" 3, with a "Replica Locality" of Central Australia may be configured as 0% for "Replica Leaseholder Rebalancing Weight" based on lacking a match with the Country and the Region of the "Replica Locality". Based on the assignment of rebalancing weights to the replicas of the range, the leaseholder may determine a rebalancing weight and latency corresponding to the leaseholder. The rebalancing weight and latency may be compared to the rebalancing weight and latency corresponding to the other replicas (e.g., as shown in Table 1) to determine an adjustment factor for each replica. In an example, the greater the disparity between weights and the larger the latency between localities, the more the replication layer may favor the node including the replica from the locality with the larger weight.

For leaseholder rebalancing, the leaseholder may evaluate each replica's rebalancing weight and adjustment factor for the localities with the largest weights. The leaseholder may transfer the lease to another replica (e.g., of the node having the largest weight and/or adjustment factor). The leaseholder may transfer the lease to the replica if transferring the lease is beneficial and/or viable.

In some embodiments, based on a change to the number of nodes of a cluster, replicas for a range may require rebalancing. The replicas may require rebalancing based on changing of the members of a Raft group (e.g., due to the change to the number of nodes of a cluster). Rebalancing may enable optimal survivability and performance. Rebalancing may vary based on whether nodes are added to the cluster or removed from the cluster for the change to the number of nodes of the cluster. Based on nodes being added to the cluster, the added node(s) may communicate identifying information to the existing nodes of the cluster. The identifying information may include an indication that the added node(s) have available storage capacity. The cluster may rebalance replicas stored by the existing nodes to the added node(s). A node may be removed from a Raft group of a cluster based on a lack of a response to the Raft group after a period of time. In an example, the period of time may be 5 minutes. Based on nodes being removed from the cluster (e.g., due to a lack of a response to the Raft group), nodes of the cluster may rebalance data stored by the removed node(s) to the remaining nodes of the cluster. Rebalancing may be enabled based on using a snapshot of a replica from the leaseholder. The snapshot may be sent to another node (e.g., over gRPC as described herein). Based on receiving and/or replicating the snapshot, the node with a replica (e.g., a replicated replica from the snapshot) may join the Raft group of the range corresponding to the replica. The node may determine the index of the added replica to lag one or more entries (e.g., the most recent entries) in the Raft log. The node may execute the actions indicated in the Raft log to update the replica to the state indicated by the most recent index of the Raft log. In some cases, replicas may be rebalanced based on the relative load stored by the nodes within a cluster.

Storage Layer

In some embodiments, the database architecture for the cluster may include a storage layer. The storage layer may enable the cluster to read and write data to storage device(s) of each node. As described herein, data may be stored as KV pairs on the storage device(s) using a storage engine. In some cases, the storage engine may be a Pebble storage engine. The storage layer may serve successful read transactions and write transactions from the replication layer.

In some embodiments, each node of the cluster may include at least one store, which may be specified when a node is activated and/or otherwise added to a cluster. Read transactions and write transactions may be processed from the store. Each store may contain two instances of the storage engine as described herein. A first instance of the storage engine may store temporary distributed SQL data. A second instance of the storage engine may store data other than the temporary distributed SQL data, including system data (e.g., meta ranges) and user data (e.g., table data, client data, etc.). For each node, a block cache may be shared between each store of the node. The store(s) of a node may store a collection of replicas of a range as described herein, where a particular replica may not be replicated among stores of the same node (or the same node), such that a replica may only exist once at a node.

In some embodiments, as described herein, the storage layer may use an embedded KV data store (e.g., Pebble). The KV data store may be used with an application programming interface (API) to read and write data to storage devices (e.g., persistent storage devices) of nodes of the cluster. The KV data store may enable atomic write batches and snapshots.

In some embodiments, the storage layer may use MVCC to enable concurrent requests. In some cases, the use of MVCC by the storage layer may guarantee consistency for the cluster. As described herein, HLC timestamps may be used to differentiate between different versions of data by tracking commit timestamps for data. HLC timestamps may be used to identify a garbage collection expiration for a value as to be described herein. In some cases, the storage layer may support time travel queries (e.g., queries directed to MVCC versions of keys at previous timestamps). Time travel queries may be enabled by MVCC versions of keys.

In some embodiments, the storage layer may aggregate MVCC values (e.g., garbage collect MVCC values) to reduce the storage size of the data stored by the storage (e.g., the disk) of nodes. The storage layer may compact MVCC values (e.g., old MVCC values) based on the existence of a newer MVCC value with a timestamp that is older than a garbage collection period. A garbage collection period may be configured for the cluster, database, and/or table. Garbage collection may be executed for MVCC values that are not configured with a protected timestamp. A protected timestamp subsystem may ensure safety for operations that rely on historical data. Operations that may rely on historical data may include imports, backups, streaming data using change feeds, and/or online schema changes. Protected timestamps may operate based on generation of protection records by the storage layer. Protection records may be stored in an internal system table. In an example, a long-running job (e.g., such as a backup) may protect data at a certain timestamp from being garbage collected by generating a protection record associated with that data and timestamp. Based on successful creation of a protection record, the MVCC values for the specified data at timestamps less than or equal to the protected timestamp may not be garbage collected. When the job (e.g., the backup) that generated the protection record is complete, the job may remove the protection record from the data. Based on removal of the protection record, the garbage collector may operate on the formerly protected data.

Database Architecture

Referring to FIG. 1, an illustrative distributed computing system 100 is presented. The computing system 100 may include a cluster 102. In some cases, the computing system may include one or more additional clusters 102. The cluster 102 may include one or more nodes 120 distributed among one or more geographic regions 110. The geographic regions 110 may correspond to cluster regions and database regions as described herein. A node 120 may be a computing device. In some cases, a node 120 may include at least portions of the computing system as described herein with respect to FIG. 3. As an example, a node 120 may be a server computing device. A region 110 may correspond to a particular building (e.g., a data center), city, state/province, country, geographic region, and/or a subset of any one of the above. A region 110 may include multiple elements, such as a country and a geographic identifier for the country. For example, a region 110 may be indicated by Country=United States and Region=Central (e.g., as shown in Table 1), which may indicate a region 110 as the Central United States. As shown in FIG. 1, the cluster 102 may include regions 110a, 110b, and 110c. In some cases, the cluster 102 may include one region 110. In an example, the region 110a may be the Eastern United States, the region 110b may be the Central United States, and the region 110c may be the Western United States. Each region 110 of the cluster 102 may include one or more nodes 120. In some cases, a region 110 may not include any nodes 120. The region 110a may include nodes 120a, 120b, and 120c. The region 110b may include the nodes 120d, 120e, and 120f. The region 110c may include nodes 120g, 120h, and 120i.

Each node 120 of the cluster 102 may be communicatively coupled via one or more networks 112 and 114. In some cases, the cluster 102 may include networks 112a, 112b, and 112c, as well as networks 114a, 114b, 114c, and 114d. The networks 112 may include a local area network (LAN), a wide area network (WAN), and/or any other suitable network. In some cases, the one or more networks 112 may connect nodes 120 of different regions 110. The nodes 120 of region 110a may be connected to the nodes 120 of region 110b via a network 112a. The nodes 120 of region 110a may be connected to the nodes 120 of region 110c via a network 112b. The nodes 120 of region 110b may be connected to the nodes 120 of region 110c via a network 112c. The networks 114 may include a LAN, WAN, and/or any other suitable network. In some cases, the networks 114 may connect nodes 120 within a region 110. The nodes 120a, 120b, and 120c of the region 110a may be interconnected via a network 114a. The nodes 120d, 120e, and 120f of the region 110b may be interconnected via a network 114b. In some cases, the nodes 120 within a region 110 may be connected via one or more different networks 114. The node 120g of the region 110c may be connected to nodes 120h and 120i via a network 114c, while nodes 120h and 120i may be connected via a network 114d. In some cases, the nodes 120 of a region 110 may be located in different geographic locations within the region 110. For example, if region 110a is the Eastern United States, nodes 120a and 120b may be located in New York, while node 120c may be located in Massachusetts.

In some embodiments, the computing system 100 may include one or more client devices 106. The one or more client devices 106 may include one or more computing devices In some cases, the one or more client devices 106 may each include at least portions of the computing system as described herein with respect to FIG. 3. In an example, the one or more client devices 106 may include laptop computing devices, desktop computing devices, mobile computing devices, tablet computing devices, and/or server computing device. As shown in FIG. 1, the computing system 100 may include client devices 106a, 106b, and one or more client devices 106 up to client device 106N, where N is any suitable number of client devices 106 included in the computing system 100. The client devices 106 may be communicatively coupled to the cluster 102, such that the client devices 106 may access and/or otherwise communicate with the nodes 120. One or more networks 111 may couple the client devices 106 the nodes 120. The one or more networks 111 may include a LAN, a WAN, and/or any other suitable network as described herein. As an example, the client devices 106 may communicate with the nodes 120 via a SQL client operating at each respective client device 106. To access and/or otherwise interact with the data stored by the cluster 102, a client device 106 may communicate with a gateway node, which may be a node 120 of the cluster that is closest (e.g., by latency, geographic proximity, and/or any other suitable indication of closeness) to the client device 106. The gateway node may route communications between a client device 106 and any other node 120 of the cluster.

Transaction Execution

In some embodiments, as described herein, distributed transactional databases stored by the cluster of nodes may enable one or more transactional operations. Each transaction may include one or more requests (e.g., queries) directed to performing one or more operations. In some cases, a request may be a query (e.g., a SQL query). A request may traverse one or more nodes of a cluster to execute the request. A request may interact with (e.g., sequentially interact with) one or more of the following: a SQL client, a load balancer, a gateway, a leaseholder, and/or a Raft Leader as described herein. A SQL client may send a request (e.g., query) to a cluster. The request may be included in a transaction, where the transaction is a read and/or a write transaction as described herein. A load balancer may route the request from the SQL client to the nodes of the cluster. A gateway node may be a node that initially receives the request and/or sends a response to the SQL client. A leaseholder may be a node that serves reads and coordinates writes for a range of keys (e.g., keys indicated in the request) as described herein. A Raft leader may be a node that maintains consensus among the replicas for a range.

A SQL client (e.g., operating at a client device 106a) may send a request (e.g., a SQL request) to a cluster (e.g., cluster 102). The request may be sent over a network (e.g., the network 111). A load balancer may determine a node of the cluster to which to send the request. The node may be a node of the cluster having the lowest latency and/or having the closest geographic location to the computing device on which the SQL client is operating. A gateway node (e.g., node 120a) may receive the request from the load balancer. The gateway node may parse the request to determine whether the request is valid. The request may be valid based on conforming to the syntax (e.g., SQL syntax) of the database(s) stored by the cluster. An optimizer operating at the gateway node may generate a number of logically equivalent query plans based on the received request. Each query plan may correspond to a physical operation tree configured to be executed for the query. The optimizer may select an optimal query plan from the number of query plans (e.g., based on a cost model). Based on the completion of request planning, a query execution engine may execute the selected, optimal query plan using a transaction coordinator as described herein. A transaction coordinator operating on a gateway node may perform one or more operations as a part of the transaction layer. The transaction coordinator may perform KV operations on a database stored by the cluster. The transaction coordinator may account for keys indicated and/or otherwise involved in a transaction. The transaction coordinator may package KV operations into a Batch Request as described herein, where the Batch Request may be forwarded on to a Distribution Sender (DistSender) operating on the gateway node.

A DistSender of a gateway node and/or coordinating node may receive Batch Requests from a transaction coordinator of the same node. The DistSender of the gateway node may receive the Batch Request from the transaction coordinator. The DistSender may determine the operations indicated by the Batch Request and may determine the node(s) (e.g., the leaseholder node(s)) that should receive requests corresponding to the operations for the range. The DistSender may generate one or more Batch Requests based on determining the operations and the node(s) as described herein. The DistSender may send a first Batch Request for each range in parallel. Based on receiving a provisional acknowledgment from a leaseholder node's evaluator (as to be described herein), the DistSender may send the next Batch Request for the range corresponding to the provisional acknowledgement. The DistSender may wait to receive acknowledgments for write operations and values for read operations corresponding to the sent Batch Requests.

As described herein, the DistSender of the gateway node may send Batch Requests to leaseholders (or other replicas) for data indicated by the Batch Request. In some cases, the DistSender may send Batch Requests to nodes that are not the leaseholder for the range (e.g., based on out of date leaseholder information). Nodes may or may not store the replica indicated by the Batch Request. Nodes may respond to a Batch Request with one or more responses. A response may indicate the node is no longer a leaseholder for the range. The response may indicate the last known address of the leaseholder for the range. A response may indicate the node does not include a replica for the range. A response may indicate the Batch Request was successful if the node that received the Batch Request is the leaseholder. The leaseholder may process the Batch Request. As a part of processing of the Batch Request, each write operation in the Batch Request may compare a timestamp of the write operation to the timestamp cache. A timestamp cache may track the highest timestamp (e.g., most recent timestamp) for any read operation that a given range has served. The comparison may ensure that the write operation has a higher timestamp than any timestamp indicated by the timestamp cache. If a write operation has a lower timestamp than any timestamp indicated by the timestamp cache, the write operation may be restarted at an advanced timestamp that is greater than the value of the most recent timestamp indicated by the timestamp cache.

In some embodiments, operations indicated in the Batch Request may be serialized by a latch manager of a leaseholder. For serialization, each write operation may be given a latch on a row. Any read and/or write operations that arrive after the latch has been granted on the row may be required to wait for the write operation to complete. Based on completion of the write operation, the latch may be released and the subsequent operations can proceed to execute. In some cases, a batch evaluator may ensure that write operations are valid. The batch evaluator may determine whether the write operation is valid based on the leaseholder's data. The leaseholder's data may be evaluated by the batch evaluator based on the leaseholder coordinating write operations to the range. If the batch evaluator determines the write operation to be valid, the leaseholder may send a provisional acknowledgement to the DistSender of the gateway node, such that the DistSender may begin to send subsequent Batch Requests for the range to the leaseholder.

In some embodiments, operations may read from the local instance of the storage engine as described herein to determine whether write intents are present at a key. If write intents are present at a particular key, an operation may resolve write intents as described herein. If the operation is a read operation and write intents are not present at the key, the read operation may read the value at the key of the leaseholder's storage engine. Read responses corresponding to a transaction may be aggregated into a Batch Response by the leaseholder. The Batch Response may be sent to the DistSender of the gateway node. If the operation is a write operation and write intents are not present at the key, the KV operations included in the Batch Request that correspond to the write operation may be converted to Raft (i.e. distributed consensus) operations and write intents, such that the write operation may be replicated to the replicas of the range.

With respect to a single round of distributed consensus, the leaseholder may propose the Raft operations to the leader replica of the Raft group (e.g., where the leader replica is typically also the leaseholder). Based on receiving the Raft operations, the leader replica may send the Raft operations to the follower replicas of the Raft group. Writing and/or execution of Raft operations as described herein may include writing one or more write intents to persistent storage. The leader replica and the follower replicas may attempt to write the Raft operations to their respective Raft logs. When a particular replica writes the Raft operations to its respective local Raft log, the replica may acknowledge success of the Raft operations by sending an indication of a success of writing the Raft operations to the leader replica. If a threshold number of the replicas acknowledge writing the Raft operations (e.g., the write operations) to their respective Raft log, consensus may be achieved such that the Raft operations may be committed (referred to as "consensus-committed" or "consensus-commit"). The consensus-commit may be achieved for a particular Raft operation when a majority of the replicas (e.g., including or not including the leader replica have written the Raft operation to their local Raft log. The consensus-commit may be discovered or otherwise known to the leader replica to be committed when a majority of the replicas have sent an indication of success for the Raft operation to the leader replica. Based on a Raft operation (e.g., write operation) being consensus-committed among a Raft group, each replica included in the Raft group may apply the committed entry to their respective local state machine. Based on achieving consensus-commit among the Raft group, the Raft operations (e.g., write operations included in the write transaction) may be considered to be committed (e.g., implicitly committed as described herein). The gateway node may update the status of the transaction record for the transaction corresponding to the Raft operations to committed (e.g., explicitly committed as described herein). A latency for the above-described distributed consensus round may be equivalent to a duration for sending a Raft operation from the leader replica to the follower replicas, receiving success responses for the Raft operation at the leader replica from at least some of the follower replicas (e.g., such that a majority of replicas write to their respective Raft log), and writing a write intent to persistent storage at the leader and follower replicas in parallel.

In some embodiments, based on the leader replica writing the Raft operations to the Raft log and receiving an indication of the consensus-commit among the Raft group, the leader replica may send a commit acknowledgement to the DistSender of the gateway node. The DistSender of the gateway node may aggregate commit acknowledgements from each write operation included in the Batch Request. In some cases, the DistSender of the gateway node may aggregate read values for each read operation included in the Batch Request. Based on completion of the operations of the Batch Request, the DistSender may record the success of each transaction in a corresponding transaction record. To record the success of a transaction, the DistSender may check the timestamp cache of the range where the first operation of the write transaction occurred to determine whether the timestamp for the write transaction was advanced. If the timestamp was advanced, the transaction may perform a read refresh to determine whether values associated with the transaction had changed. If the read refresh is successful (e.g., no values associated with the transaction had changed), the transaction may commit at the advanced timestamp. If the read refresh fails (e.g., at least some value associated with the transaction had changed), the transaction may be restarted. Based on determining the read refresh was successful and/or that the timestamp was not advanced for a write transaction, the DistSender may change the status of the corresponding transaction record to committed as described herein. The DistSender may send values (e.g., read values) to the transaction coordinator. The transaction coordinator may send the values to the SQL layer. In some cases, the transaction coordinator may also send a request to the DistSender, where the request includes an indication for the DistSender to convert write intents to committed values (e.g., MVCC values). The SQL layer may send the values as described herein to the SQL client that initiated the query (e.g., operating on a client device).

Read Transaction Execution

Figure 2A:
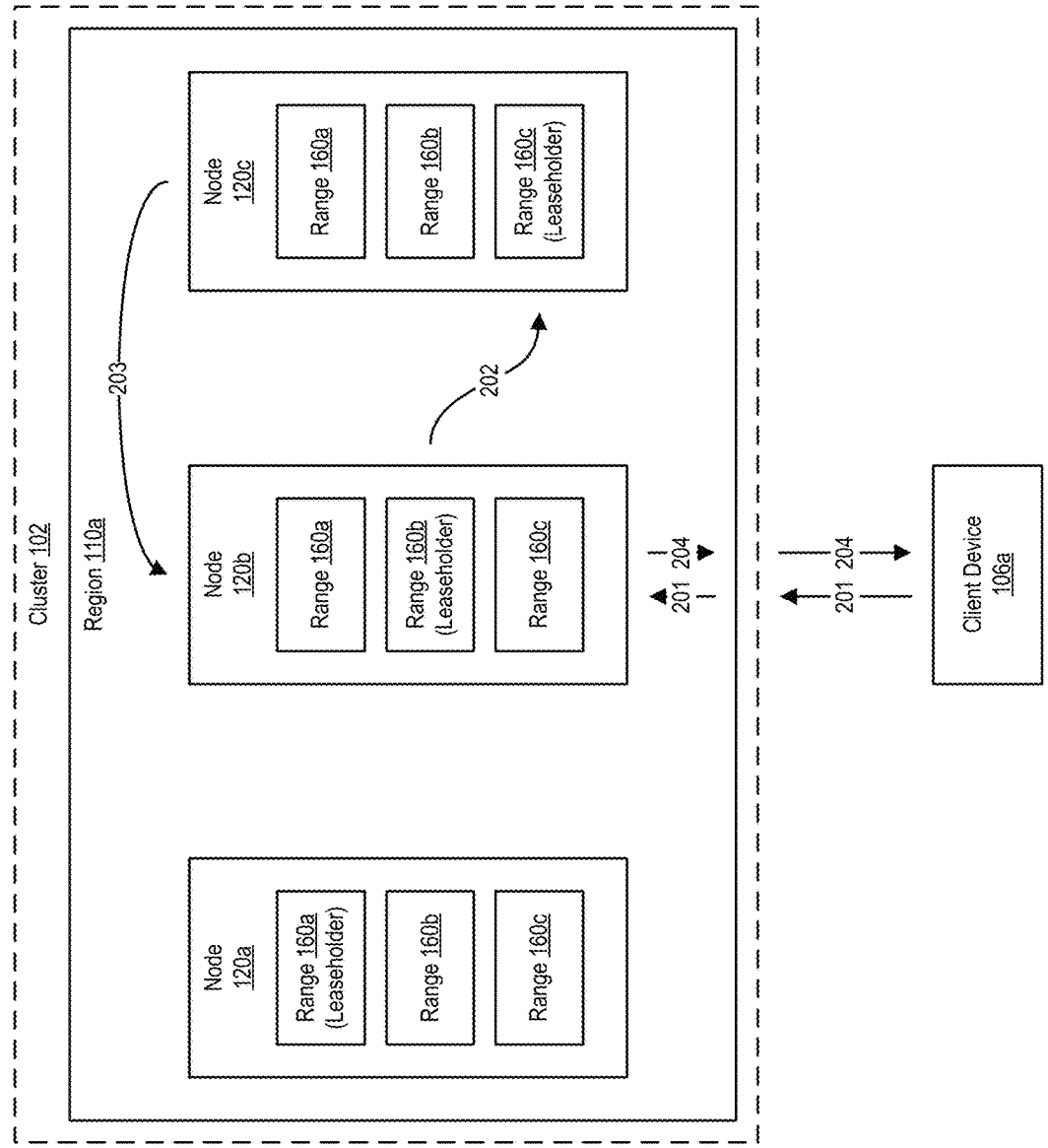
FIG. 2A shows an example of execution of a read transaction at the computing system, according to some embodiments.

Referring to FIG. 2A, an example of execution of a read transaction at the computing system 100 is presented. In some cases, the nodes 120a, 120b, and 120c, of region 110a may include one or more replicas of ranges 160. The node 120a may include replicas of ranges 160a, 160b, and 160c, where ranges 160a, 160b, and 160c are different ranges. The node 120a may include the leaseholder replica for range 160a (as indicated by "Leaseholder" in FIG. 2A). The node 120b may include replicas of ranges 160a, 160b, and 160c. The node 120b may include the leaseholder replica for range 160b (as indicated by "Leaseholder" in FIG. 2A). The node 120c may include replicas of ranges 160a, 160b, and 160c. The node 120c may include the leaseholder replica for range 160c (as indicated by "Leaseholder" in FIG. 2A). While FIG. 2A is described with respect to communication between nodes 120 of a single region (e.g., region 110*a*), a read transaction may operate similarly between nodes 120 located within different geographic regions.

In some embodiments, a client device 106 may initiate a read transaction at a node 120 of the cluster 102. Based on the KVs indicated by the read transaction, the node 120 that initially receives the read transaction (e.g., the gateway node) from the client device 106 may route the read transaction to a leaseholder of the range 160 comprising the KVs indicated by the read transaction. The leaseholder of the range 160 may serve the read transaction and send the read data to the gateway node. The gateway node may send the read data to the client device 106.

As shown in FIG. 2A, at step 201, the client device 106 may send a read transaction to the cluster 102. The read transaction may be received by node 120*b* operating as the gateway node. The node 120*b* may be a node 120 located closest to the client device 106, where the closeness between the nodes 120 and a client device 106 may correspond to a latency and/or a proximity as described herein. The read transaction may be directed to data stored by the range 160*c*. At step 202, the node 120*b* may route the received read transaction to node 120*c*. The read transaction may be routed to node 120*c* based on the node 120*c* being the leaseholder of the range 160*c*. The node 120*c* may receive the read transaction from node 120*b* and serve the read transaction from the range 160*c*. At step 203, the node 120*c* may send the read data to the node 120*b*. The node 120*c* may send the read data to node 120*b* based on the node 120*b* being the gateway node for the read transaction. The node 120*b* may receive the read data from node 120*c*. At step 204, the node 120*b* may send the read data to the client device 106*a* to complete the read transaction. If node 120*b* had been configured to include the leaseholder for the range 160*c*, the node 120*b* may have served the read data to the client device directly after step 201, without routing the read transaction to the node 120*c*.

Write Transaction Execution

Figure 2B:
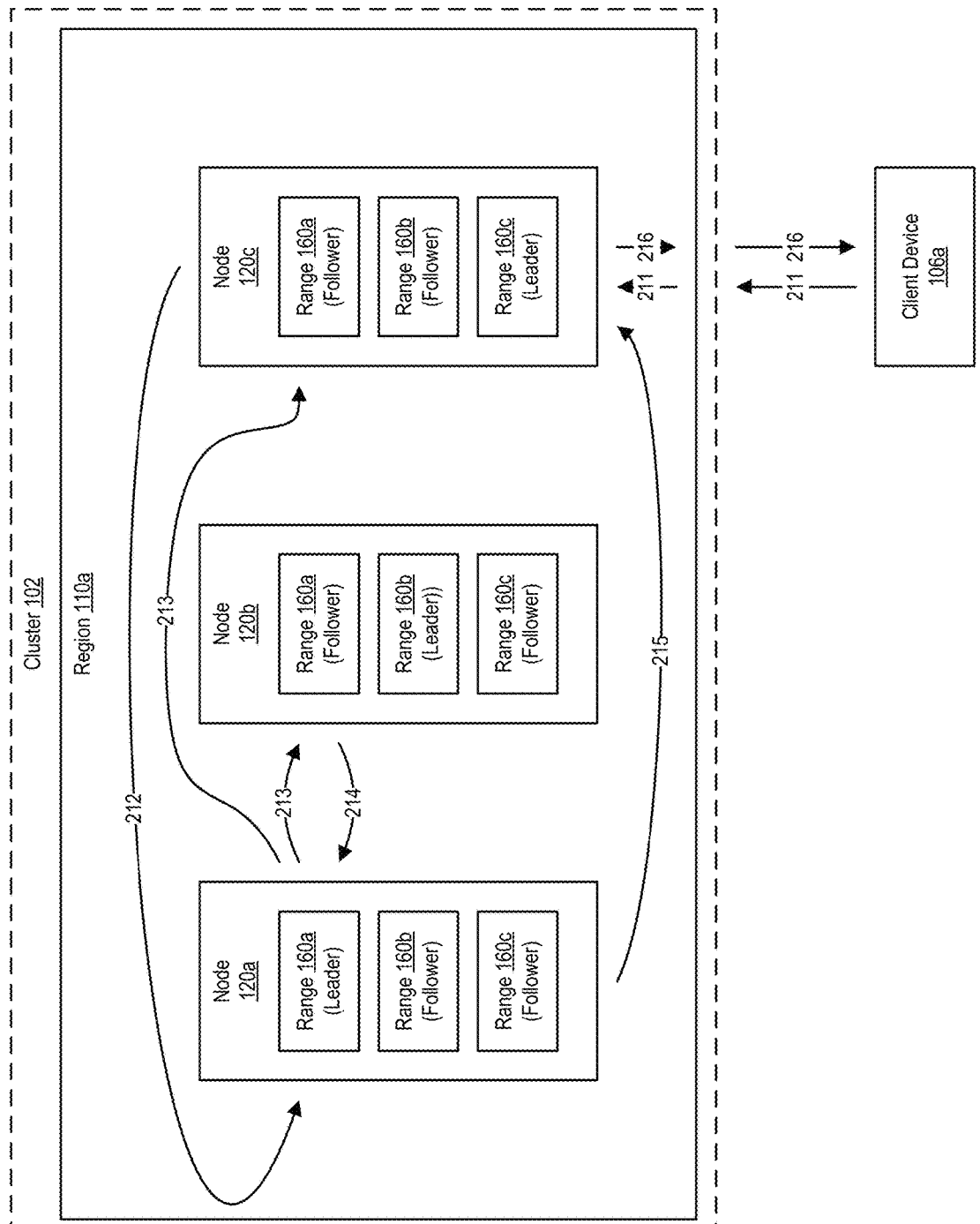
FIG. 2B shows an example of execution of a write transaction at the computing system, according to some embodiments.

Referring to FIG. 2B, an example of execution of a write transaction at the computing system 100 is presented. In some cases, as described herein, the nodes 120*a*, 120*b*, and 120*c*, of region 110*a* may include one or more replicas of ranges 160. The node 120*a* may include replicas of ranges 160*a*, 160*b*, and 160*c*, where ranges 160*a*, 160*b*, and 160*c* are different ranges. The node 120*a* may include the leaseholder replica and the leader replica for range 160*a* (as indicated by "Leaseholder" in FIG. 2A and "Leader" in FIG. 2B). The node 120*b* may include replicas of ranges 160*a*, 160*b*, and 160*c*. The node 120*b* may include the leader replica for range 160*b* (as indicated by "Leader" in FIG. 2B). The node 120*c* may include replicas of ranges 160*a*, 160*b*, and 160*c*. The node 120*c* may include the leader replica for range 160*c* (as indicated by "Leader" in FIG. 2B). While FIG. 2B is described with respect to communication between nodes 120 of a single region (e.g., region 110*a*), a write transaction may operate similarly between nodes 120 located within different geographic regions.

In some embodiments, a client device 106 may initiate a write transaction at a node 120 of the cluster 102. Based on the KVs indicated by the write transaction, the node 120 that initially receives the write transaction (e.g., the gateway node) from the client device 106 may route the write transaction to a leaseholder of the range 160 comprising the KVs indicated by the write transaction. The leaseholder of the range 160 may route the write request to the leader replica of the range 160. In most cases, the leaseholder of the range 160 and the leader replica of the range 160 are the same. The leader replica may append the write transaction to a Raft log of the leader replica and may send the write transaction to the corresponding follower replicas of the range 160 for replication. Follower replicas of the range may append the write transaction to their corresponding Raft logs and send an indication to the leader replica that the write transaction was appended. Based on a threshold number (e.g., a majority) of the replicas indicating and/or sending an indication to the leader replica that the write transaction was appended, the write transaction may be committed by the leader replica. The leader replica may send an indication to the follower replicas to commit the write transaction. The leader replica may send an acknowledgement of a commit of the write transaction to the gateway node. The gateway node may send the acknowledgement to the client device 106.

As shown in FIG. 2B, at step 211, the client device 106 may send a write transaction to the cluster 102. The write transaction may be received by node 120*c* as the gateway node. The write transaction may be directed to data stored by the range 160*a*. At step 212, the node 120*c* may route the received write transaction to node 120*a*. The write transaction may be routed to node 120*a* based on the node 120*a* being the leaseholder of the range 160*a*. Based on the node 120*a* including the leader replica for the range 160*a*, the leader replica of range 160*a* may append the write transaction to a Raft log at node 120*a*. At step 213, the leader replica may simultaneously send the write transaction to the follower replicas of range 160*a* on the node 120*b* and the node 120*c*. The node 120*b* and the node 120*c* may append the write transaction to their respective Raft logs. At step 214, the follower replicas of the range 160*a* (e.g., at nodes 120*b* and 120*c*) may send an indication to the leader replica of the range 160*a* that the write transaction was appended to their Raft logs. Based on a threshold number of replicas indicating the write transaction was appended to their Raft logs, the leader replica and follower replicas of the range 160*a* may commit the write transaction. At step 215, the node 120*a* may send an acknowledgement of the committed write transaction to the node 120*c*. At step 216, the node 120*c* may send the acknowledgement of the committed write transaction to the client device 106*a* to complete the write transaction.

Voting Replicas and Non-Voting Replicas

In some embodiments, as described herein, voting replicas of a particular range may participate in a consensus protocol (e.g., Raft protocol) to agree to modify (e.g., write) data included in a range. Replicas that do not participate in quorum of the consensus protocol may be referred to as non-voting replicas. According to the consensus protocol, a quorum (e.g., majority) of voting replicas storing a particular range may be required to agree to a modification (e.g., by voting) to commit the modification to the range, where each of the voting replicas participate in the consensus protocol. Typically, this requires that at least 3 nodes of a cluster include a voting replica for a particular range, allowing the range to tolerate a single node failure. In some cases, additional nodes may include a voting replica of a range, such that fault tolerance is improved in the cases of node failures. In some cases, nodes may be configured to serve follower reads, which can enable voting replicas (e.g., follower replicas) to serve stale consistent reads from their respective location without routing read requests to the leaseholder of the range. Such a configuration can result in higher write latencies, as additional replicas (e.g., replicas from different geographic regions) are required by the consensus protocol to agree to a modification (e.g., write) to the range. For applications where the use of additional replicas is meant to allow for follower reads (e.g., rather than for fault-tolerance), these higher write latencies can be undesirable. Non-voting replicas may be used to remedy such a deficiency.

In some embodiments, replicas of a range may be configured as voting replicas or non-voting replicas. A voting replica may be a replica of a range that participates (e.g., votes) in the consensus protocol (e.g., Raft protocol) as described herein, such that the voting replica may agree to a modification of the range corresponding to the voting replica. A non-voting replica may be a replica of a range that does not participate (e.g., vote) in the consensus protocol (e.g., Raft protocol) as described herein, such that the non-voting replica does not participate in agreeing to a modification of the range corresponding to (e.g., stored by) the non-voting replica. Accordingly, non-voting replicas would have a minimal (e.g., negligible) impact on write latencies for the range at the expense of not being able to be used for fault tolerance. Voting and non-voting replicas may enable local follower reads for client devices geographically located in and/or closest to their respective geographic locations (e.g., database regions as described below). In some cases, a client device may be located closest to a particular geographic region (e.g., corresponding to a database region) of a number of geographic regions if the client device is located within the particular geographic region and/or if the client device is closer to the particular geographic region than any other one of the number of geographic regions. For a configuration of the replication layer that enables voting replicas and/or non-voting replicas, the consensus protocol may require that at least 3 nodes of a cluster include voting replicas of a particular range, such that consensus may be achieved among 2 of the 3 nodes in the case of a single node failure. Any suitable number of non-voting replicas may exist for a particular range to enable follower reads at each configured database region of the database. As an example, a quorum of voting replicas may be located in North America, while other non-voting replicas may be located in Europe, Asia, and Australia to enable low-latency follower reads for client devices located at these respective regions and/or located at geographic locations closest to these respective regions. Conventionally, such a configuration of voting replicas would result in high write latencies. One or more replication zone configurations as described below with respect to "Replication Zones" may determine a number and placement of voting replicas and non-voting replicas among nodes of a cluster. As an example, parameters for a number of voting replicas (e.g., num_voters) and voter replica constraints (e.g., voter_constraints) may be configured using replication zone configurations to determine a number and placement of non-voting replicas. In some cases, placement of voting replicas and non-voting replicas among nodes of a cluster may be determined as described below with respect to "Replications Zones" and "Survivability Goals".

Replication Zones

In some embodiments, one or more replication zones may provide users an ability to control the placement of data within a cluster of nodes. A replication zone may be used to control a number and location of replicas for data included in databases, tables, rows, indexes, and cluster data (e.g., including internal system data). For each of the data storage objects described herein, a replication zone may allow for control of the number of copies (e.g., replicas) for each range stored within a cluster. A replication zone may allow for control of constraints applied to each of the data storage objects described herein. For example, a replication zone may constraint a particular table's data to a particular database region (described further below). A replication zone may allow for configuration of a minimum and a maximum size of a range. A replication zone may allow for configuration of a timestamp (e.g., "garbage collection threshold" or "collection threshold") before which data is removed from ranges (e.g., garbage collected). Each range may include a collection threshold that corresponds to a particular timestamp. Read operations having timestamp(s) below the collection threshold may not read data included in the range. Each range may periodically determine an updated collection threshold, scan its included KV data, and may remove KV data having versions with timestamps older than the updated collection threshold and that have been succeeded by newer versions. A replication zone may be used to control a placement of leaseholders for ranges within a cluster. For example, using a replication zone configuration, a user may constrain a leaseholder to a database region where a replica of the range already exists. In some cases, placement of a leaseholder replica as described herein may apply to placement of a leader replica corresponding to the same range as the leaseholder replica. In some cases, placement of a leader replica as described herein may apply to placement of a leaseholder replica corresponding to the same range as the leader replica. In some cases, placement of a leaseholder replica and a leader replica as described herein may individually apply to the respective replica.

In some embodiments, each range stored by a cluster of nodes may be part of a respective replication zone. A replication zone configuration may correspond to each range, which may determine the range's placement among nodes of the cluster. At the start of a cluster, there may be two types of replication zones, including pre-configured replication zones that store internal system data for the cluster and a single default replication zone that applies to the rest of the cluster. The pre-configured replication zones may be adjusted and one or more replication zones may be added for databases, tables, rows, and indexes (e.g., secondary indexes). As an example, a user may rely on the default replication zone to spread a cluster's data among availability zones and/or database regions of the cluster and may create a custom replication zone for a database to store the database in specifically configured availability zones and/or database regions.

In some embodiments, there may be 5 replication zone levels for table data stored by a cluster. From least granular to most granular, replication zone levels may include cluster replication zones, database replication zones, table replication zones, index replication zones, and partition replication zones. A cluster replication zone may correspond to the default replication zone of a cluster. The cluster replication zone may apply to all table data stored by a cluster that is not constrained by a database replication zone, table replication zone, or row replication zone. The cluster replication zone may be reconfigured and may not be removed from the cluster. A database replication zone may apply to all table data stored within a particular database. A table zone replication may apply to all table data stored within a particular table. An index replication zone may apply to table data stored within a secondary index. Conventionally, secondary indexes of a table will automatically use a table replication zone corresponding to their table. A partition replication zone may apply to table data stored within a particular index partition.

In some embodiments, system data of a cluster may be stored within system ranges as described herein. Two replication zone levels may exist for system data, including a cluster replication zone and a system range replication zone. A cluster replication zone as described herein may apply to system ranges that are not constrained by a system range replication zone. A system range replication zone may apply to a system range, including a "timeseries" range, "meta" ranges, a "liveness" range, and any other suitable system range.

In some embodiments, a cluster may be configured to use the most granular (e.g., most specific) replication zone when replicating table data. If a replication zone is configured for a partition, the cluster may use the partition replication zone to configure replication of the partition. If there is no applicable partition replication zone and the partition is from a secondary index, the cluster may use an applicable secondary index replication zone to configure replication of the partition. If the partition isn't from a secondary index or there is no applicable secondary index replication zone, the cluster may use a table replication zone to configure replication of the partition. If there is no applicable table replication zone, the cluster may use the database replication zone to configure replication of the partition. If there is no applicable database replication zone, the cluster may use the default cluster-wide replication zone to configure replication of the partition.

To manage and/or otherwise configure replication zones, a client device may execute and/or otherwise provide a CONFIGURE ZONE statement as a part of an ALTER . . . CONFIGURE ZONE statement. Examples of replication zone parameters may include a minimum range size (e.g., referred to as range_min_bytes) for a range of data included in a particular replication zone, a maximum range size (e.g., referred to as range_max_bytes) for a range of data included in a particular replication zone, a number of seconds (e.g., referred to as gc.ttlseconds) overwritten values will be retained before garbage collection (e.g., deletion), a number of voting and non-voting replicas (e.g., referred to as num_replicas) in the replication zone, an array of required and/or prohibited constraints that determine the location of replicas (e.g., voting and non-voting replicas), an ordered list of required and/or prohibited constraints (e.g., referred to as lease_preferences) that determine the location of leaseholders, a Boolean attribute (e.g., referred to as global_reads) that configures whether transactions are non-blocking (e.g., which may be automatically applied for global tables), a number of voting replicas (e.g., referred to as num_voters), and constraints (e.g., referred to as voter_constraints) that determine the placement of voting replicas. In some cases, if a replication zone configuration is not set for a particular data storage object, the replication zone configuration may inherit the replication zone configuration of the parent object of the data storage object. As an example, for a table without a configured table replication zone configuration, the table may be constrained according to a database replication zone configuration of the database that includes the table.

In some embodiments, locations of replicas within a cluster may be determined based on a combination of the descriptive attributes assigned to nodes of the cluster and the constraints set in replication zone configurations. When starting (e.g., activating) a node in a cluster, one or more descriptive attributes may be assigned to the node. A node may include a locality descriptive attribute (e.g., a locality flag), where a user can assign one or more arbitrary KV pairs to the locality flag to indicate the location of the node. The locality flag may be indicated as "-locality". The location of the node may include the node's database region, country, availability zone, etc. In some cases, the KV pairs assigned to the locality flag may be ordered in locality tiers that range from most inclusive to least inclusive, where the keys and the order of the KV pairs may be required to be the same on all nodes of the cluster. As an example, the locality flag may be configured as "-locality=region=eastavailability zone=us-east-1". In some cases, a node may correspond to a particular database region based on having a locality flag indicating the database region. The cluster may be configured to spread replicas evenly across the cluster based on the locality of the nodes. In some cases, when there is high latency between nodes, the cluster may automatically move leaseholders closer to the current workload (e.g., the location where database operations are most prevalent).

In some embodiments, a node may include a capability descriptive attribute (e.g., capability flag), where a user can specific node capability, including specialized hardware. The capability flag may be indicated as "-attrs". As an example, a user may indicate an amount of RAM for a node by configuring the capability flag for the node as "-attrs=ram:64 gb". In some cases, a node may include a store type descriptive attribute (e.g., store flag), where a user can indicate the disk type and/or capability corresponding to a node. The store flag may be indicated as "-store". As an example, a user may indicate a node as including a solid state drive (SSD) by configuring the store flag as "-store=path=/mnt/ssd01, attrs=ssd".

In some cases, replication zone parameters may include constraints. Constraints may be required or prohibited. A required constraint (e.g., as indicated by "+ssd") may cause a cluster to only consider nodes that have attributes matching the required constraint when determining placement of replicas among nodes. A prohibited constraint (e.g., as indicated by "−ssd") may cause a cluster to ignore nodes that have attributes matching the prohibited constraint when determining placement of replicas among nodes. In some cases, constraints may be applied such that they apply to all replicas in a replication zone or they apply to specific replicas in the replication zone. All replicas for each range in a replication zone may be configured with required constraint and/or prohibited constraints. To configure all replicas with a constraint, a user may use JSON array syntax (or any other suitable syntax). For example for a replication zone, replicas may be constrained to a "west" region using the statement "constraints='[−region=west]'". To configure specific replicas of particular ranges with per-replica constraints, a user may use JSON object syntax (or any other suitable syntax) to map constraints to an integer number of replicas in each desired range. The number of replicas constrained for a particular range may not exceed the number of replicas for the replication zone (e.g., as defined by num_replicas). If the number of constrained replicas for a range is less than the number of replicas for the zone, non-constrained replicas may be placed on any suitable node within the cluster. Per-replica constraints may only be configured as required constraints and may not be configured as prohibited constraints. When defining per-replica constraints for a table or database using a replication zone, the number of replicas (e.g., as defined by num_replicas) may be required to be defined. When defining per-replica constraints for an index or partition, the number of replicas (e.g., as defined by num_replicas) may not be required to be defined. Configuration of replication zones based on one or more parameters is further described below with respect to "Configuration of Replication Zones".

Multi-Region Database Overview

In some embodiments, tables (and other schema objects) of a database may be optimized for multi-region applications. In some cases, multi-region databases may include global tables and/or regional tables. As described herein, global tables may be optimized for read access by client devices located in any suitable geographic region. Global tables may be configured to provide low latency read operations to each geographic region, while providing higher latency write operations to each geographic region at the expense of the low latency read operations. Regional tables may be configured to provide performance optimizations for particular geographic locations corresponding to the configured geographic regions of the regional tables. A regional table may provide low latency read and write operations to a configured geographic region corresponding to the regional table, while providing higher latency read and write operations to other geographic regions.

In some embodiments, a database stored by a computing system (e.g., computing system 100) may be configured for multi-region applications, such that data (e.g., table data) stored by nodes within the computing system may be optimized for access (e.g., read and write operations) from one or more configured geographic regions. The computing system may be configured for multi-region applications based on a configuration of cluster regions, database regions, survivability goals, and/or table locality. A cluster region may be an abstraction (e.g., a high-level abstraction) for a geographic region and/or geographic location that a cluster of nodes (e.g., cluster 102) operates within. Each cluster region may be distinct, such that a first cluster region does not overlap with any other second cluster region of a number of cluster regions. Each node of a cluster may include a "locality" flag that is indicative of a cluster region (and an availability zone if applicable) corresponding to the node. A node may not be configured with a locality flag indicating a cluster region that does not correspond to the geographic location of the node and may only be configured with a locality flag indicating the cluster region corresponding to the geographic location of the node. Node(s) geographically located within a particular cluster region and having a locality flag indicating the cluster region may correspond to the cluster region (and resulting database region when added to a database). Data (e.g., ranges) stored by the above-described node(s) may correspond to the cluster region (and resulting database region when added to a database). A cluster region may be a geographic region and/or location that includes at least one node of a cluster of nodes. A locality flag for a node may be manually or automatically configured during startup of the node (e.g., based on the geographic location of the node). As an example, a cluster of nodes operating within the state of New York may correspond to an Eastern United States cluster region. Database regions (e.g., as indicated by <region> in SQL syntax) may be an abstraction (e.g., a high-level abstraction) for a geographic region that a particular database operates within, where a database region is selected and/or otherwise configured from the available cluster regions. As an example, a particular database stored by a cluster of nodes may have one or more nodes operating within the state of New York, which may correspond to an Eastern United States database region configured for the database. A user (e.g., user of a client device 106a) may configure a database region based on (e.g., defined from) one or more available cluster regions corresponding to nodes of the computing system. Survivability goals may correspond to the type of a failure (e.g., node failure) that a particular database can survive. Table locality may correspond to a configuration of a particular table that determines the operation of the table within a multi-region application of the computing system.

In some embodiments, to implement and maintain multi-region databases for the computing system 100, one or more SQL keywords and one or more SQL syntax (e.g., statements) may be used. Examples of SQL keywords that may be used for multi-region databases may include LOCALITY, PRIMARY REGION, SURVIVAL GOAL, REGIONAL BY TABLE IN <region>, REGIONAL BY ROW, and GLOBAL. Examples of SQL syntax that may be used in commands for configuration of multi-region databases may include SHOW REGIONS FROM CLUSTER, SHOW REGIONS FROM DATABASE <database>, SHOW SURVIVAL GOAL FROM DATABASE <database>, SHOW CREATE DATABASE <database>, CREATE DATABASE <database> PRIMARY REGION <region> REGIONS <region_list> SURVIVE [REGION|ZONE] FAILURE (e.g., SURVIVE REGION FAILURE or SURVIVE ZONE FAILURE), ALTER DATABASE <database>{ADD, DROP} REGION <region>, ALTER DATABASE <database> SET PRIMARY REGION <region>, ALTER DATABASE <database> SURVIVE {REGION, availability zone} FAILURE, CREATE TABLE <table> LOCALITY REGIONAL BY TABLE IN PRIMARY REGION, CREATE TABLE <table> LOCALITY REGIONAL BY TABLE (e.g., which may default to the PRIMARY REGION), CREATE TABLE <table> LOCALITY REGIONAL BY TABLE IN <region>, CREATE TABLE <table> LOCALITY REGIONAL BY ROW, CREATE TABLE <table> GLOBAL, ALTER TABLE <table> SET LOCALITY REGIONAL BY TABLE (e.g., which may default to the PRIMARY REGION), ALTER TABLE <table> SET LOCALITY REGIONAL BY TABLE IN<region>, ALTER TABLE <table> SET LOCALITY REGIONAL BY TABLE IN PRIMARY REGION, ALTER TABLE <table> SET LOCALITY REGIONAL BY ROW, and ALTER TABLE <table> SET LOCALITY GLOBAL. As described herein, <database> may refer to an identifier for the created/altered database, <table> may refer to an identifier for the created/altered table, <region> may refer to an identifier for an available cluster region, and <region_list> may refer to an identifier for a listing of available cluster regions.

In some embodiments, a cluster region may be defined at the cluster level for a particular database stored by nodes of a computing system (e.g., computing system 100). A cluster region may be defined (e.g., first defined) on startup of a particular node of a cluster. Based on adding an available cluster region to a database (e.g., via one or more SQL statements), the cluster region may be referred to as a database region. Cluster regions available to a database and database regions configured (e.g., defined) for a database may not be identical. As an example, for a particular use case, a developer may choose to add all available cluster regions to a database as database regions. As another example, for a second particular use case, a developer may choose to add only a subset of the available cluster regions to the database as database regions. A user may add and remove database regions from a database as described below with respect to "Configuration of Database Regions".

In some embodiments, a first database region configured for a particular database may be referred to as a "primary region", "primary database region", and/or "PRIMARY REGION". In some cases, a CREATE DATABASE <database> PRIMARY REGION or an ALTER DATABASE <database> PRIMARY REGION statement (e.g., SQL statement) may be used to create or add a primary region for/to a database. If a primary region is configured for a particular database, the database may be considered a multi-region database. A database may not be considered a multi-region database until a primary region is configured for the database. A user may modify the primary region for a database if the cluster includes at least 2 cluster regions and at least two cluster regions have been added to the database (as database regions). Cluster regions and resulting database regions as described herein may be used to enable table locality and survivability goals as described below. As an example, cluster regions and database regions may be mapped to cloud service provider regions (e.g., Eastern United States, Central United States, Western United States, Western Europe, Eastern Europe, etc.). Geographic placement of nodes within a cluster and the initialized locality for nodes (e.g., indicated by their respective locality flags) may be used to define cluster regions and the resulting database regions. Each of the schema objects (e.g., tables, indexes, etc.) included in a particular multi-region database stored by a cluster of nodes may operate within the defined database regions. Each of the multi-region databases stored by a particular cluster of nodes may operate within different sets of regions (e.g., as limited by the cluster regions). Tables stored by nodes of the computing system 100 may include a configurable locality indicator, where the locality indicator can be configured with an indication of a table's locality (e.g., regional or global), database region (if applicable), and zone (if applicable) as described further below. In some cases, a listing of available cluster regions that be may configured as database regions may be stored by a node status table (e.g., kv_node_status) accessible by each of the nodes of the computing system 100. A database region may be added to a database by configuring the database's locality indicator, where configuring the locality indicator includes providing a string value indicative of a database region (e.g., region=us-west) selected from the available cluster regions. A database region may be referred to as including one or more nodes when the one or more nodes are geographically located within the database region.

In some embodiments, database regions may include one or more sub-tiers referred to as "availability zones". An availability zone may not be explicitly added to and/or removed from a database. A node may be configured as corresponding to a particular availability during node startup using the node's locality flag as described herein. An availability zone may be used to indicate one or more particular failure domains within a cluster region, such that replica placement may adhere to a database's survivability goal as described below. As an example, for a cluster region corresponding to the Eastern United States (e.g., us-east-1), availability zones may include New York (e.g., us-east-1a), Connecticut (e.g., us-east-1b), and New Jersey (e.g., us-east-1c). One or more nodes of a cluster may correspond to a particular availability zone within a cluster region. A node may be configured (e.g., via the locality flag on node startup) as corresponding to a single availability zone. In some cases, a number of nodes corresponding to a cluster region may only be greater than or equal to a second number of nodes corresponding to an availability zone included in the cluster region. A number of nodes corresponding to an availability zone included in a cluster region may only be less than or equal to a second number of nodes corresponding to the cluster region.

In some embodiments, as described herein, survivability goals may correspond to the type of a failure (e.g., node failure) that a particular database can survive. A database may be configured with a particular survivability goal, where each of the tables included in the database operate according to the survivability goal. Survivability goals may include a zone survivability goal (e.g., to survive availability zone failure) and a region survivability goal (e.g., to survive region failure). In some cases, survivability goals may be used to configure a placement of replicas among nodes of a cluster, such that the database will remain available in the event that one or more nodes goes offline and/or is otherwise unavailable. Failure of a node may refer to a node going offline and/or being unavailable for a duration of time, such that data (e.g., KV data) stored by the failed node is unavailable to client devices and/or other nodes of the cluster. In some cases, data stored by a failed node may be replaced onto other node(s) of the cluster. Failure of an availability zone may refer to a failure of each node corresponding to (e.g., included in, geographically located within, etc.) the availability zone for a duration of time. Failure of a database region may refer to a failure of each node corresponding to (e.g., included in, geographically located within, etc.) the database region for a duration of time. Configuring a database with a zone survivability goal may enable the database to remain available for read and write operations if one availability zone failure occurs at a given time within the database region. If more than one availability zone failure occurs at a given time within the database region, the database may be available or unavailable based on the location and the number of availability zones that fail. An availability zone failure may correspond to a failure of one or more (e.g., all) of the nodes corresponding to a particular availability zone. In some cases, a zone survivability goal may be a default survivability goal for multi-region databases. Configuring a database with a region survivability goal may enable the database to remain available for read and write operations if one database region failure occurs at a given time for the database. If more than one database region failure occurs at a given time for the database, the database may be available or unavailable based on the database region(s) that fail. In some cases, if a majority of database regions for the database experience a failure at a particular time, the database may be available based on a number of database nodes included in each respective database region. In some cases, configuring a survivability goal for a multi-region database can negatively impact database performance. As an example, for a database configured with a region survivability goal, write latency may increase by at least as much time as the round trip time (RTT) to a second (e.g., next closest) region from a leader replica stored by a node in a first region.

In some embodiments, to configure nodes of the computing system (e.g., computing system 100) for multi-region applications, a user may configure a "table locality" for tables of the database. A particular table may be configured with a respective table locality that governs how the table operates in a multi-region database configuration. In some cases, a configured table locality may determine one or more optimizations (e.g., latency optimizations) to client devices based on resulting replica types (e.g., voting and non-voting types), replica placement, and table schema configuration corresponding to the configured table locality. A first type of table locality may be a regional locality, such that a table configured with a regional locality indicative of a particular cluster region (and database region) is referred to as a regional table. Examples of cluster regions and database regions may include the Eastern United States (US), Central US, and Western US.

In some embodiments, for a regional table, the regional table may be configured with a database region at the table level or at the row level. A regional table configured with a database region at the table level (e.g., a table level regional table) may be used for applications that require low latency read and write operations for the regional table (e.g., the entire table) in a particular region. As an example, client devices located within (e.g., local to) the database region corresponding to a regional table may experience low latency read and write operations, while client devices located external to (e.g., remote from) the database region corresponding to the regional table may experience higher latency read and write operations at least as large as the network latency between regions. As a default setting for the computing system 100, regional tables may be configured with a database region at the table level (e.g., as table level regional tables) in the database's primary region.

In some embodiments, a regional table configured with one or more database regions at the row level (e.g., a row level regional table) may be used for applications that require low latency read and write operations on a row-by-row basis, where different rows of the regional table may be optimized for access by client devices located in different geographic regions corresponding to the database regions. As an example, client devices (e.g., local client devices) located within a first database region corresponding to a first row of a regional table may experience low latency read and write operations when accessing the first row, while other client devices (e.g., remote client devices) located external to the first database region corresponding to the first row of the regional table may experience higher latency read and write operations when accessing the first row. By configuring database regions on a row level basis for a regional table, the regional table may be configured with partitions that are each optimized for a respective database region. In some cases, a database region configured for rows of a regional table may be automatically or manually configured. With respect to automatic configuration, the database region for a particular row may be configured according to the database region of the gateway node from which the row was inserted. As an example, for a client device that accesses a row level regional table via a gateway node within a database's primary region, a row inserted in the row level regional table without a defined database region may be automatically configured with the primary region as its configured database region. Configuration of database regions for rows of row level regional tables may be configured by modifying (e.g., updating) database regions indicators) stored in the row level regional table's hidden region column as described further in "Multi-Region Table Configuration".

In some embodiments, a second type of table locality may be a global locality, such that a table configured with a global locality (e.g., a locality that is not indicative of a particular database region) is referred to as a global table. A global table stored by a node may be configured to enable low latency read operations and higher latency write operations for a client device located in any suitable geographic region. An example of a global table may be a table storing promotional codes that may be frequently read and infrequently written to by client devices. To configure a particular table as a global table, a locality indicator for the table may be configured as GLOBAL.

In some embodiments, a multi-region database may be required to include a primary region as described herein. The primary region may be required to be configured before (or at the same time as) one or more other cluster regions are added to a database as database regions. By configuring the database with a primary region, the database may be considered a multi-region database, such that the SQL keywords and syntax described herein can be used to interface with the database. A primary region may include one or more differentiating properties relative to other database regions of a database. In some cases, nodes located in the primary region may store each of the leaseholders for global tables included in the database, such that read and write operations directed to global tables are coordinated in the primary region. If the node(s) of the primary region fail and/or are otherwise unavailable, leaseholder replicas and/or leader replicas for global tables can move to a different database region (e.g., a designated secondary region). In some cases, the primary region for a database may be the default region for regional tables configured with a database region at the table level (e.g., table level regional tables). For a database configured to include a primary region (e.g., making the database a multi-region database), each of the tables included in the database may be regional by table tables configured with the primary region as the database region. If a table is created in a multi-region database (e.g., using CREATE TABLE) and the table is configured as a table level regional table (e.g., a REGIONAL BY TABLE table) without a configured database region, the primary region of the database may be automatically configured as the configured database region for the table level regional table. A configured (e.g., selected) database region (or a primary region if a database region is not selected) for a table level regional table or a partition of a row level regional table may be referred to as the table's or partition's "home region". If a table is created in a multi-region database (e.g., using CREATE TABLE) and a locality flag not configured (e.g., as regional or global), the table may be automatically configured as a table level regional table and the database region may be automatically configured as the primary region. In some cases, the primary region may be explicitly stated in CREATE TABLE and ALTER TABLE statements. For example, in a CREATE TABLE statement, the primary region may be stated as CREATE TABLE <table> LOCALITY REGIONAL BY TABLE IN PRIMARY REGION, such that the primary region is configured as the database region for a table level regional table directly referencing the primary region (e.g., us-east, us-west, eu-west, etc.).

Survivability Goals

In some embodiments, as described herein, survivability goal may be configured for a multi-region database. A survivability goal may determine a configuration for replica placement among nodes of the cluster. A survivability goal for a database may be configured as zone survivability goal (e.g., configured using SURVIVE ZONE FAILURE) or a region survivability goal (e.g., configured using SURVIVE REGION FAILURE). As described herein, a zone survivability goal may ensure that a database can tolerate (e.g., survive) a failure of at least one availability zone, while a region survivability goal may ensure that the database can tolerate (e.g., survive) a failure of at least one region (e.g., a majority of database regions). A region survivability goal may not be configured for a database having less than 3 database regions. A zone survivability goal may be configured for a database having less than 3 database regions if the database is stored by at least 3 nodes.

In some embodiments, as described herein with respect to "Replication Layer", a quorum of nodes may be required to achieve consensus among nodes to commit a modification (e.g., write or delete) to a replica of a range. Accordingly, a minimum of 3 nodes may be required to include a replica of a particular range such that a quorum of nodes may be able to achieve consensus in the event of a node failure. In some cases, a minimum of 3 nodes may be required to include a replica (e.g., voting replica) for a range included in a database (or each partition corresponding to a row level regional table). One or more replication zone configurations may determine a placement of replicas within a cluster, where the replication zone configurations may cause placement of replicas to adhere to a selected survivability goal for a multi-region database. A configuration of replicas for a survivability goal may be based on a placement of one or more voting replicas and non-voting replicas among nodes of a cluster. For both a region survivability goal and a zone survivability goal, non-voting replicas may be placed in any and/or all database regions that do not include a voting replica, such that the non-voting replicas may enable local follower reads within each database region. In some cases, placement restrictions as described with respect to the section "Placement Restricted Replicas" may restrict placement of non-voting replicas in certain database regions.

In some embodiments, a database may be configured with a region survivability goal (e.g., SURVIVE REGION FAILURE). For a database configured with a region survivability goal, a minimum of 5 nodes of a cluster may be required to store a voting replica of a particular range and/or table. A database may be required to include at least 3 database regions to be configured with a region survivability goal. Databases that include less than 3 database regions may be not configured with a region survivability goal. In some cases, a minimum of 2 voting replicas (including the leaseholder replica) may be required to be stored by nodes within the database's primary region. A minimum of 2 voting replicas may be required to be stored within the primary region to prevent the need to transfer a range lease to a region other than the primary region in the case of a loss of a node (e.g., due to node failure or restart) in the primary region. In other cases, if the primary region includes only 1 node, the primary region may store a single voting replica. In some cases, voting replicas may be placed among any suitable number of database regions, such that a quorum of voting replicas are external to any single database region and a quorum of voting replicas are available for Raft consensus in the event of a single region failure (e.g., where each of the nodes in the region fail). As an example, for a multi-region database with 2 database regions, configuration of the database with a region survivability goal may fail as a quorum of voting replicas would not be able to be located external to any single database region (e.g., as 3 voting replicas may be stored within the primary region and 2 voting replicas may be stored within a second region). As another example, for a multi-region database with 3 database regions, 2 voting replicas may be stored within the primary region, 2 voting replicas may be stored within a second region, and 1 voting replica may be stored within a third region. In some cases, requiring the primary region to include at least 2 voting replicas may improve database performance. As an example, for a database with 3 database regions (e.g., in a 2-2-1 node configuration), a quorum between replicas (e.g., consensus among a majority of the replicas) may be achieved with replicas from only 2 database regions of the 3 database regions and a quorum between replicas may be achieved when a particular replica on a node that stores 2 replicas is slow, thereby improving write latencies. Read performance can be unaffected in the event of a primary region node failure in this configuration as the leaseholder may remain within the primary region.

In some embodiments, a database may be configured with a zone survivability goal (e.g., SURVIVE ZONE FAILURE). For a database configured with a zone survivability goal, a minimum of 3 nodes of a cluster may be required to store a voting replica of a particular range and/or table, where each of the 3 nodes corresponds to a distinct availability zone. In some cases, a leaseholder and each of the voting replicas (e.g., including the leader replica) for the range may be required to be stored by nodes within a configured database region (or the database's primary region if a database region has not been configured). By requiring 3 nodes of the cluster to each store a voting replica for a particular range, a quorum of voting replicas may remain available for Raft consensus in the event of a single availability zone failure (e.g., where a node corresponding to a particular availability zone fails). By requiring the leaseholder and each of the voting replicas to be stored within a configured database region, the voting replicas may serve low latency reads and writes to client devices within the configured database region.

In some embodiments, voting replicas and/or non-voting replicas may be replaced onto other nodes in the case of node failure. If a node that stored a voting replica for a particular range (or partition for a row level regional table) fails and/or is otherwise unavailable, the voting replica may be replaced and stored by a second node within the same database region as the failed node (if the database region includes the second node). If a node that stored a non-voting replica for a particular range (or partition for a row level regional table) fails and/or is otherwise unavailable, the non-voting replica may be replaced and stored by a second node within the same database region as the failed node (if the database region includes the second node). If a database region including one or more nodes that store only non-voting replicas fails and/or is otherwise unavailable, the failed non-voting replicas may be not replaced onto other nodes of different database regions. If a database region including one or more nodes that store voting replicas fails and/or is otherwise unavailable, the failed voting replicas may be replaced and stored on nodes of one or more other database regions if a quorum of the voting replicas previously existed outside of the failed database region. As an example, for a range with 3 voting replicas stored in a first database region and 2 voting replicas stored in a second database, if the first database region fails, the 3 failed voting replicas of the first database region may not be replaced and stored within the second database region (e.g., even if the second database region includes 3 nodes to store the 3 failed voting replicas). As another example, for a range with 3 voting replicas stored in a first database region and 2 voting replicas stored in a second database, if the second database region fails, the 2 failed voting replicas of the second database region may be replaced and stored within the first database region if the first database region includes 2 additional nodes to store the 2 failed voting replicas.

Multi-Region Table Configuration

In some embodiments, as described herein, a multi-region database may include tables of one or more table localities. Examples of table localities may include tables configured with regional or global localities. Example of regional tables may include a regional table configured with a database region at the table level (e.g., a REGIONAL BY TABLE table) and a regional table configured with database regions at the row level (e.g., a REGIONAL BY ROW table). In some cases, client devices that are located within a particular cluster region and resulting database region corresponding to a table may be "local" to the table. In some cases, client devices that are located external to a particular cluster region and resulting database region corresponding to a table may be "remote" to the table. Table 2 as shown below describes a summary of properties corresponding to regional (e.g., regional by row or regional by table tables and global tables).

TABLE 2

Table Locality Operational Properties

| | Table Locality Type | | |
|---|---|---|---|
| | REGIONAL BY TABLE IN <region> (e.g., table level regional table) | REGIONAL BY ROW (e.g., row level regional table) | GLOBAL (e.g., global table) |
| data locality | Local per <region> | Local per each row's REGION; not local outside of that row's REGION | global |
| data access | read-often, write-often | read-often, write-often | read-mostly, write-rarely |
| local read latency | fast | fast | N/A (remote reads only) |
| local write latency | fast | fast | N/A (remote writes only) |
| remote/global read latency | slow, fast if stale | slow, fast if stale | fast |
| remote/global write latency | slow | slow | slow |
| reads block on local writes, latency | yes, fast | yes, fast | N/A |
| writes block on local writes, latency | yes, fast | yes, fast | N/A |
| reads block on remote/global writes, latency | yes, slow | yes, slow | no, fast |
| writes block on remote/global writes, latency | yes, slow | yes, slow | yes, slow |

In some embodiments, a table level regional table (e.g., a regional table configured with a database region at the table level or a REGIONAL BY TABLE table) may be a default table locality for tables in a multi-region database. Tables of database that do not include a configured table locality (and tables of a database that do not include a table locality when a database region is initially added to the database) may be configured as table level regional tables in the primary region of the database. As described in Table 2, a table level regional table may be a read-often, write-often table that is optimized for low latency read operations and low latency write operations for client devices that are local to the configured database region of the table level regional table. A table level regional table may be considered to be homed in its configured database region. A table level regional table may provide higher latency read operations and higher latency write operations for client devices that are remote to the configured database region of the table level regional table. To create a table level regional table in a database, a client device may provide and/or execute a CREATE TABLE <table> LOCALITY REGIONAL BY TABLE IN <region> statement. To alter an existing table to become a table level regional table, a client device may provide and/or execute an ALTER TABLE <table> SET LOCALITY REGIONAL BY TABLE IN <region> statement. In some cases, the statement IN <region> may be replaced by IN PRIMARY REGION for each of the statements described herein to configure the primary region as the configured region for the table level regional table.

In some embodiments, a table level regional table may include one or more schema changes relative to a table of a database that is not a multi-region database. For a table level regional table configured with a database region other than a primary region of the database, a table descriptor corresponding to the table level regional table may include the configured database region (e.g., an indication of the configured database region). For a table level regional table configured with a primary region of the database, a table descriptor corresponding to the table level regional table may not include the primary region. By not including the primary region in the table descriptor of a table level regional table configured (e.g., automatically configured by default) with the primary region, changes to the primary region may easily propagate to each table level regional table included in the database.

In some embodiments, for a table level regional table, leaseholder(s) for range(s) of the table level regional table may be stored within the database region selected for the table level regional table. A table zone configuration for the table level regional table may constrain and/or otherwise cause the leaseholder(s) for range(s) of the table level regional table to be stored within the selected database region. By constraining the leaseholder(s) to the selected database region, low latency read and write operations may be provided to client devices local to the database region. For a table level regional table in a database configured with a zone survivability goal, a table zone configuration may cause each of the voting replicas of range(s) included in the table level regional table to be stored within the database region selected for the table level regional table. For a table level regional table in a database configured with a region survivability goal, a table zone configuration may cause a quorum (e.g., majority) of voting replicas of the table's range(s) to be stored in database region(s) external to the database region selected for the table level regional table, with remaining voting replicas (e.g., a quorum−1 number of replicas) homed within the configured database region. In some cases, a table zone configuration may cause non-voting replicas of range(s) included in the table level regional table to be stored in any and/or all database regions that do not include a voting replica. If a database region is not explicitly defined for a table level regional table (e.g., such that the primary region of the database is the configured database region), a database zone configuration for the database may provide the replication zone configuration as described herein.

In some embodiments, as described in Table 2, a row level regional table (e.g., a regional table configured with database region(s) at the row level or a REGIONAL BY ROW table) may be a read-often, write-often table that is optimized for low latency read operations and low latency write operations for client devices that are local to the configured database region(s) corresponding to the rows (e.g., partitions) of the row level regional table. A partition of a row level regional table may be considered to be homed in its configured database region. A row level regional table may provide higher latency read operations and higher latency write operations for client devices that are remote to the configured database region(s) of the rows of the row level regional table. To create a row level regional table in a database, a client device may provide and/or execute a CREATE TABLE <table> LOCALITY REGIONAL BY ROW statement. To alter an existing table to become a row level regional table, a client device may provide and/or execute an ALTER TABLE <table> SET LOCALITY REGIONAL BY ROW statement.

In some embodiments, a row level regional table may include one or more schema changes relative to a table of a database that is not a multi-region database. In some cases, a row level regional table may include a hidden region column (e.g., crdb_region_column) indicative of a configured database region for each row of the row level regional table. The hidden region column may be prepended to a primary key corresponding to the row level regional table. A row level regional table (and its associated primary and secondary indexes) may be partitioned by the hidden region column, where each database region that can be included in the hidden region column may correspond to a respective partition within the row level regional table. Each partition of the row level regional table may be a distinct range stored by one or more voting replicas (and non-voting replicas if applicable). If a database region is added to or removed from a database, each row level regional table (and their corresponding indexes) of the database may be repartitioned to account for each of the database regions that may be applied to rows of the row level regional tables. When a database region is added to a database, an empty partition corresponding to the added database region may be added to each of the existing row level regional tables, where the empty partition may be stored by node(s) located in the added database region. When a database region is removed from a database, an empty partition corresponding to the removed database region may be removed from each of the existing row level regional tables, as the partition may be required to be empty to allow for its removal.

In some embodiments, for a row level regional table, each partition of the row level regional table corresponding to a configured database region may be stored within the respective database region. A replication zone configuration for each partition may constrain the partition to its configured database region. For a row level regional table in a database configured with a zone survivability goal, an index zone configuration for each partition (e.g., range) may cause and/or otherwise constrain leaseholders and voting replicas of each respective partition of the row level regional table to be homed in their respective configured database region. For a row level regional table in a database configured with a region survivability goal, an index zone configuration for each partition may cause a quorum of voting replicas for each partition (e.g., range) of the row level regional table to be stored external to the respective database region corresponding to the partition. An index zone configuration for each partition may cause the remaining voting replicas for each partition to be stored within the respective database region corresponding to each partition. In some cases, an index zone configuration for each partition may cause non-voting replicas of each partition included in the row level regional table to be stored in any and/or all database regions that do not include a voting replica for the respective partition.

In some embodiments, the configured database region(s) corresponding to a row level regional table may be manually or automatically configured. When a row level regional table is created and database regions are not explicitly defined for the row level regional table, values of the hidden region column may be automatically configured to the database region corresponding to the gateway node used to create the row level regional table. If an existing table (e.g., global table or table level regional table) is altered to a row level regional table, the hidden region column may be added to the table and the values of the hidden region column may be automatically configured to the database region in which the original table was homed and/or otherwise configured. In some cases, for insert operations directed to a row level regional table, value(s) corresponding to the row(s) subject to the insert may be automatically configured to the database region corresponding to the gateway node that receives the insert operations from a client device. In some cases, for insert operations directed to a row level regional table, value(s) corresponding to the row(s) subject to the insert may be automatically configured to the database's primary region if the database region corresponding to the gateway node that receives the insert operations from a client device has not been added to the database. In some cases, for insert operations (e.g., INSERT) directed to a row level regional table that includes a configured database region, value(s) corresponding to the row(s) subject to the insert may be manually configured to the database region indicated in the insert operations. A user may modify a configured region corresponding to a particular row of a row level regional table using an upsert or update (e.g., UPSERT or UPDATE) statement directed to the hidden region column. Modifying a configured database region may cause the row level regional table to repartition to include the modified row in a partition corresponding to the modified database region.

In some embodiments, as described in Table 2, global tables (e.g., GLOBAL table) may be read-mostly, write-rarely tables that are optimized for low latency read operations for client devices in any suitable region, while providing higher latency write operations for client devices in any suitable region. To create a global table in a database, a client device may provide and/or execute a CREATE TABLE <table> GLOBAL statement, where <table> corresponds to an identifier for the created table. To alter an existing table to become a global table, a client device may provide and/or execute an ALTER TABLE <table> SET LOCALITY GLOBAL statement. A global table may not require additional schema changes relative to a table of a database that is not a multi-region database. In some cases, a global table may be indicated as having a global table locality based on a configuration of a Boolean attribute (e.g., global_reads) included in a table zone configuration corresponding to the global table. The configuration of the Boolean attribute may configure whether transactions directed to a table are non-blocking. If a Boolean attribute in a table zone configuration is configured as true, transactions directed to the corresponding table may be non-blocking, such that write transactions are minimally disruptive to concurrent read transactions for the same data. If a Boolean attribute in a table zone configuration is configured as false, transactions directed to the corresponding table may not be non-blocking. In some embodiments, table zone configurations corresponding to global table may include the Boolean attribute configured as true, such that the transaction directed to the global table are non-blocking. For example, as indicated in Table 2, read transactions directed to a global table may not be blocked on concurrent write transactions corresponding to the global table, enabling low latency read operations.

In some embodiments, a table zone configuration for a global table may cause leaseholder(s) of range(s) included in the global table to be stored in the primary region corresponding to the database. By storing the leaseholder(s) of range(s) included in the global table in the database's primary region, deadlock detection may be improved (e.g., through eliminating deadlock detection between regions), locks may be cleaned up more quickly, and behavior of contended transactions may improve. For a global table in a database configured with a zone survivability goal, a table zone configuration may cause voting replicas to be stored and/or otherwise constrained to the primary region of the database. For a global table in a database configured with a region survivability goal, a table zone configuration may cause a quorum (e.g., majority) of voting replicas to be stored in database region(s) external to the primary region of the database, with remaining voting replicas stored within the primary region. In some cases, a table zone configuration may cause non-voting replicas of range(s) included in the global table to be stored in any and/or all database regions that do not include a voting replica. Table 3 shows a summary of exemplary replica placement and database configuration according to selected survivability goals and table locality.

TABLE 3

Replica Placement and Database Configuration

| | Zone Survivability Goal | Region Survivability Goal |
|---|---|---|
| REGIONAL BY TABLE IN <region> (e.g., table level regional table) | At least 3 voting replicas At least 3 availability zones At least 1 database region Database configured with a primary region Leaseholder and/or leader replica(s) stored within a configured database region of the table Each voting replica is stored within a configured database region of the table A non-voting replica configured to enable follower reads can be included in each database region that does not include a voting replica (unless placement of non-voting replicas is restricted) | At least 5 voting replicas, At least 3 database regions each storing at least one voting replica Database configured with a primary region Leaseholder and/or leader replica(s) stored within a configured database region of the table A quorum of voting replicas are stored external to a configured database region of the table Less than a quorum of voting replicas are stored within a configured database region of the table A non-voting replica configured to enable follower reads can be included in each database region that does not include a voting replica |
| REGIONAL BY ROW (e.g., row level regional table) | At least 3 voting replicas for each partition of the table At least 3 availability zones At least 1 database region, Database configured with Partitioned into one or more partitions each corresponding to a respective database region Leaseholder and/or leader replica of each partition stored within a configured database region corresponding to the partition Each voting replica corresponding to each partition is stored within a configured database region corresponding to the respective partition A non-voting replica of each partition of the table configured to enable follower reads can be included in each database region that does not include a voting replica of the respective partition (unless placement of non-voting replicas is restricted) | At least 5 voting replicas, At least 3 database regions each storing at least one voting replica Database configured with a primary region Partitioned into one or more partitions each corresponding to a respective database region Leaseholder and/or leader replica of each partition stored within a configured database region corresponding to the partition A quorum of voting replicas of each partition are stored external to a configured database region corresponding to the respective partition Less than a quorum of voting replicas of each partition are stored within a configured database region corresponding to the respective partition A non-voting replica of each partition of the table configured to enable follower reads can be included in each database region that does not include a voting replica of the respective partition |
| GLOBAL (e.g., global table) | At least 3 voting replicas At least 3 availability zones At least 1 database region, Database configured with a primary region Leaseholder replica and/ or leader(s) stored within a primary region Each voting replica is stored within a primary region A non-voting replica configured to enable follower reads can be included in each database region that does not include a voting replica | At least 5 voting replicas, At least 3 database regions each storing at least one voting replica Database configured with a primary region Leaseholder and/or leader replica(s) stored within a primary region A quorum of voting replicas are stored external to a primary region Less than a quorum of voting replicas are stored within a primary region A non-voting replica configured to enable follower reads can be included in each database region that does not include a voting replica |

In some embodiments, according to replication (e.g., database, table, index, etc.) zone configurations, non-voting replicas may be placed in database regions that do not include a voting replica. To reduce latencies in a multi-region database, non-voting (e.g., follower) replicas may be made available to serve historical (e.g., stale) reads to client devices located within their respective database region, such that read requests may be routed from a gateway node to local follower node for a respective range and do not need to be directed to the leaseholder for the respective range. Historical reads may include transactions with a read timestamp that is sufficiently in the past (e.g., such that write transactions have completed propagating to non-voting replicas). Accordingly, follower reads may be consistent reads at historical (e.g., stale) timestamps from non-leaseholder replicas, which may be enabled by closed timestamp updates. A closed timestamp update may be a data store-wide timestamp, where the timestamp can include per-range information indicative of Raft (e.g., consensus) progress among a leader replica (e.g., typically the leaseholder replica) and follower (e.g., voting) replicas. A leader replica may send a closed-timestamp update to one or more follower nodes, where the closed timestamp update includes a closed timestamp indicative of the time at which the range was most recently updated and/or otherwise modified according to the consensus protocol. Based on received closed timestamp updates, a follower replica may have the necessary information to serve consistent, non-stale reads for timestamps that are at and below the received closed timestamp from the leader replica and serve stale reads for timestamps that are above the received closed timestamp. For ranges configured as non-blocking ranges (e.g., as described with respect to global tables), follower replicas may serve consistent reads at a present time based on receiving a closed timestamp update with a synthetic timestamp. Examples of applications of follower reads and non-blocking transactions can be found in at least U.S. patent application Ser. No. 17/371,403 filed on Jul. 7, 2021 and titled "Methods and Systems For Non-Blocking Transactions", which is hereby incorporated by reference in its entirety. In some cases, follower reads may be enabled or disabled based on a placement of replicas according to a replication zone configuration.

Configuration of Database Regions

In some embodiments, as described herein, database regions may be added to and removed from a particular database. Adding a database region to a database may include one or more effects. When a database region is added to a database, a hidden region column corresponding to row level regional tables may be configured to accept and/or otherwise allow an indicator corresponding to the added database region, such that rows of the row level regional tables may be homed in (e.g., optimized for) the added database region. When a database region is added to a database, a non-voting replica for each range of global tables and table level regional tables included in the database may be added to and/or otherwise stored by at least one node corresponding to the added database region. In some cases, when a database region is added to a database, a non-voting replica for each partition of each row level regional table that is homed external to the added database region may be added to and/or otherwise stored by at least one node corresponding to the added database region. By adding and storing the non-voting replicas as described herein, the database may be able serve follower reads for any data stored by the database.

In some embodiments, cluster regions may be made automatically available for configuration as database regions for a database. Cluster regions may be made available as nodes are started and added to a database if the locality flags are configured on node startup. A particular node of the cluster and data (e.g., range(s)) stored by the node may only correspond to one cluster region and resulting database region based on the locality flag of the node. In some cases, adding a database region to a database may affect data values and data placement within nodes of a cluster. Adding a database region may include one or more steps. Before a database region can be added to a database (e.g., using a ALTER DATABASE <database> ADD REGION <region> statement), the database region must be validated as corresponding to a cluster region. To validate that a database region corresponds to a cluster region, the database may query a list of available cluster regions from a node status table (e.g., as stored by the table kv_node_status) to identify that the database region corresponds to an available cluster region.

In some embodiments, based on validating the database region corresponds to an available cluster region, the database region may be added to an enum (enumeration type).

As an example, the enum may be referred to as crdb_internal_region. The enum may store each of the database regions corresponding to a database. The enum may allow for validation of database regions added to regional tables and may provide for a compact representation of the database regions included in the hidden region column of a row level regional table. The enum may be created and/or otherwise generated when a first database region is added to a database. The enum may be deleted and/or otherwise destroyed when the last database region is removed from a database. The enum may be stored in a public schema of the database and users may not be able to name a schema object using the same name as the enum. If a database object has the name of the enum before the enum is configured, the database may prevent a user from adding a database region to a database until the database object is renamed. A type descriptor may correspond to the enum, where the type descriptor includes an indication of the primary region of the database. Accordingly, a query and/or other operation corresponding to the primary region may interact with the type descriptor of the enum, rather than a database descriptor of the database.

In some embodiments, database region information for a database may be stored in a database descriptor corresponding to the database. Database regions that are added to or removed from a database may be indicated in the database descriptor. In some cases, the database descriptor may be referenced by a query to show the database regions of the database (e.g., a SHOW REGIONS FROM DATABASE statement). The database descriptor may store an indication of the primary region of the database. As described herein, the primary region may be the configured database region for all tables that are not explicitly configured as global or regional tables.

In some embodiments, based on configuring the enum and database descriptor with the database region, the database region may be added to a database zone configuration for the database. The database zone configuration for a database may be created and/or otherwise generated when a first database region is added to the database. The database zone configuration for a database may be deleted and/or otherwise destroyed when the last database region is removed from the database. Based on the hierarchical properties of replication zone configurations, all tables of the database that do not have a defined table zone configuration may inherit the properties of the database zone configuration. If a database region is added to a database, the added database region may be added to the constraints of the database zone configuration. If a database region added to a database is the first database region of the database (or is modified to be the primary region), the database region may be included in the leaseholder preferences of the database zone configuration.

In some embodiments, as described herein, row level regional tables may be partitioned by each region added to the database, where each partition may be stored and/or otherwise homed in their corresponding database region. Accordingly, when a database region is added to the database, new partitions may be required to be added to each of the row level regional tables (and their corresponding indexes) of the database. A replication zone configuration may be generated and/or otherwise created for each new partition to associate the respective partition to the added database region.

In some embodiments, initially adding a database region to a database (thereby creating a multi-region database) can result in changes to table semantics. Databases conventionally have replicas of ranges spread as broadly among geographic regions as possible to enable improved database resiliency in the event of node failures. With the addition of a first database region to a database, all tables of the database may be converted to table level regional tables. Assuming the database is configured with a zone survivability goal, the voting replicas and the leaseholder corresponding to ranges of the table level regional tables may be moved from their respective locations to the primary region of the database as described herein.

In some embodiments, a database region may be removed and/or otherwise dropped from a database. A database region may only be removed from a database if the database region is no longer in use. To remove a database region from a database, a table level regional table may not be homed in the database region and rows of a row level regional table may not be configured for the database region (e.g., via the hidden region column). If a table level regional table is homed in a database region or rows of a row level regional table are configured for the database region, removal of the database region from the database may be blocked. To drop a database region from a database, a user may provide a command to drop the database (e.g., using an ALTER DATABASE <database> DROP REGION <region> statement). Based on receiving the drop command from the user, the database may validate that the database region may be dropped according to the conditions described herein. Based on receiving the drop command from the user, the database region stored in the enum may be moved to read-only state. Use of the read-only state for the database region may enable the database to validate that no regional tables are homed in the database region to be dropped. If the database determines the database region may be dropped, the database region may be removed from the enum and corresponding type descriptor. If the database determines the database region may not be dropped, the database region may be moved from a read-only state to a public state in the enum. If the database determines the database region may be dropped, all row level regional tables may be configured to drop their respective empty partition corresponding to the database region to be dropped. If the database determines the database region may be dropped, table zone configurations and a database zone configuration corresponding to the database may be modified to remove indications of the dropped database region and to adjust the number of replicas (e.g., voting and non-voting replicas) of ranges. If the database determines the database region may be dropped, the dropped database region and corresponding metadata may be removed from the database descriptor.

Configuration of Replication Zones

In some embodiments, as described herein, replication zone configurations may be a mechanism by which the SQL layer may command and/or otherwise cause the replication and placement of data within a cluster of nodes. One or more parameters corresponding to replication zone configurations may be used to adhere to selected survivability goals, database regions, and table locality. Parameters for replication zones may include constraints on a database, a number of voting replicas for each range/table of a database, constraints on voting replicas, lease preferences for leaseholders, a number of replicas for each range/table of a database, and non-blocking ranges.

In some embodiments, parameters for constraints on a database may be configured at the database level using a database zone configuration. Constraints may be used to configure the database regions in which the database includes replicas. As an example, a user may provide and/or execute a statement "constraints={'+region=A': 1, '+region=B': 1, '+region=C': 1, '+region=D': 1}" to configure a constraint that causes at least one replica (e.g., voting replica or non-voting replica) to exist (e.g., be stored) in each of the database regions A, B, C and D. Table zone configurations and partition (e.g., index) zone configurations may inherit constraints from the database zone configuration. For multi-region databases, constraints may be configured such that each database region includes at least one replica (e.g., to serve follower reads).

In some embodiments, a parameter for a number of voters (e.g., num_voters) may be configured at the database level using a database zone configuration. For a zone survivability goal, a number of voters may be automatically configured to be 3 (e.g., at least 3) voting replicas. For a region survivability goal, a number of voters may be automatically configured to be 5 (e.g., at least 5) voting replicas.

In some embodiments, parameters for voter constraints (e.g., voter_constraints) and lease preferences (e.g., lease_preferences) may be configured (e.g., automatically configured) at the database level using a database zone configuration for voting replicas corresponding to a table. Parameters for voter constraints and lease preferences may be automatically configured based a selected survivability goal and a selected table locality (and database region if applicable). Voter constraints may correspond to constraining a location of voting replicas to particular database region(s). Lease preferences may correspond to constraining a location of a leaseholder to a particular database region. In some cases, voter constraints and lease preferences may be configured (e.g., automatically configured) at the table level using a table zone configuration for table level regional tables that are not homed and/or otherwise located in the database's primary region. In some cases, voter constraints and lease preferences may be configured (e.g., automatically configured) at the partition level using a partition zone configuration for row level regional tables. For global tables, voter constraints and lease preferences may not be configured at the table level and global tables may inherit voter constraints and lease preferences from a database zone configuration. As an example, for a database configured with a zone survivability goal, voting replicas and a leaseholder may be constrained to database region "A" using statements "voter_constraints={'+region=A': num_voters}" and "lease_preferences=[['+ region=A']]". As another example, for a database configured with a region survivability goal, less than a quorum of voting replicas and a leaseholder may be constrained to a database region A using statements "voter_constraints={'+region=A': num_voters/2}/*floor division*/" and "lease_preferences=[['+region=A']]".

In some embodiments, a parameter for a number of replicas (e.g., num_replicas) for a table/range may be configured at the database level using a database zone configuration. As an example, for a database configured with a zone survivability goal, a number of replicas for a table may be configured as "num_replicas=<number of regions>+num_voters−1". As another example, for a database configured with a region survivability goal, a number of replicas for a table may be configured as "num_replicas=max (num_voters, (num_voters/2)+<number of regions>−1)".

In some cases, a parameter for a non-blocking range (e.g., non blocking range) may be configured at the table level using a table zone configuration. A parameter for a non-blocking range may correspond to configuring ranges of a particular table as non-blocking, such that KVs of a range modified by a non-blocking write transaction may be readable by concurrent read operations as described herein. The parameter for a non-blocking range may be a Boolean attribute that can be configured as true or false. In some cases, the parameter for a non-blocking range may be configured as true in table zone configurations for all global tables of a multi-region database, such that all global tables have non-blocking ranges. In some cases, the parameter for a non-blocking range may be unconfigured for all other tables of a multi-region database, such that all other tables do not have non-blocking ranges. Other parameters of replication zones (e.g., minimum range size, maximum range size, time until deletion of overwritten values) may be configured independently of multi-region goals (e.g., survivability goals and table locality goals) corresponding to configuration of multi-region databases.

In some embodiments, users may manually configure placement of replicas in the cluster, such that users may override survivability goals and other constraints. A replication zone configuration may include an override parameter (e.g., referred to as override_multi_region_zone_config) that is configured to be false by default. If the override parameter is configured as false and a user configures a parameter of a replication zone configuration that is incompatible with the database's selected survivability goals, the configuration of the parameter may fail. If the override parameter is configured as true and a user configures a parameter of a replication zone configuration that is incompatible with the database's selected survivability goals, the configuration of the parameter may succeed and the user may override the configured constraints of the replication zone configuration. As an example, based on configuring the override parameter as true, a user may manually configure a number of replicas and leaseholder preferences in a database zone configuration. In some cases, if the override parameter is configured as true and a user initiates a change to a multi-region database (e.g., adding new database regions or changing a table's locality), the replication zone configuration, corresponding constraints, and survivability goals may override a user's manual configuration.

Optimization of Voting Replica Placement

In some embodiments, as described herein, a multi-region database may be configured to place replicas (e.g., voting replicas and non-voting replicas) to survive zone failure or region failure based on one or more replication zone configurations. In some cases, voting replicas (e.g., non-leader voting replicas) may be placed to optimize read and write latencies for a multi-region database. For a database configured with a region survivability goal, write transactions would incur cross-region replication latencies, as a quorum of voting replicas may not be located within a particular database region. Accordingly, optimized placement of voting replicas among database regions may improve write latencies within the database.

In some embodiments, an allocator corresponding to the storage (e.g., KV) layer may be configured to place replicas among database regions and nodes of a cluster. Conventionally, the allocator places replicas according to table locality and replication zone configurations, while lacking abilities to place replicas based on their respective latency to their leaseholder. Accordingly, a survive failure attribute (e.g., survive_failure) may be added to the allocator, where the survive failure attribute is a latency-based heuristic (e.g., rule). The survive failure attribute may be configured to one or more values (e.g., values representative of locality tiers). In some cases, the survive failure attribute may be configured to active (e.g., "region"), which may cause the allocator to place replicas within the cluster to optimize resulting write latencies for the data stored by the replicas. In some cases, the survive failure attribute may only be configured to be active if the database is configured for a region survivability goal. If the survive failure attribute is configured to active and the database is configured to a region survivability goal, the allocator may place voting replicas across a maximum of 3 database regions, including the primary region (or database region that includes the leaseholder and/or leader replica) and two other database regions that are the closest to the primary region (or the database region that includes the leaseholder and/or leader replica). The database regions that are the closest to the primary region (or database region that includes the leaseholder and/or leader replica) may be database regions that are the closest in proximity to the primary region of the database (or the database region that includes the leaseholder and/or leader replica) and/or database regions that have the lowest latency to the primary region of the database (or the database region that includes the leaseholder and/or leader replica).

In some embodiments, based on the survive failure attribute being configured as active and the allocator being configured to place voting replicas based on closeness to the primary region, the number of replicas for a particular range may be a dynamic (e.g., changing) value based on the physical state (e.g., the number of database regions) of the cluster. As an example, a cluster may include 7 database regions referred to as database regions A, B, C, D, E, F, and G respectively, where a number of voting replicas for the database is configured to be 5 voting replicas (e.g., num_voters=5). Database region A may be the primary region of the database, where database regions B and C are the closest database regions to the primary region. Accordingly, the allocator may place voting replicas according to a 2-2-1 configuration, where 2 voting replicas (including the leaseholder) are placed in database region A (e.g., the primary region) and the 3 remaining voting replicas are placed among database regions B and C, where database regions B and C each have at least one voting replica. To enable follower reads from each of the database regions as described herein, a non-voting replica may be placed in each of database regions D, E, F, and G, resulting in a total of 9 replicas. Such a configuration may require that database regions A and B each include 2 nodes, which may not exist if each of the database regions A, B, C, D, E, F, and G include 1 node. For a configuration where each of the database regions A, B, C, D, E, F, and G include 1 node, voting replicas may be placed in a 1-1-1-1-1 configuration such that the leaseholder is included in database region A, while 4 other voting replicas are placed in the next 4 closest database regions to the database region A. In some cases, 2 non-voting replicas may be placed in the remaining 2 database regions, such that each database region includes a replica to serve follower reads. Accordingly, the number of replicas (e.g., num_replicas) for a range may vary according to the number nodes included in each database region. To allow to the database to automatically configure the placement of voting replicas and non-voting replicas among nodes to adhere to survivability goals and to serving follower reads (e.g., low-latency follower reads) from each database region, the parameter for a number of replicas (e.g., num_replicas) included in a replication zone configuration may be configured to automatic (e.g., num_replicas=auto), such that the allocator may dynamically determine a number of replicas needed to adhere to constraints of the database. The allocator may automatically determine a number of replicas for a database based on a selected number of voting replicas, a selected survivability goal, and one or more replication zone configurations for a database. The allocator may determine a minimum number of replicas to adhere to the constraints as described, such that the allocator does not configure more than a required number of replicas to adhere to constraints.

Multi-Region Database Configuration

In some embodiments, as described herein, users may use one or more SQL keywords and SQL syntax to configure multi-region databases stored by a cluster of nodes. To identify cluster regions available to a particular database, a client device (e.g., coupled to the cluster 102) communicatively coupled to the database may provide and/or execute a SHOW REGIONS FROM CLUSTER statement. Based on executing the statement, the database may return a listing of one or more cluster regions and one or more associated availability zones to the client device. The one or more cluster regions may be indicative of geographic regions corresponding to the locations of the nodes that store the database. The one or more availability zones may be configured for individual nodes corresponding to each of the cluster regions, where each node can be configured as corresponding to a particular availability zone and each availability zone can include one or more nodes. In some cases, based on identifying one or more cluster regions available to a particular database, a user may add a database region to the database (e.g., thereby making the database a multi-region database). To add a database region to the database, a client device may provide and/or execute an ALTER DATABASE <database> ADD REGION <region> statement, where <database> corresponds to an identifier for the database and <region> corresponds to an identifier for an available cluster region. If the added region is the first region added to the database, the added region may be the primary region for the database. To add a new cluster region to a cluster, a user may startup a new node corresponding to the new cluster regions and may define the cluster region and an availability zone using the node's locality flag. For example, a user may define the locality flag as "-locality=region=us-east-1, zone=us-east-1a", such that a cluster region corresponding to the Eastern United States is available for configuration as a database region (e.g., using an ALTER DATABASE <database> ADD REGION <region> statement). In some cases, based on adding database regions to the database, a user may view the active database regions of the database. To view the active database regions for the database, a client device may provide and/or execute a SHOW REGIONS FROM DATABASE <database> statement. Based on executing the statement, the database may return a listing of one or more database regions and one or more associated availability zones that are active for the database to the client device.

In some embodiments, to configure a region survivability goal for a database, a client device may provide and/or execute an ALTER DATABASE <database> SURVIVE REGION FAILURE statement. Accordingly, the database may adhere to a region survivability goal and may place replicas in the respective database regions that are necessary to maintain region survivability. In some cases, to configure an existing table to a global table, a client device may provide and/or execute an ALTER TABLE <table> SET LOCALITY GLOBAL statement, which may cause the table to be homed in the database's primary region a non-blocking table and serve low latency reads. To configure an existing table as a row level regional table, a client device may provide and/or execute an ALTER TABLE <table> SET LOCALITY REGIONAL BY ROW statement, which may cause the hidden region column to the added to the table. A backfill operation may cause the hidden region column to be added to each replica of the table, where each row of the hidden region column is configured to the primary region of the database. Subsequent insert operations directed to the row level regional table may configure the database region(s) of row(s) subject to the inserts as the database region corresponding to the gateway node (unless the database region is explicitly configured in the insert operations). To reconfigure the primary region of a database, a client device may provide and/or execute an ALTER DATABASE <database> SET PRIMARY REGION <region> statement. Each table level regional table configured for the primary region may be homed in the new primary region of the database after execution of the above statement to reconfigure the primary region of the database. To reconfigure a configured database region for a table level regional table to a database region other than the primary region, a client device may provide and/or execute an ALTER TABLE <table> SET LOCALITY REGIONAL BY TABLE IN <region> statement.

Super Regions

In some embodiments, a multi-region database as described herein may include configuration settings to define and enable super regions each including one or more database regions. In certain examples, a "super region" may refer to a grouping of one or more database regions of a multi-region database, where tables (or partitions) stored in the grouping of the one or more database regions are restricted to remain within the grouping of the one or more database regions (e.g., even in the event of node failure and/or database region failure) of the super region. As described herein, failure of a node may refer to a node going offline and/or being unavailable, such that data (e.g., KV data) stored by the node is unavailable to client devices and/or other nodes of the cluster. Failure of a database region (e.g., a primary region, secondary region, etc.) may refer to a failure of each node corresponding to (e.g., included in, geographically located within, etc.) the database region. Super regions may be used (e.g., by a user via a client device) to restrict particular replicas of regional tables to only the database regions included in a particular super region. Replicas of a regional table may be restricted to placement only in a particular super region based on the home region of the regional table being a database region included in the super region. As described herein, a configured database region (also referred to as a "home region") of a regional table or partition of a regional table (e.g., for a row level regional table) may be selected (e.g., by a user via a client device) from one or more database regions and/or may be the primary region of the database. In some cases, a super region may enforce placement of particular replicas of a range to only database nodes (e.g., database nodes 120) that are geographically located within and assigned to the database region(s) of the super region. While replicas of a particular range may be spread among database region(s) external to a defined super region, the particular replicas that are stored within a database region of the super region are required to remain within the super region, even in the event of a failure. As an example, for three database regions respectively corresponding to Eastern Europe, Central Europe, and Western Europe, a super region defined as "Europe" may include each of the three database regions for Eastern Europe, Central Europe, and Western Europe. In the event that each of the database nodes in the Eastern Europe database region experience a failure at the same time, replicas that were stored by the failed database nodes may be replaced and remain constrained within the Europe super region via replacement onto database nodes located within the Central Europe database region and/or the Western Europe database region. Such an architecture may enable adherence to data domiciling requirements, such as maintaining storage of data within the European Union.

In some embodiments, super regions may only be used for multi-region databases as described herein (e.g., based on a database having a defined primary region) and may be required to be enabled for use with multi-region databases. A super region may only include database regions that have been added (e.g., via an ADD REGION <region> statement) from available cluster regions. In some cases, each database region of a database may only correspond to and be included in one respective super region. For example, for two super regions respectively referred to as super region A and super region B, the database region(s) included in super region A must be disjoint from the database region(s) included in super region B. In some cases, a particular database region may not be dropped from a database (e.g., via an ALTER DATABASE <database> DROP REGION <region> statement) if the database region is included in a super region. For a database region included in a super region, to drop the database region from the database, the super region must be altered to remove the database region from the super region. Based on altering the super region to remove the database region from the super region, the database region may be dropped from the database as described herein. For a database region included in a super region, to drop the database region from the database, the super region must be dropped from the database or the super region must be modified to no longer include the database region. Based on dropping the super region from the database, the database region may be dropped from the database as described herein. In some cases, super regions may be enabled and disabled by a user of the database (e.g., via a client device 106 using SQL syntax described herein), such that replicas of a regional table are restricted to a super region corresponding to the respective home region of the regional table.

In some embodiments, users may use one or more SQL keywords and SQL syntax to enable, disable, and use super regions in a multi-region database as described herein. To add a super region to a multi-region database, a client device may execute an ALTER DATABASE <database> ADD SUPER REGION <name> VALUES <name_list> statement, where "<database>" refers to a name of the multi-region database, "<name>" refers to a name for the super region to be added, and <name_list> refers to one or more database regions to be included in the added super region. To drop (e.g., remove) a super region from a multi-region database, a client device may execute an ALTER DATABASE <database> DROP SUPER REGION <name> statement, where "<database>" refers to a name of the multi-region database and "<name>" refers to a name of the super region to be dropped. To alter a super region of a multi-region database, a client device may execute an ALTER DATABASE <database> ALTER SUPER REGION <name> VALUES <name_list> statement, where "<database>" refers to a name of the multi-region database, "<name>" refers to a name for the altered, and <name_list> refers to one or more database regions to be included in the altered super region. To show super regions added to a multi-region database, a client device may execute an SHOW SUPER REGIONS FROM DATABASE <database> statement, where "<database>" refers to a name of the multi-region database. The SQL syntax described that that can be used to enable, disable, and use super regions may be sent from a client device (e.g., client device 106) to a node (e.g., node 120a) of a cluster (e.g., cluster 102). The nodes of the cluster 102 may communicate and execute one or more operations to cause stored data to adhere to the received SQL syntax.

In some embodiments, super regions may be added to a cluster at a database level, such that for a particular multi-region database, each regional table (e.g., table level regional table and row level regional table) that is homed in a database region included in a super region has all replicas (e.g., voting replicas and non-voting replicas) restricted to nodes located within the database regions of the super region. For a table level regional table that is homed in a database region (e.g., has a home database region) included in a super region, all voting replicas and non-voting replicas (if present) of the table can be restricted to placement (e.g., storage) on database nodes located within the database region(s) of the super region. As an example, for a super region including database regions of Eastern United States, Central United States, and Western United States, when a table level regional table is homed in the Central United States database region, the replicas of the table level regional table can only be stored by respective database nodes located within the Eastern United States, Central United States, and/or Western United States database regions. For a partition of a row level regional table that is homed in a database region included in a super region, all voting replicas and non-voting replicas (if present) of the partition can be restricted to placement (e.g., storage) on database nodes located within the database region(s) of the super region. As an example, for a super region including database regions of Eastern United States, Central United States, and Western United States, when a particular partition of a row level regional table is homed in the Eastern United States database region, the replicas of the partition of the row level regional table can only be stored by respective database nodes located within the Eastern United States, Central United States, and/or Western United States database regions.

In some embodiments, a database configured with one or more super regions may adhere to selected survivability goals, such as a zone survivability goal or a region survivability goal as described herein. For a database including a regional table and configured with a zone survivability goal, a super region including the home database region of the regional table may be required to include 1 database region, where at least 3 database nodes are stored in the at least one database region. For a database including a regional table and configured with a region survivability goal, a super region including the home database region (e.g., such as the primary region) of the regional table may be required to include at least 3 database regions, where at least 3 database nodes (e.g., typically at least 5 database nodes) are located among the at least 3 database regions. In some embodiments, replica replacement in the event of database node failure may adhere to the constraints of super regions as described herein. In the event of a failure of a node storing a replica of a regional table homed in a database region of a super region, the replica may only be replaced onto a database node located within one of the database region(s) of the super region. In the event of a failure of all nodes of the database regions included in a super region, the replicas previously stored on the failed nodes may not be replaced onto nodes stored in database regions external to the super region. The replicas may be replaced onto nodes included in database regions of the super region when the nodes are online and available for storage of replicas.

In some embodiments, the one or more nodes (e.g., nodes 120) of the cluster (e.g., cluster 102) may perform a method for configuration of a super region for a multi-region database. The method may including executing a number of operations at the one or more nodes. In some cases, the operations can include receiving, from a client computing device, a selection of a super region including at least two database regions of a number of database regions, where the number of servers are geographically located within the number of database regions, where each of the at least two database regions includes at least one of the number of servers. The operations can include providing, based on a survivability goal (e.g., a zone survivability goal), at least three voting replicas of a data partition stored by the number of servers in the at least two database regions of the super region, where at least one of the at least three voting replicas is stored within a first database region of the at least two database regions, where the at least three voting replicas are configured to participate in a consensus protocol to commit write operations to the data partition. The operations can include, based on a failure of the first database region, causing storage of the at least one voting replica of the failed first database region (i) within the super region and (ii) external to the failed first database region.

In some cases, before the failure of the first database region, each of at least three availability zones includes at least one voting replica of the at least three voting replicas. When the survivability goal is a zone survivability goal, the data partition is available when less than a majority of the at least three voting replicas experiences a failure. In some cases, (i) one of the at least three voting replicas is configured as a leaseholder replica to coordinate read operations directed to the data partition, and (ii) one of the at least three voting replicas is configured as a leader replica to coordinate the consensus protocol to commit write operations to the data partition. The leaseholder replica and the leader replica may be the same voting replica of the at least three voting replicas.

In some case, the survivability goal is a region survivability goal, and the super regions can include at least three database regions of the number of database regions. In some cases, before the failure of the first database region: the at least three database regions each store less than a majority number of the at least three voting replicas; the at least three database regions each store at least one of the at least three voting replicas; one database region of the at least three database regions stores a threshold number of the at least three voting replicas; and the threshold number is the majority number minus one. When the survivability goal is a region survivability goal, the data partition is available when one of the at least three database regions experiences a failure. In some cases, the at least three voting replicas further include at least five voting replicas of the data partition. The operations can include providing, based on the region survivability goal, the at least five voting replicas of the data partition stored by the number of servers in the at least three database regions, where at least one of the at least five voting replicas is stored within the first database region of the at least three database regions, where the at least five voting replicas are configured to participate in the consensus protocol to commit write operations to the data partition. The operations can include providing one or more non-voting replicas of the data partition stored by the number of servers in the at least two database regions, where the one or more non-voting replicas of the partition are not configured to participate in the consensus protocol to commit the write operations to the data partition.

Secondary Regions

In some embodiments, a multi-region database as described herein may include configuration settings to define and enable secondary regions that operate as designated failover database regions in the event of a failure of the primary region. Failure of the primary region as described herein may refer to a failure of each of the database nodes in the primary region that store replicas of a particular table or index at a same time, such that the replicas stored in the primary region are unavailable for use in the database during the failure. In certain examples, a "secondary region", "secondary database region", and/or "SECONDARY REGION" may refer to a database region of a multi-region database that is a preferred database region in which to store voting replicas. When a primary region of a database experiences a failure and is unavailable, the voting replicas (e.g., including the leaseholder and/or leader replicas) that were stored by the failed primary region may be replaced and stored in the secondary region. For a database configured with a primary region, a zone survivability goal, and at least 3 voting replicas of each table (or partition), a primary region may store at least 1 voting replicas of the at least 3 voting replicas and a secondary region may or may not store any of the at least three voting replicas. For a database configured with a primary region, a region survivability goal, and at least 5 voting replicas of each table (or partition), a primary region may store at least 2 voting replicas of the at least 5 voting replicas and a secondary region may store at least 2 voting replicas of the at least 5 voting replicas. For a region survivability goal, a primary region and secondary region may each store a threshold number of voting replicas, where the threshold number is a majority number of the voting replicas minus one. A secondary region may have a lease preference associated with the secondary region, such that the secondary region is a preferred database region in which to store the leaseholder and/or leader replicas. A secondary region may be selected (e.g., designated by a user via a client device) and used to indicate a preference for (e.g., restrict) a designated database region to which the replicas (e.g., including leaseholder and/or leader replicas) of a failed primary region may be replaced, such that replicas that were previously stored by database nodes corresponding to the failed primary region can be replaced and stored by database nodes corresponding to the secondary region. In some cases, a secondary region may be a preference for replacement of replicas previously stored in a failed primary region when the primary region is unavailable. In some cases, a secondary region may be a restriction such that replicas previously stored in a failed primary region can only be replaced and stored by nodes of the secondary region when the primary region is unavailable. A secondary region may be selected from a group including the one or more cluster regions available to the multi-region database and excluding the primary region. Adding a secondary region to a multi-region database that was only a cluster region and not previously a database region may additionally add the secondary region as a database region to the multi-region database.

In some embodiments, a secondary region may be used to prevent random replacement of replicas (e.g., voting replicas including leaseholder and/or leader replicas) previously stored by the failed primary region onto database nodes of another database region of the database and may enable optimized (e.g., performance-optimized) replacement of replicas. A designated secondary region may include the features of and operate as the primary region as described herein when the primary region experiences a failure and remains unavailable. As an example, leaseholder and leader replicas that were stored by database nodes corresponding to the primary region may be replaced onto database nodes corresponding to the secondary region in the event of a primary region failure.

In some embodiments, users may use one or more SQL keywords and SQL syntax to add and drop secondary regions in a multi-region database as described herein. To add a secondary region to a multi-region database, a primary region must be selected for the multi-region database. To add a secondary region to a multi-region database, a client device may execute an ALTER DATABASE <database> ADD SECONDARY REGION <name> statement, where "<database>" refers to a name of the multi-region database and "<name>" refers to a name for the secondary region to be added. Based on (e.g., after) executing the above statement to add the secondary region, the added secondary region may operate as the primary region in the event of a failure of the primary region. To drop (e.g., remove) a secondary region from a multi-region database, a client device may execute an ALTER DATABASE <database> DROP SECONDARY REGION <name> statement, where "<database>" refers to a name of the multi-region database and "<name>" refers to a name of the secondary region to be dropped. The SQL syntax described that can be used to add and drop a secondary region for multi-region database may be sent from a client device (e.g., client device 106) to a node (e.g., node 120*a*) of a cluster (e.g., cluster 102). The nodes of the cluster 102 may communicate and execute one or more operations to cause stored data to adhere to the received SQL syntax.

In some embodiments, secondary regions may be configured for multi-region databases configured with a region survivability goal or zone survivability goal. In some cases, secondary regions may not be configured for multi-region databases configured with a zone survivability goal may only be configured for multi-region databases configured with a region survivability goal and may not be configured for multi-region databases configured with a zone survivability goal. As described herein, a multi-region database configured with a region survivability goal may include at least 3 database regions and at least 5 voting replicas of each table and/or partition. In some cases, for a region survivability goal and for global tables and/or regional tables homed in the primary region, a minimum of 2 voting replicas (including the leaseholder and/or leader replica(s)) may be required to be stored by database nodes within the database's primary region. When a secondary region is added to the database, database nodes of the secondary region may be required to store at least 2 voting replicas of global tables and/or regional tables that are homed in the primary region. For global tables and/or regional tables homed in the primary region of a database including 3 database regions, 5 voting replicas of each table and/or partition, and a selected secondary region, the primary region may store 2 voting replicas of each respective table or partition, the secondary region may store 2 voting replicas of each respective table or partition, and a third database region may store 1 voting replica of each respective table or partition.

As described herein, parameters for voter constraints and lease preferences may be automatically configured based on a selected survivability goal and a selected table locality (and database region if applicable). For tables having leaseholder replicas homed in the primary region, the respective lease preferences for the tables may indicate the primary region as the preferred database region to store the leaseholder replica. When a secondary region is added to the database, for tables having leaseholder replicas homed in the primary region, the respective lease preferences for the tables may indicate the primary region and secondary region as the preferred database regions to store the leaseholder replicas, such that the leaseholder replicas are primarily stored in the primary region and may be stored in the secondary region in the event of a failure of the primary region. In some cases, in the event of a failure of both the primary region and the secondary region, the leaseholder replicas may be replaced and stored in a database region other than the primary and secondary regions. In some cases, in the event of a failure of both the primary region and the secondary region, the leaseholder replicas may not be replaced and stored in a database region other than the primary and secondary regions.

In some embodiments, for a database including super regions as described herein, one or more constraints may be required when using secondary regions and super regions in the database. When the primary region of the database is included in a super region, an added secondary region for the database must be included in the super region. When the primary region of the database is not included in a super region, an added secondary region for the database must not be included in a super region. Such constraints may enable replicas to adhere to survivability goals and failover mechanisms corresponding to super regions and secondary regions.

In some embodiments, the one or more nodes (e.g., nodes 120) of the cluster (e.g., cluster 102) may perform a method for configuration of a secondary region for a multi-region database. The method may including executing a number of operations at the one or more nodes. In some cases, the operations can include receiving, from a client computing device, a selection of a secondary database region of a number of database regions, where the number of servers are geographically located within the number of database regions. The operations can include providing, based on a survivability goal, at least three voting replicas of a data partition stored by the number of servers in at least one database region of the number of database regions, where the at least one database region includes a primary database region, where the at least three voting replicas are configured to participate in a consensus protocol to commit write operations to the partition, where the primary database region includes at least one voting replica of the at least three voting replicas. The operations can include, based on a failure of the primary database region, causing storage of the at least one voting replica of the failed primary database region within the secondary database region.

In some embodiments, before the failure of the primary database region, each of at least three availability zones includes at least one voting replica of the at least three voting replicas. When the survivability goal is a zone survivability goal, the data partition is available when less than a majority of the at least three voting replicas experiences a failure. In some cases, (i) one of the at least three voting replicas is configured as a leaseholder replica to coordinate read operations directed to the data partition, (ii) one of the at least three voting replicas is configured as a leader replica to coordinate the consensus protocol to commit write operations to the data partition, and (iii) the primary database region includes the leaseholder replica and the leader replica. In some cases, causing storage of the at least one voting replica of the at least three voting replicas of the failed primary database region within the secondary database region further includes: causing storage of the leaseholder replica and the leader replica of the failed primary database region within the secondary database region. The leaseholder replica and the leader replica may be the same voting replica of the at least three voting replicas.

In some embodiments, the survivability goal is a region survivability goal and the at least one database region further includes at least three database regions of the number of database regions. In some cases, before the failure of the primary database region: the at least three database regions each store less than a majority number of the at least three voting replicas; the at least three database regions each store at least one of the at least three voting replicas; the primary database region stores a threshold number of the at least three voting replicas; and the threshold number is the majority number minus one. In some cases, before the failure of the primary database region, the secondary region stores the threshold number of the at least three voting replicas. When the survivability goal is a region survivability goal, the data partition is available when one of the at least three database regions experiences a failure. In some cases, the at least three voting replicas further include at least five voting replicas of the data partition. The operations can include providing, based on the region survivability goal, the at least five voting replicas of a data partition stored by the number of servers in the at least three database regions of the number of database regions, where the at least three database regions include the primary database region and the secondary database region, where the at least five voting replicas are configured to participate in the consensus protocol to commit write operations to the partition. The operations can include, based on the failure of the primary database region, causing storage of the threshold number of the at least five voting replicas of the failed primary database region within the secondary database region. In some cases, the operations can include providing one or more non-voting replicas of the data partition stored by the number of servers in a subset of the number of database regions to that do not store at least one of the at least three voting replicas, where the one or more non-voting replicas of the partition are not configured to participate in the consensus protocol to commit the write operations to the data partition.

Placement Restricted Replicas

In some embodiments, a multi-region database as described herein may include configuration settings to constrain placement of replicas in database regions. Regional tables (e.g., table level regional tables and row level regional tables) of a database with a zone survivability goal may be configured to have restricted replica placement, such that non-voting replicas of the regional table may be dropped from the database (e.g., for an existing database) or may not be placed in the database (e.g., for a newly created database). Use of a restricted replica placement configuration may enable a user to opt out of placing non-voting replicas for a database's regional tables. In some cases, if non-voting replicas are selected by a user to meet data accessibility goals, the non-voting replicas may be restricted to the regional table's configured database region (also referred at regional table's home region). Restricted replica placement may be enabled by a user of the database (e.g., via a client device 106 using SQL syntax described herein), such that non-voting replicas may be not be placed (e.g., stored) in the database or restricted to placement only in a regional table's home region.

In some embodiments, users may use one or more SQL keywords and SQL syntax to configure restricted or default (e.g., standard) placement of replicas. To configure replica placement for each of a multi-region database's regional tables, a client device may execute an ALTER DATABASE <database> PLACEMENT <placement_policy> statement, where "<database>" refers to a name of the multi-region database and "<placement_policy>" refers to a "default" or a "restricted" placement policy for the multi-region database corresponding to <database>. As an example, to restrict placement of non-voting replicas to database regions external to a regional table's home region, a client device may execute an ALTER DATABASE <database> PLACEMENT RESTRICTED statement. As another example, to use default placement of non-voting replicas in each of the database's database regions, a client device may execute an ALTER DATABASE <database> PLACEMENT DEFAULT statement. In some cases, replica placement may be configured when a database is created. For example, to configure a replica placement policy at a database creation time, a client device may execute a CREATE DATABASE <database> PRIMARY REGION <region> REGIONS <region_list> PLACEMENT <placement_policy> statement. The SQL syntax used to configure replica placement may be sent from a client device (e.g., client device 106) to a node (e.g., node 120a) of a cluster (e.g., cluster 102).

In some embodiments, replica placement configuration (e.g., default or restricted) may not apply to global tables as described herein, such that non-voting replicas are always placed in each database region that does not include a voting replica of a global table. For a default replica placement configuration, voting replicas will be placed in as many database regions as necessary to adhere to the selected survivability goals of the database. The default replica placement configuration may enable fast, stale reads from all database regions.

In some embodiments, for a restricted replica placement configuration, replicas can be constrained to only the database regions where the regional table has a voting replica. If no non-voting replicas are required to meet selected data survivability goals (e.g., a zone survivability goal), for a restricted replica placement configuration, existing non-voting replicas of a regional table may be dropped from all database regions. If non-voting replicas are required to meet selected data survivability goals, non-voting replicas of a table level regional table or a partition of a row level regional table may be constrained to being placed (e.g., stored) only in the regional table's home region (e.g., via node(s) geographically located in the home region). For a table level regional table, with restricted replica placement, voting replicas and non-voting replica(s) (if present) may be constrained to the table's home region. For a row level regional table, voting replicas and non-voting replica(s) (if present) for each partition of the table may be constrained to the partition's home region (e.g., as indicated by the hidden region column in the row level regional table).

In some embodiments, regional tables that are configured with a restricted replica placement configuration may not provide fast, stale reads from database regions outside of the selected home region based on the removal of non-voting replicas from the other database regions. In some cases, the restricted replica placement configuration as described herein may only be enabled for a multi-region database configured with a zone survivability goal, such that a multi-region database with a region survivability goal may not use a restricted replica placement configuration. For regional tables added to the database with a configured zone survivability goal, the regional tables may be configured with a default replica placement configuration.

In some embodiments, the one or more nodes (e.g., nodes 120) of the cluster (e.g., cluster 102) may perform a method for restricting replica placement in a multi-region database. The method may including executing a number of operations at the one or more nodes. In some cases, the operations can include providing at least three voting replicas of a data partition stored by the number of servers in a first database region of a number of database regions, where the number of servers are geographically located within the number of database regions, where each of the at least three voting replicas is configured to participate in a consensus protocol to commit write operations to the data partition. The operations can include providing, in each database region of a subset of the number of database regions that do not store the at least three voting replicas, a non-voting replica of the partition, where each non-voting replica is not configured to participate in the consensus protocol to commit the write operations to the data partition. The operations can include receiving, from a client computing device, a selection of a restricted replica placement configuration configured to cause removal of the non-voting replica from each of the subset of the number of database regions. The operations can include causing removal, based on the received selection of the restricted replica placement configuration, of the non-voting replica from each database region of the subset of the number of database regions.

In some embodiments, the data partition is available when less than a majority of the at least three voting replicas experiences a failure. In some cases, (i) one of the at least three voting replicas is configured as a leaseholder replica to coordinate read operations directed to the data partition, and (ii) one of the at least three voting replicas is configured as a leader replica to coordinate the consensus protocol to commit write operations to the data partition. The leaseholder replica and the leader replica may be the same voting replica of the at least three voting replicas.

Modified Zone Configurations

As described herein, replication zone configurations may determine a number and placement of voting replicas and non-voting replicas (when present) among nodes of a cluster. In some embodiments, additional zone configuration extensions may be used to further adapt and customize the multi-region database abstractions described herein, including replica placement among database regions according to table locality and/or survivability goals. Zone configuration extensions may enable users to assign additional requirements to individual database regions of a multi-region database, such that table zone configurations corresponding to partitions of row level regional tables and table level regional tables are updated based on the specified parameters of the assigned zone configuration extensions. Database objects that are localized (e.g., homed) in a particular database region may have a zone configuration defined by parameters that are provided by a user. Further, such parameters may be automatically applied to a database stored by nodes of a cluster when the database's schema and/or setup changes. For example, the parameters of the zone configuration extensions may be automatically applied when a new table is added to the database, a table changes locality type (e.g., from row level regional to table level region), and a new database region is added to the database. Some non-limiting examples of parameters that may be specified using zone configuration extensions can include a minimum size of a range, a maximum size of a range, an amount of time for which overwritten values will be retained before garbage collection, a number of replicas, a number of voting replicas, preferences for placement of leaseholder replicas, and constraints for placement of voting replicas.

In some embodiments, using zone configuration extensions, multi-region abstractions for configuration of a multi-region database may be implemented via one or more commands (e.g., SQL commands) that are sent by a client (e.g., SQL client) operating at a client device that is communicatively connected to the cluster. Examples of SQL syntax that may be used in commands for configuration of multi-region databases using zone configuration extensions may include ALTER DATABASE <database> ALTER LOCALITY <locality> CONFIGURE ZONE USING <configuration>, where "<configuration>" refers to statements for configuration of parameters for placement of replicas (e.g., voting and/or non-voting replicas), numbers of replicas, and/or placement of leaseholder replicas among database regions. As described herein, <database> may refer to an identifier for the created/altered database, <locality> may refer to an identifier for a global table locality or a regional (e.g., regional by row or regional by table) table locality, where replicas of tables and/or partitions having the specified table locality are subject to the defined zone configuration extensions. A table locality indicated by <LOCALITY> may be global, regional, or regional in {region}. A global table locality (e.g., indicated by <GLOBAL>) may correspond to all tables having a global table locality. A regional table locality (e.g., indicated by <REGIONAL>) may correspond to all tables having a regional table locality, including row level regional tables and table level regional tables. A regional in {region} table locality (e.g., indicated by <REGIONAL_IN>) may correspond to all table level regional tables homed in a database region indicated by {region} and all row level regional tables having partitions homed in the database region indicated by {region}.

In some embodiments, zone configuration extensions may enable a user to control data domiciling for replicas of tables included in a particular multi-region database that are homed in a particular database region. To implement data domiciling via zone configuration extensions, a user may provide a selection of: a database, a table locality of tables to which the zone configuration extensions are to be applied, and a number of replicas of the tables that can be included in a database region. For example, for a database configured to survive zone failure (e.g., with 3 voting replicas for each table) and including three database regions (e.g., Eastern US, Western US, and Western Europe), a user may provide a selection specifying that only 3 replicas of a table (e.g., a table level or row level regional table) are included in the database, thereby causing only voting replicas of the table to exist and be stored in the home database region. The selection of a number of replicas of a table that are included in a particular database region may be applied for each table included in the database that is homed in the database region. An example of a SQL command provided by a client device to control data domiciling for placement of replicas of a table may be ALTER DATABASE <database> ALTER LOCALITY <locality> CONFIGURE ZONE USING num_replicas=3, where "num_replicas=3" refers to the specification of 3 replicas (e.g., combined number of voting and non-voting replicas) for a parameter for a number of replicas of a table and/or partition having a table locality (e.g., global or regional) identified by <locality>.

In some embodiments, zone configuration extensions may enable a user to control failover regions (e.g., database regions to which failed replicas may be replaced) for replicas (e.g., voting replicas) of tables included in a multi-region database. To control failover regions via zone configuration extensions, a user may provide a selection of a database, a selection of a table locality of tables to which the failover region(s) are to be applied, a selection to constrain a number of voting replicas of a table to particular database region(s), and a selection to constrain a leaseholder replica for the table to particular database region(s). For example, for a database configured to survive region failure (e.g., with 5 voting replicas for each table) and including three database regions (e.g., Eastern US, Western US, and Western Europe), a user may provide a selection (1) specifying a table locality of tables for which to configure failover region(s); (2) specifying that 2 voting replicas are to be placed in both a first database region and a second database region; and (3) specifying that the leaseholder replica is to be placed in either the first database region or the second database region. A SQL command provided by a client device to control failover regions for failed replicas of a table may be ALTER DATABASE <database> ALTER LOCALITY <locality> CONFIGURE ZONE USING <voter constraints>, <lease preferences>, where "<voter constraints>" refers specification of parameters for particular database region(s) for particular numbers of voting replicas and where "<lease preferences>" refers specification of parameters for particular database region(s) in which the leaseholder replica may be placed.

In some embodiments, zone configuration extensions may enable a user to configure super regions (e.g., a group of database regions) for replicas of tables included in a multi-region database. To a configure a super region via zone configuration extensions, a user may provide a selection of a database, a selection of a table locality of tables to be included in a super region, a selection of the number of replicas for the tables included in the super region, a selection to constrain a number of replicas of the table to particular database region(s), and a selection to constrain a leaseholder replica for the tables included in the super region to particular database region(s). For example, for a database configured to survive region failure (e.g., with 5 voting replicas for each table) and including six database regions (e.g., Eastern US, Western US, Western Europe, Central Europe, and Eastern Europe), a user may provide a selection (1) specifying a table locality of tables to be included in a super region; (2) specifying that 5 replicas of the tables (e.g., table level or row level regional table) may exist; (3) specifying that 2 voting replicas of the tables are to be placed in both a first database region and a second database region; (4) specifying that 1 voting replica of the each of the tables must be placed in a third database region; and (5) specifying that the leaseholder replica is to be placed in either the first database region or the second database region. The specified first, second, and third database regions may form a super region. A SQL command provided by a client device to configure a super region for replicas of a table may be ALTER DATABASE <database> ALTER LOCALITY <locality> CONFIGURE ZONE USING <num_replicas>, <constraints>, <lease preferences>, where "<num_replicas>" refers to the specification of a parameter for a number replicas (e.g., voting and non-voting replicas) for a tables having a table locality identified by <locality>, "<constraints>" refers specification of parameters for particular database region(s) for particular numbers of replicas of the tables, and where "<lease preferences>" refers specification of parameters for particular database region(s) in which the leaseholder replica of each of the tables may be placed. A user may provide such a SQL command to configure a super region including one or more database regions.

Further Description of Some Embodiments

Figure 3:
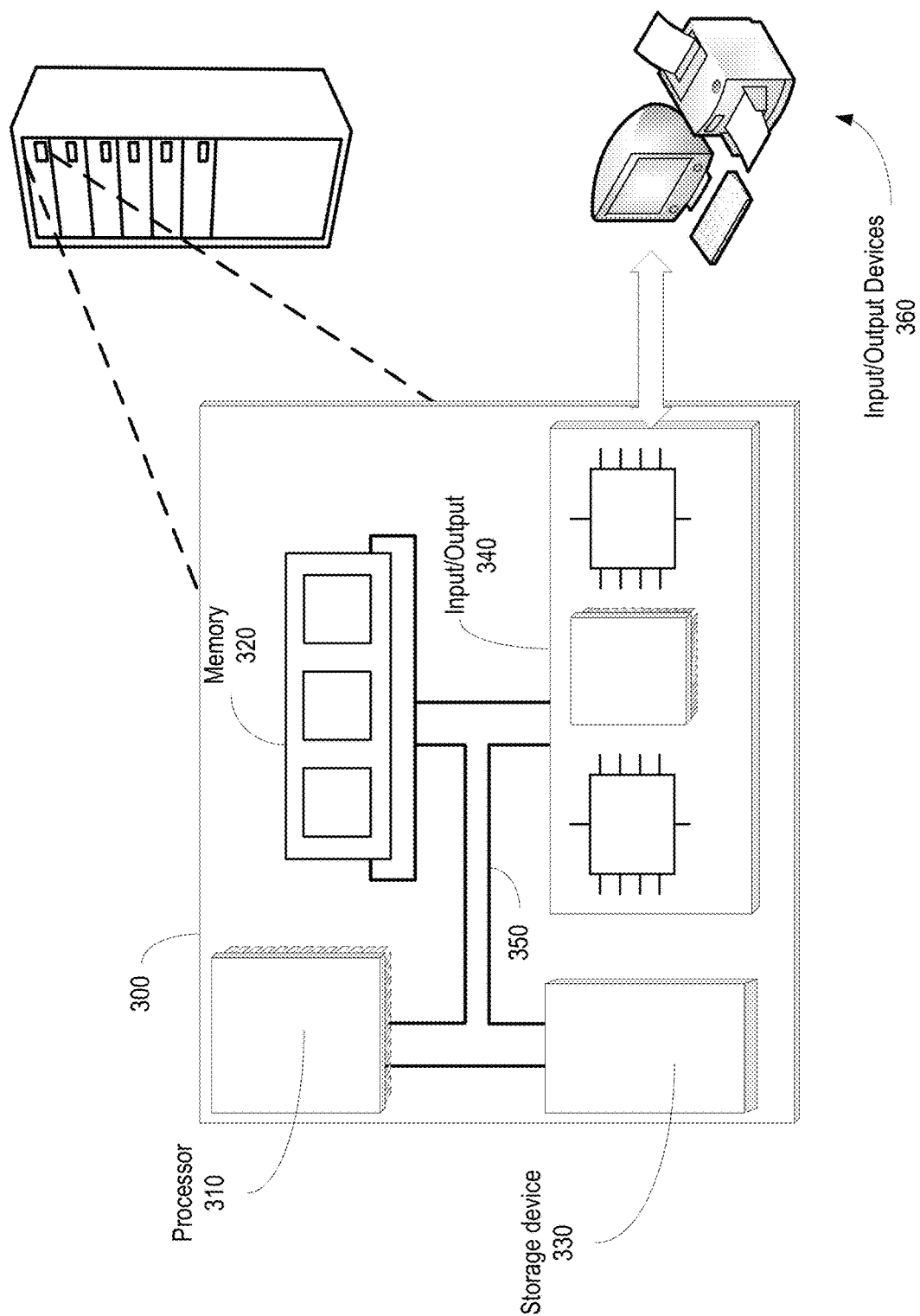
FIG. 3 is a block diagram of an example computer system, according to some embodiments.

FIG. 3 is a block diagram of an example computer system 300 that may be used in implementing the technology described in this document. General-purpose computers, network appliances, mobile devices, or other electronic systems may also include at least portions of the system 300. The system 300 includes a processor 310, a memory 320, a storage device 330, and an input/output device 340. Each of the components 310, 320, 330, and 340 may be interconnected, for example, using a system bus 350. The processor 310 is capable of processing instructions for execution within the system 300. In some implementations, the processor 310 is a single-threaded processor. In some implementations, the processor 310 is a multi-threaded processor. The processor 310 is capable of processing instructions stored in the memory 320 or on the storage device 330.

The memory 320 stores information within the system 300. In some implementations, the memory 320 is a non-transitory computer-readable medium. In some implementations, the memory 320 is a volatile memory unit. In some implementations, the memory 320 is a non-volatile memory unit.

The storage device 330 is capable of providing mass storage for the system 300. In some implementations, the storage device 330 is a non-transitory computer-readable medium. In various different implementations, the storage device 330 may include, for example, a hard disk device, an optical disk device, a solid-date drive, a flash drive, or some other large capacity storage device. For example, the storage device may store long-term data (e.g., database data, file system data, etc.). The input/output device 340 provides input/output operations for the system 300. In some implementations, the input/output device 340 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 360. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 330 may be implemented in a distributed way over a network, for example as a server farm or a set of widely distributed servers, or may be implemented in a single computing device.

Although an example processing system has been described in FIG. 3, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for configuration of a super region in a database, comprising:
   executing operations on one or more processors of one or more of a plurality of servers, the operations comprising:
   receiving, from a client computing device, a selection of a super region comprising at least three database regions of a plurality of database regions, wherein the plurality of servers are geographically located within the plurality of database regions, wherein each of the at least three database regions comprises at least one of the plurality of servers;
   providing, based on a region survivability goal, at least three voting replicas of a data partition stored by the plurality of servers in the at least three database regions, wherein at least one voting replica of the at least three voting replicas is stored within a first database region of the at least three database regions, wherein the at least three voting replicas are configured to participate in a consensus protocol to commit write operations to the data partition; and based on a failure of the first database region that causes removal of the at least one voting replica from the first database region, causing storage of the at least one voting replica of the failed first database region (i) within the super region and (ii) external to the failed first database region, wherein before the failure of the first database region:

the at least three database regions each store less than a majority number of the at least three voting replicas;

the at least three database regions each store at least one of the at least three voting replicas;

at least one database region of the at least three database regions stores a threshold number of the at least three voting replicas; and the threshold number is the majority number minus one.

2. The method of claim 1, wherein (i) one of the at least three voting replicas is configured as a leaseholder replica to coordinate read operations directed to the data partition, and (ii) one of the at least three voting replicas is configured as a leader replica to coordinate the consensus protocol to commit the write operations to the data partition.

3. The method of claim 2, wherein one of the at least three voting replicas is configured as both the leaseholder replica and the leader replica.

4. The method of claim 1, wherein for the region survivability goal, the data partition is available when one of the at least three database regions experiences a failure.

5. The method of claim 1, wherein the at least three voting replicas further comprise at least five voting replicas of the data partition, and wherein the operations further comprise:

providing, based on the region survivability goal, the at least five voting replicas of the data partition stored by the plurality of servers in the at least three database regions, wherein at least one of the at least five voting replicas is stored within the first database region of the at least three database regions, wherein the at least five voting replicas are configured to participate in the consensus protocol to commit the write operations to the data partition.

6. The method of claim 5, wherein (i) one of the at least five voting replicas is configured as a leaseholder replica to coordinate read operations directed to the data partition, and (ii) one of the at least five voting replicas is configured as a leader replica to coordinate the consensus protocol to commit the write operations to the data partition.

7. The method of claim 6, wherein one of the at least five voting replicas is configured as both the leaseholder replica and the leader replica.

8. The method of claim 1, wherein the operations further comprise:

providing one or more non-voting replicas of the data partition stored by the plurality of servers in the at least three database regions, wherein the one or more non-voting replicas of the partition are not configured to participate in the consensus protocol to commit the write operations to the data partition.

9. The method of claim 1, wherein a data table comprises one or more data partitions comprising the data partition.

10. A method for configuration of a secondary database region in a database, comprising:

executing operations on one or more processors of one or more of a plurality of servers, the operations comprising:

receiving, from a client computing device, a selection of a secondary database region of a plurality of database regions, wherein the plurality of servers are geographically located within the plurality of database regions;

providing, based on a region survivability goal, at least three voting replicas of a data partition stored by the plurality of servers in at least three database regions of the plurality of database regions, wherein the at least three database regions comprise a primary database region, wherein the at least three voting replicas are configured to participate in a consensus protocol to commit write operations to the data partition, wherein the primary database region comprises at least one voting replica of the at least three voting replicas; and based on a failure of the primary database region that causes removal of the at least one voting replica from the primary database region, causing storage of the at least one voting replica of the failed primary database region within the secondary database region, wherein before the failure of the primary database region:

the at least three database regions each store less than a majority number of the at least three voting replicas;

the at least three database regions each store at least one of the at least three voting replicas;

the primary database region stores a threshold number of the at least three voting replicas; and the threshold number is the majority number minus one.

11. The method of claim 10, wherein (i) one of the at least three voting replicas is configured as a leaseholder replica to coordinate read operations directed to the data partition, (ii) one of the at least three voting replicas is configured as a leader replica to coordinate the consensus protocol to commit the write operations to the data partition, and (iii) the primary database region comprises the leaseholder replica and the leader replica, and wherein causing storage of the at least one voting replica of the at least three voting replicas of the failed primary database region within the secondary database region further comprises:

causing storage of the leaseholder replica and the leader replica of the failed primary database region within the secondary database region.

12. The method of claim 11, wherein one of the at least three voting replicas is configured as both the leaseholder replica and the leader replica.

13. The method of claim 10, wherein before the failure of the primary database region, the secondary database region stores the threshold number of the at least three voting replicas.

14. The method of claim 10, wherein for the region survivability goal, the data partition is available when one of the at least three database regions experiences a failure.

15. The method of claim 10, wherein the at least three voting replicas further comprise at least five voting replicas of the data partition, and wherein the operations further comprise:

providing, based on the region survivability goal, the at least five voting replicas of the data partition stored by the plurality of servers in the at least three database regions of the plurality of database regions, wherein the at least three database regions comprise the primary database region and the secondary database region, wherein the at least five voting replicas are configured to participate in the consensus protocol to commit the write operations to the data partition; and based on the failure of the primary database region, causing storage of the threshold number of the at least five voting replicas of the failed primary database region within the secondary database region.

16. The method of claim 15, wherein (i) one of the at least five voting replicas is configured as a leaseholder replica to coordinate read operations directed to the data partition, (ii)

one of the at least five voting replicas is configured as a leader replica to coordinate the consensus protocol to commit the write operations to the data partition, and (iii) the primary database region comprises the leaseholder replica and the leader replica, and wherein causing storage of the at least one voting replica of the at least three voting replicas of the failed primary database region within the secondary database region further comprises:
  causing storage of the leaseholder replica and the leader replica of the failed primary database region within the secondary database region.

17. The method of claim 16, wherein one of the at least five voting replicas is configured as both the leaseholder replica and the leader replica.

18. The method of claim 10, wherein the operations further comprise:
  providing one or more non-voting replicas of the data partition stored by the plurality of servers in a subset of the plurality of database regions to that do not store at least one of the at least three voting replicas, wherein the one or more non-voting replicas of the data partition are not configured to participate in the consensus protocol to commit the write operations to the data partition.

19. The method of claim 10, wherein a data table comprises one or more data partitions comprising the data partition.

20. A method for restricting replica placement in a database, comprising:
  executing operations on one or more processors of one or more of a plurality of servers, the operations comprising:
  providing at least three voting replicas of a data partition stored by the plurality of servers in a first database region of a plurality of database regions, wherein the plurality of servers are geographically located within the plurality of database regions, wherein each of the at least three voting replicas is configured to participate in a consensus protocol to commit write operations to the data partition;
  providing, in each database region of a subset of the plurality of database regions that do not store the at least three voting replicas, a non-voting replica of the data partition, wherein each non-voting replica is not configured to participate in the consensus protocol to commit the write operations to the data partition;
  receiving, from a client computing device, a selection of a restricted replica placement configuration configured to cause removal of the non-voting replica from each of the subset of the plurality of database regions; and
  causing removal, based on the received selection of the restricted replica placement configuration, of the non-voting replica from each database region of the subset of the plurality of database regions.

21. The method of claim 20, wherein the data partition is available when less than a majority of the at least three voting replicas experiences a failure.

22. The method of claim 20, wherein (i) one of the at least three voting replicas is configured as a leaseholder replica to coordinate read operations directed to the data partition, and (ii) one of the at least three voting replicas is configured as a leader replica to coordinate the consensus protocol to commit the write operations to the data partition.

23. The method of claim 22, wherein one of the at least three voting replicas is configured as both the leaseholder replica and the leader replica.

24. The method of claim 20, wherein a data table comprises one or more data partitions comprising the data partition.

25. A system comprising:
  one or more of a plurality of servers each having one or more processors, the processors configured to execute instructions to perform operations comprising:
  receiving, from a client computing device, a selection of a super region comprising at least three database regions of a plurality of database regions, wherein the plurality of servers are geographically located within the plurality of database regions, wherein each of the at least three database regions comprises at least one of the plurality of servers;
  providing, based on a region survivability goal, at least three voting replicas of a data partition stored by the plurality of servers in the at least three database regions, wherein at least one voting replica of the at least three voting replicas is stored within a first database region of the at least three database regions, wherein the at least three voting replicas are configured to participate in a consensus protocol to commit write operations to the data partition; and
  based on a failure of the first database region that causes removal of the at least one voting replica from the first database region, causing storage of the at least one voting replica of the failed first database region (i) within the super region and (ii) external to the failed first database region, wherein before the failure of the first database region:
  the at least three database regions each store less than a majority number of the at least three voting replicas;
  the at least three database regions each store at least one of the at least three voting replicas;
  at least one database region of the at least three database regions stores a threshold number of the at least three voting replicas; and
  the threshold number is the majority number minus one.

26. A system comprising:
  one or more of a plurality of servers each having one or more processors, the processors configured to execute instructions to perform operations comprising:
  receiving, from a client computing device, a selection of a secondary database region of a plurality of database regions, wherein the plurality of servers are geographically located within the plurality of database regions;
  providing, based on a region survivability goal, at least three voting replicas of a data partition stored by the plurality of servers in at least three database regions of the plurality of database regions, wherein the at least three database regions comprise a primary database region, wherein the at least three voting replicas are configured to participate in a consensus protocol to commit write operations to the data partition, wherein the primary database region comprises at least one voting replica of the at least three voting replicas; and
  based on a failure of the primary database region that causes removal of the at least one voting replica from the primary database region, causing storage of the at least one voting replica of the failed primary database region within the secondary database region, wherein before the failure of the primary database region:
  the at least three database regions each store less than a majority number of the at least three voting replicas;
  the at least three database regions each store at least one of the at least three voting replicas;

the primary database region stores a threshold number of the at least three voting replicas; and the threshold number is the majority number minus one.

27. A system comprising:

one or more of a plurality of servers each having one or more processors, the processors configured to execute instructions to perform operations comprising:

providing at least three voting replicas of a data partition stored by the plurality of servers in a first database region of a plurality of database regions, wherein the plurality of servers are geographically located within the plurality of database regions, wherein each of the at least three voting replicas is configured to participate in a consensus protocol to commit write operations to the data partition;

providing, in each database region of a subset of the plurality of database regions that do not store the at least three voting replicas, a non-voting replica of the data partition, wherein each non-voting replica is not configured to participate in the consensus protocol to commit the write operations to the data partition;

receiving, from a client computing device, a selection of a restricted replica placement configuration configured to cause removal of the non-voting replica from each of the subset of the plurality of database regions; and causing removal, based on the received selection of the restricted replica placement configuration, of the non-voting replica from each database region of the subset of the plurality of database regions.

* * * * *